United States Patent [19]
Tzirkel-Hancock

[11] Patent Number: 5,960,395
[45] Date of Patent: *Sep. 28, 1999

[54] PATTERN MATCHING METHOD, APPARATUS AND COMPUTER READABLE MEMORY MEDIUM FOR SPEECH RECOGNITION USING DYNAMIC PROGRAMMING

[75] Inventor: Eli Tzirkel-Hancock, Guildford, United Kingdom

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/796,420

[22] Filed: Feb. 6, 1997

[30] Foreign Application Priority Data

| Feb. 9, 1996 | [GB] | United Kingdom | .................... 9602699 |
| Jul. 9, 1996 | [GB] | United Kingdom | .................... 9614429 |

[51] Int. Cl.$^6$ ..................................................... G10L 5/00
[52] U.S. Cl. ........................................... 704/241; 704/257
[58] Field of Search ..................................... 704/241, 231, 704/236, 243, 244, 245, 238, 255, 256, 240, 257

[56] References Cited

U.S. PATENT DOCUMENTS

| Re. 33,597 | 5/1991 | Levinson et al. | ...................... 704/231 |
| 4,349,700 | 9/1982 | Pirz et al. | .............................. 704/231 |
| 4,468,204 | 8/1994 | Scott et al. | .............................. 434/309 |
| 4,592,086 | 5/1986 | Watari et al. | ........................... 704/238 |
| 4,618,984 | 10/1986 | Das et al. | ................................ 704/244 |
| 4,751,737 | 6/1988 | Gerson et al. | ........................... 704/243 |
| 4,783,803 | 11/1988 | Baker et al. | ............................. 704/241 |
| 4,783,804 | 11/1988 | Juang et al. | ............................. 704/256 |
| 4,783,809 | 11/1988 | Glinski | ..................................... 704/231 |
| 4,910,783 | 3/1990 | Nakagawa | ............................... 704/241 |
| 5,031,113 | 7/1991 | Höllerbauer | ............................. 704/235 |
| 5,127,055 | 6/1992 | Larkey | ..................................... 704/244 |
| 5,218,668 | 6/1993 | Higgins et al. | ........................ 704/200 |

FOREIGN PATENT DOCUMENTS

| 1 221 444 | 5/1987 | Canada . |
| 0 139 875 A1 | 5/1985 | European Pat. Off. . |
| 0 342 630 | 11/1989 | European Pat. Off. . |
| 0 376 501 A3 | 7/1990 | European Pat. Off. . |
| 0 417 854 A2 | 3/1991 | European Pat. Off. . |

(List continued on next page.)

OTHER PUBLICATIONS

R.E. Helms, "Voice Control in Telecommunications", Proceedings of the National Communications Forum, vol. 40, No. 2, pp. 1220–1227, Oak Brook, Illinois, 1986.

Patent Abstracts of Japan, vol. 10, No. 91 (E–394), Apr. 9, 1986, An English abstract of JP–A–60 235566.

Tom Hill, "Voice–Operated PBX Interface", Scientific Honeyweller, vol. 6, No. 3, pp. 26–27, XP002013994, Oct. 1985.

H. Mulla, et al., "Application of Speech REcognition and Synthesis to PABX Services", Electrical Communication, pp. 273–180, XP002013994, May 1985.

*Primary Examiner*—Richemond Dorvil
*Attorney, Agent, or Firm*—Fitzpatrick, Cella, Harper & Scinto

[57] ABSTRACT

A method for matching an input pattern with a number of stored reference patterns using a dynamic programming matching technique is described. The reference patterns of a reference signal which are at the end of a dynamic programming path for a current input pattern are listed in an active list. The dynamic programming paths are propagated by processing the reference patterns on the active list, and a new active list is generated for the succeeding input pattern. The amount of processing required for each pattern on the active list is reduced by using a pointer which identifies the reference pattern which is the earliest in the sequence of patterns of the current reference signal listed on the new active list during the processing of a preceding dynamic programming path. In a second aspect, a speech recognition interface is used as a control system for a telephony system.

133 Claims, 31 Drawing Sheets

FOREIGN PATENT DOCUMENTS

| | | |
|---|---|---|
| 0 453 831 A3 | 10/1991 | European Pat. Off. . |
| 0 469 577 A2 | 2/1992 | European Pat. Off. . |
| 0 559 349 A1 | 9/1993 | European Pat. Off. . |
| 0 691 640 A2 | 1/1996 | European Pat. Off. . |
| 2 531 590 | 2/1984 | France . |
| 2 263 042 | 7/1993 | United Kingdom . |
| WO 87 04290 | 7/1987 | WIPO . |
| WO 95/09416 | 4/1995 | WIPO . |

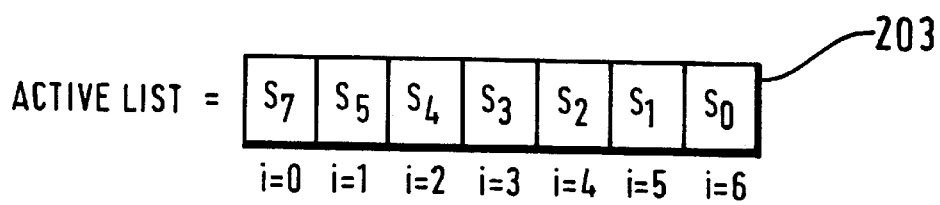
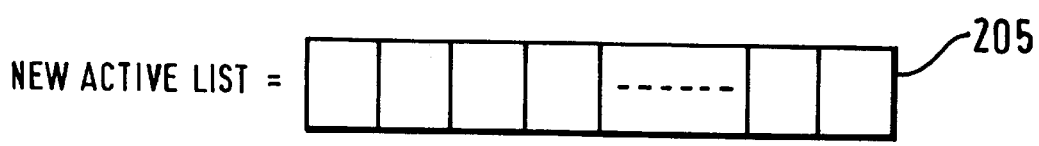

PATTERN MATCHING METHOD, APPARATUS AND COMPUTER READABLE MEMORY MEDIUM FOR SPEECH RECOGNITION USING DYNAMIC PROGRAMMING

The present invention relates to a method of and apparatus for pattern matching. The invention has particular, although not exclusive relevance to a method of implementing a dynamic programming matching technique. In an exemplary embodiment, the dynamic programming matching technique is employed in a speech recognition system. In an aspect of the invention, functions of a telephony system are controlled using a speech recognition system.

Speech recognition is a process by which an unknown speech utterance is identified. There are several different types of speech recognition systems currently available which can be categorised in several ways. For example, some systems are speaker dependent, whereas others are speaker independent. Some systems operate for a large vocabulary of words (>10,000 words) while others only operate with a limited sized vocabulary (<1000 words). Some systems can only recognise isolated words whereas others can recognise phrases comprising a series of connected words.

In a limited vocabulary system, speech recognition is performed by comparing features of an unknown utterance with features of known words which are stored in a database. The features of the known words are determined during a training session in which one or more samples of the known words are used to generate reference patterns therefor. The reference patterns may be acoustic templates of the modelled speech or statistical models, such as Hidden Markov Models.

To recognise the unknown utterance, the speech recognition apparatus extracts a pattern (or features) from the utterance and compares it against each reference pattern stored in the database. A scoring technique is used to provide a measure of how well each reference pattern, or each combination of reference patterns, matches the pattern extracted from the input utterance. The unknown utterance is then recognised as the word(s) associated with the reference pattern(s) which most closely match the unknown utterance.

Typically, the scoring is accomplished using a dynamic programming technique which provides an optimal time alignment between each of the reference patterns and the pattern extracted from the unknown utterance, by locally shrinking or expanding the time axis of one pattern until there is an optimal match between the pairs of patterns. The reference pattern or sequence of reference patterns having the best score identifies the word or words most likely to correspond to the input utterance.

The dynamic programming matching technique is relatively computationally and memory expensive as it involves the determination of many possible matchings between the incoming utterance and each reference model.

U.S. Pat. No. 4,592,086 (Nippon Electric Co. Limited) discloses a connected digit speech recognition system which uses a dynamic programming matching technique. U.S. Pat. No. 4,592,086 discloses that the amount of memory required for the matching process can be reduced if the patterns of a reference model, which are at an end of a dynamic programming path, are processed in reverse sequential order.

An aspect of the present invention provides a pattern matching method and apparatus which uses a dynamic programming matching technique, wherein the active patterns of models are processed in reverse sequential order, and wherein a last active pointer is used to control the required processing of the patterns.

An embodiment of the present invention provides a method of performing a dynamic programming pattern matching process between a sequence of input patterns representative of an input signal, and a number of stored sequences of reference patterns, each sequence being representative of a reference signal, wherein the method processes each input pattern in turn with respect to at least some of the reference signals in turn, by: (1) defining as active patterns the reference patterns of a current reference signal which are at the end of a dynamic programming path for a current input pattern being processed, and listing the active patterns for the current input pattern in a current active list; (2) for each active pattern, storing in a store associated with that active pattern, a cumulative value representative of the score for the dynamic programming path which ends at that active pattern; and (3) updating the cumulative values and propagating the dynamic programming paths based on constraints which are placed on the dynamic programming path propagation, by processing each active pattern of the current reference signal in reverse sequential order, by: (A) updating the cumulative value stored in the store associated with a current active pattern being processed, using the current input pattern; and then (B) propagating the dynamic programming path associated with the current active pattern, and listing, if it is not already listed, each reference pattern of the current reference signal, which may be at the end of that dynamic programming path for the succeeding input pattern, in a new active list; wherein the propagation of each dynamic programming path for a current reference signal is controlled using a pointer associated with the current reference signal, which identifies the reference pattern which is the earliest in the sequence of patterns of the current reference signal listed in the new active list, after the processing of the preceding active pattern, such that the propagation of each dynamic programming path is achieved without the need to search the new active list to identify which reference patterns, of the current reference signal, have been listed in the new active list as a result of processing preceding active patterns. The processing of the current input pattern may be processed before the next input pattern is ready to be processed. Each reference signal may have associated therewith a current active list and a new active list.

In a preferred embodiment the pattern matching method is used in a speech recognition system.

Another embodiment provides a method of and apparatus for adapting existing reference models for use by a new user, which uses a statistical substitution technique.

Another embodiment provides a method for adapting existing reference models which are used in a pattern matching system, wherein each reference model comprises a sequence of reference patterns, the method comprising the steps of: (a) inputting a number of input signals for which the content is known; (b) processing each input signal to generate a sequence of representative input patterns; (c) for each input signal, aligning the representative sequence of input patterns with the sequence or sequences of reference patterns of the existing reference model or models of the signals known to be in that input signal; (d) for each reference pattern which is aligned with a number of input patterns of one or more input signals: (i) combining the input patterns of the aligned input signals; and (ii) replacing that reference pattern of the reference model with the combined input pattern determined in step (i).

One example of an application for a speech recognition system is in a telephony system. In a modern communication system, users are provided with a large number of telephony services. For example, the user has the ability to hold calls currently in progress, to transfer calls to other users and to set up conference calls with a number of other users. Additionally, most systems allow the storage of messages for each user, when they are not available to take a call. In order to accommodate these telephony services, telephone manufacturers have been increasing the size and complexity of the telephones by providing additional function keys on the telephone keypad. In order to access a telephony service, the user must press a number of keys on the telephone either in sequence or simultaneously. The problem with these telephones is that often a user will only familiarise himself with the combination of keys associated with the telephony services which he uses most often, and not the combination of keys required to activate the other services. Therefore, in practice, the user does not utilise the full capabilities of the telephony system available to him.

A system has recently been proposed by Wildfire Communications Inc. which solves many of these problems with existing telephony systems. In particular, the system has a speech recognition user interface which allows a user to access telephony functions by voice command. However, the system has a problem in that to access a single command, the user sometimes has to input several preset commands in addition to identifiers of other users one at a time in a laborious and time consuming interactive procedure.

This aspect of the present invention aims to alleviate these problems associated with the prior art system.

One aspect of the present invention provides a control system for controlling a telephony system comprising: a speech recognition user interface for allowing a user to input speech commands for controlling the telephony system; control means responsive to the speech recognition user interface for controlling the telephony system in accordance with an input speech command; wherein the speech recognition user interface is adapted to be able to recognize continuously spoken commands comprising telephone commands and an identifier of another user by comparing the spoken command with a stored language model. Preferably the stored language model is adaptable by the user.

A further aspect of the present invention provides a telephony system comprising: a speech recognition user interface for allowing a user to input speech commands for controlling telephony services provided by the system; and an execution means, responsive to the speech recognition interface, for executing an operation corresponding to the speech command; wherein each user of the system is identified by a telephone number and an associated identifier, and wherein the execution means is adapted to predict what telephony service is wanted if the user inputs only the identifier of another user.

Another aspect of the present invention provides a mailbox facility for use with a telephony system, comprising a speech recognition user interface for allowing a user to input speech commands for controlling the mailbox facility; control means for controlling the mailbox facility in accordance with an input speech command; and storage means for storing messages left by callers when the users are unable to take the calls; wherein each message stored in the mailbox is associated with the telephone number of the caller who left the message, whereby users can request via the speech recognition user interface, the mailbox facility to read the messages from particular callers.

A further aspect of the present invention provides a method performing the functions according to the above aspects of the invention relating to a telephony system.

Various embodiments of the invention will now be described, by way of example only, with reference to the accompanying drawings in which.

Embodiments of the present invention can be implemented in computer hardware, but the embodiment to be described is implemented in software which is run in conjunction with processing hardware such as a personal computer, workstation, photocopier, facsimile machine or the like.

Figure 1:
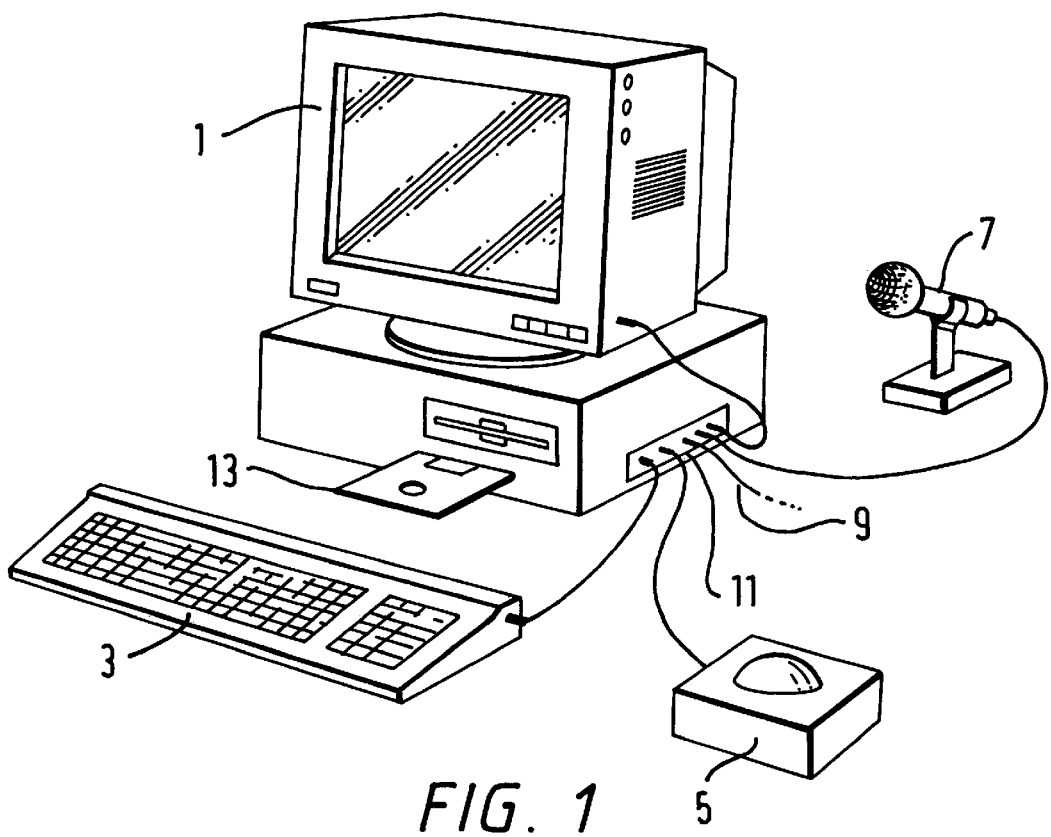
FIG. 1 is a schematic view of a computer which may be programmed to operate an embodiment of the present invention.

FIG. 1 shows a personal computer (PC) 1 which may be programmed to operate an embodiment of the present invention. A keyboard 3, a pointing device 5, a microphone 7 and a telephone line 9 are connected to the PC 1 via an interface 11. The keyboard 3 and pointing device 5 enable the system to be controlled by a user. The microphone 7 converts the acoustic speech signal of the user into an equivalent electrical signal and supplies this to the PC 1 for processing. In this embodiment, the beginning and end points of the input speech to be processed, are identified by the user holding the spacebar on the keyboard 3 down for the duration of the input utterance. In this manner, the system only processes the input utterance to be identified. An internal modem and speech receiving circuit (not shown) may be connected to the telephone line 9 so that the PC 1 can communicate with, for example, a remote computer or with a remote user.

The programme instructions which make the PC 1 operate in accordance with the present invention may be supplied for use with an existing PC 1 on a storage device such as a magnetic disc 13, or by the internal modem communicating with a remote computer via the telephone line 9.

The operation of the limited vocabulary continuous speech recognition system of this embodiment will now be described with reference to FIG. 2. Electrical signals representative of the input speech from, for example, the microphone 7 are applied to a preprocessor 15 which converts the input speech signal into a sequence of parameter frames, each representing a corresponding time frame of the input speech signal. The sequence of parameter frames are supplied to a recognition block where the speech is recognised by comparing the input sequence of parameter frames with reference models or word models 19, each model comprising a sequence of parameter frames expressed in the same kind of parameters as those of the input speech to be recognised.

A language model 21 and a noise model 23 are also provided as inputs to the recognition block 17 to aid in the recognition process. The noise model is representative of silence or background noise and, in this embodiment, comprises a single parameter frame of the same type as those of the input speech signal to be recognised. The language model 21 is used to constrain the allowed sequence of words output from the recognition block 17 so as to conform with sequences of words known to the system. The word sequence output from the recognition block 17 may then be transcribed for use in, for example, a word processing package or can be used as operator commands to initiate, stop or modify the action of the PC 1.

A more detailed explanation will now be given of the apparatus described above.

Preprocessor

The preprocessor will now be described with the aid of FIGS. 3 to 10.

The functions of the preprocessor 15 are to extract the information required from the speech and to reduce the amount of data that has to be processed. There are many known methods of preprocessing speech in the field of speech analysis and the following method is given by way of example only and should not be construed as limiting in any way. In this embodiment the preprocessor 15 is designed to extract "formant" related information. Formants are defined as being the resonant frequencies of the vocal tract of the user, which change as the shape of the vocal tract changes.

Figure 3:
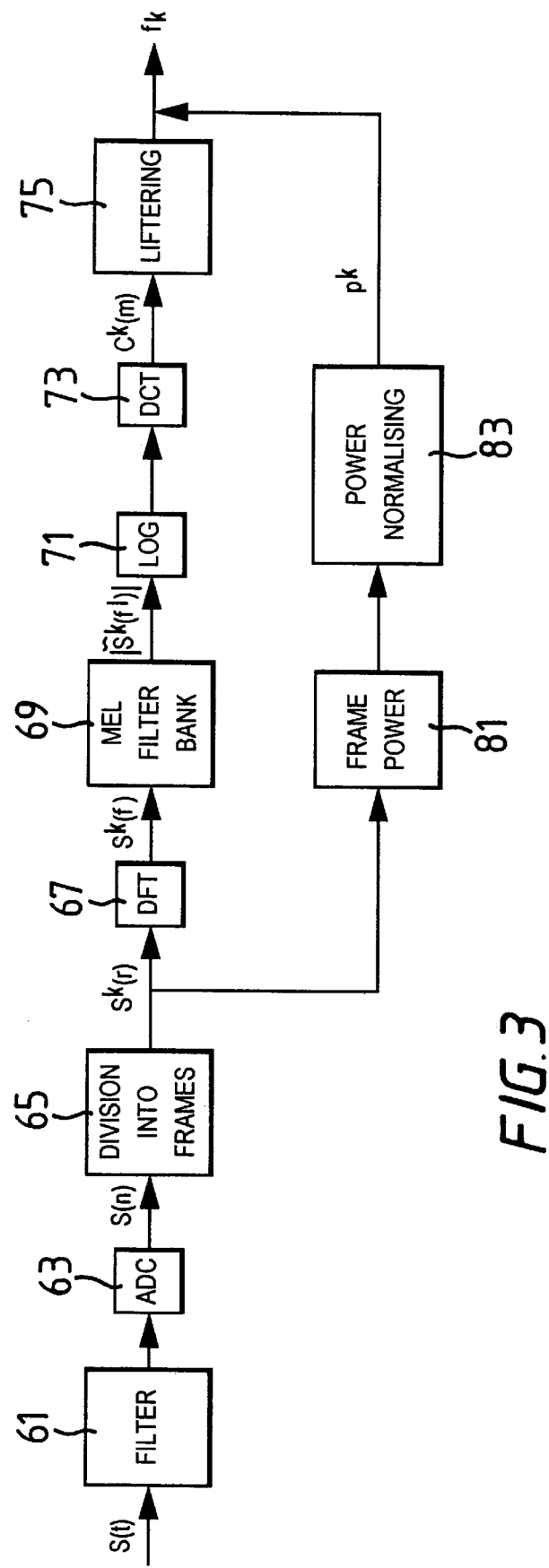
FIG. 3 is a block diagram of the preprocessor incorporated as part of the system shown in FIG. 2 which illustrates the processing steps that are performed on the input speech signal.

FIG. 3 shows a block diagram of the preprocessing that is performed on the input speech signal. Input speech S(t) from the microphone 7 or the telephone line 9 is supplied to filter block 61, which removes frequencies within the input speech signal that contain little meaningful information. In speech signals, most of the meaningful information is contained below 4 KHz. Therefore, filter block 61 removes all frequencies above 4 KHz. The filtered speech signal is then converted into digital samples by the analogue-to-digital converter (ADC) 63. To adhere to the Nyquist sampling criterion, ADC 63 samples the filtered signal at a rate of 8000 times per second. In this embodiment, the whole input speech utterance is converted into digital samples and stored in a buffer (not shown), prior to the subsequent steps in the processing of the speech signals.

After the input speech has been sampled it is divided into overlapping equal length frames in block 65. The reason for this division of the input speech into frames will now be described in more detail. As mentioned above, during continuous speech the formant related information changes continuously, the rate of change being directly related to the rate of movement of the speech articulators which is limited by physiological constraints. Therefore, in order to track the changing formant frequencies, the speech signal must be analysed over short time periods or frames, this method being known in the art of speech analysis as a "short time" analysis of speech. There are two considerations that have to be addressed when performing a short time analysis: (i) what rate should the time frames be extracted from the speech signal, and (ii) how large a time frame should be used.

The first consideration depends on the rate of movement of the speech articulators i.e. the frames should be sufficiently close to ensure that important events are not missed and to ensure that there is reasonable continuity. In this embodiment, a frame is extracted once every 10 milliseconds. The second consideration is determined by a compromise between the time frame being short enough so that the speech signal's properties during the frame are constant, and the frame being long enough to give sufficient frequency detail so that the formants can be distinguished. In the present embodiment, the frames are 20 milliseconds in length which, with the above sampling rate, corresponds to 160 samples per frame.

If these frames are generated by extracting the frames directly from the speech samples, considerable frequency distortion results. Therefore, to reduce such distortions, a smoothed window function should be used. There are many such windows available including Hamming, Hanning, Blackman, Bartlett and Kaiser all of which will be known to those skilled in the art of speech analysis. In the present embodiment, a Hamming window is used, this being represented by the following equation:

$$W(n) = 0.54 - 0.46 \cos[2\pi n/(N_s - 1)] \quad (1)$$

where $N_s$ is the number of samples in the window, i.e. 160 samples.

Figure 4:
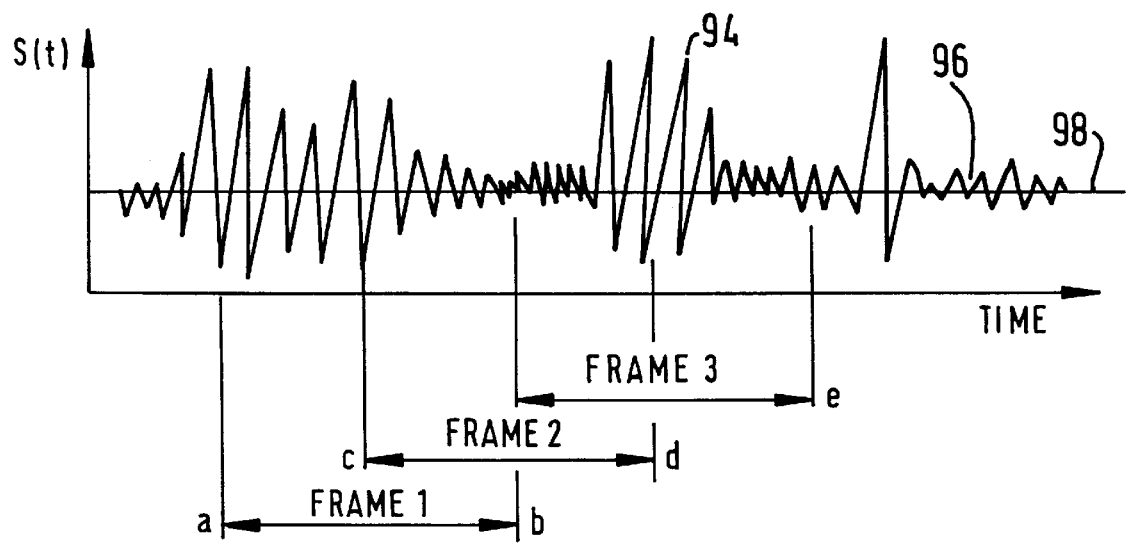
FIG. 4 is a diagrammatical representation of the division of the input speech signal S(t) into a series of time frames.

FIG. 4 shows in more detail the short time analysis operation that is carried out in the present embodiment. The speech signal in frame 1, i.e. between time instant "a" and time instant "b", is multiplied by the window function given in equation (1). Further, due to the choice of the frame rate and the frame length, the next frame, frame 2, starts midway between frame 1 at time instant "c" etc.

Figure 5:
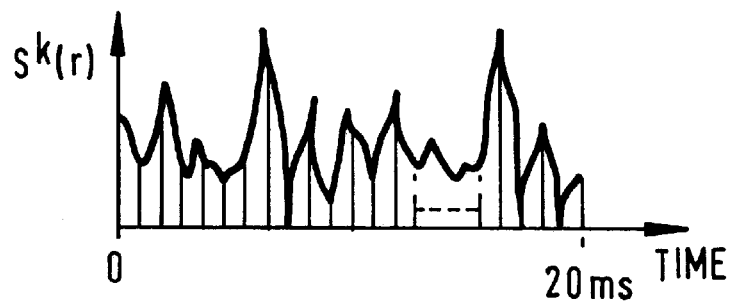
FIG. 5 is a diagrammatical representation of a typical speech signal for a single time frame.

Once a frame of input speech signal has been extracted, the magnitude of the discrete Fourier transform (DFT) of the frame is calculated in block 67, i.e. $|S^k(f)|$ where f is the discrete frequency variable. Only the magnitude information is required, since many aspects of this preprocessor are designed to simulate the operation of the human auditory system, which is relatively insensitive to the phase of the input speech signal. FIG. 5 shows a typical speech signal for a single frame $S^k(r)$ comprising 160 samples, i.e. r=0,1, ... 159. To enable an efficient Fast Fourier Transform (FFT) algorithm to be used in the calculation of the DFT, the number of samples within the frame $S^k(r)$ needs to be increased to a power of 2. One method of achieving this is by adding 96 zero's at the end of the 160 samples to give 256 samples. This technique is known as "padding with zeros" and is well known in the art of speech analysis, and will not be described further.

Figure 6:
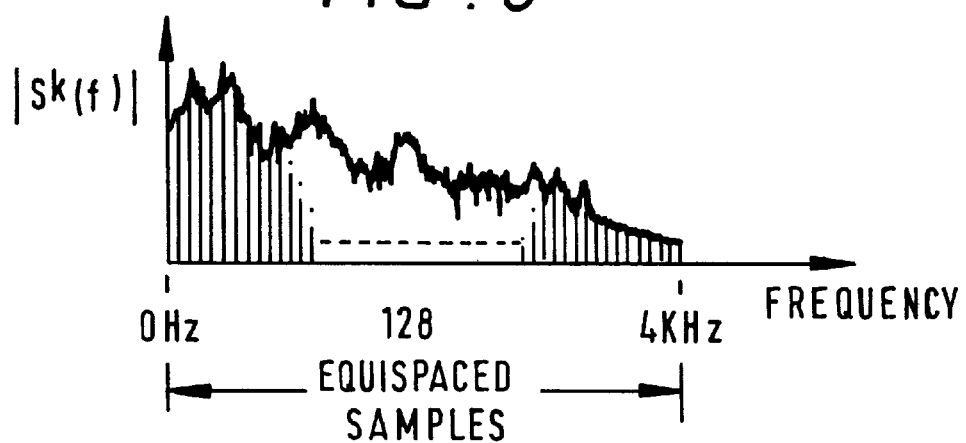
FIG. 6 is a diagrammatical representation of the magnitude response of the discrete Fourier transform of the speech signal shown in FIG. 5.

In computing the DFT of $S^k(r)$, only the first 128 samples of the spectrum need to be computed, since speech is a real signal and so the second 128 samples will be a mirror image of the first 128 samples. FIG. 6 shows the first 128 samples of the magnitude of the DFT $|S^k(f)|$ of the speech signal in frame $S^k(r)$ shown in FIG. 5, the last sample of which occurs at a frequency of half the sampling frequency, i.e. 4 KHz.

As mentioned earlier, the purpose of preprocessor 15 is to reduce the data rate and to emphasise particular components of the input speech signal. The data rate has been reduced slightly by the DFT, since there are now only 128 samples per frame. One method of reducing the data rate further is to split the spectrum into a number of equal frequency bands and to average the samples within each band, i.e. pass the samples shown in FIG. 6 through a filter bank.

Studies on the human auditory system have shown that the ear frequency resolution decreases with increasing frequency. Therefore, a logarithmically spaced filter bank, i.e. one in which there are more frequency bands in the low frequency region compared to the high frequency region, is preferable to a linearly spaced filter bank since a logarithmically spaced filter bank retains more perceptually meaningful information.

Figure 7:
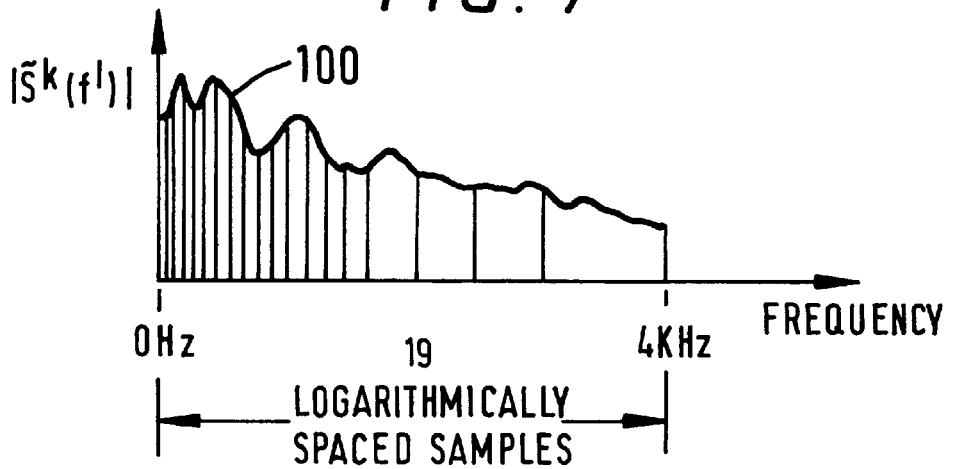
FIG. 7 is a diagrammatical representation of the averaged magnitude response output of a mel scale filter bank.

In the present embodiment, a mel spaced filter bank 69 having nineteen bands is used. The mel scale is well known in the art of speech analysis, and is a logarithmic scale that attempts to map the perceived frequency of a tone onto a linear scale. FIG. 7 shows the output $|S^k(f')|$ of the mel spaced filter bank 69, when the samples shown in FIG. 6 are passed through the bank 69. The resulting envelope 100 of the magnitude spectrum is considerably smoother due to the averaging effect of the filter bank 69, although less smooth at the lower frequencies due to the logarithmic spacing of the filter bank.

The formant related information is then extracted from the speech using blocks 71, 73 and 75 of FIG. 3, by a process which will now be explained.

It is possible to model the speech signal S(t) of a user in terms of an excitation signal E(t) and a filter V(t), where the excitation signal E(t) represents the airflow entering the vocal tract, and the filter V(t) represents the filtration effect of the vocal tract. Consequently, the magnitude of the frequency spectrum $|S(f)|$ of the speech signal is given by the multiplication of the magnitude of the frequency spectrum $|E(f)|$ of the excitation signal with the magnitude of the spectrum $|V(f)|$ of the vocal tract filter, i.e.

$$|S(f)| = |E(f)| \cdot |V(f)| \quad (2)$$

One method, known as the cepstral method, of extracting the vocal tract information from the input speech will now be described. This method involves separating the vocal tract filter magnitude response $|V(f)|$ from the excitation magnitude response $|E(f)|$ by taking the logarithm of the speech magnitude response $|S(f)|$, which results in the excitation and vocal tract filter characteristics becoming additive, i.e.

$$\log|S(f)| = \log|E(f)| + \log|V(f)| \quad (3)$$

Figure 8:
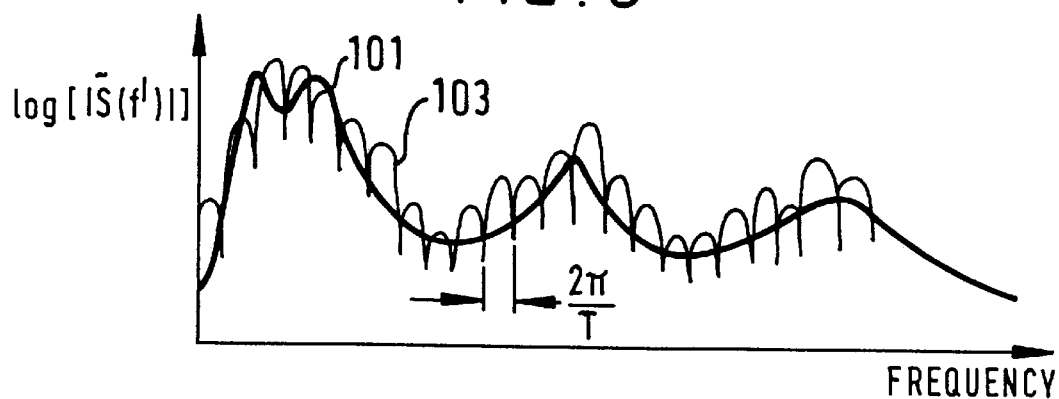
FIG. 8 is a diagrammatical representation of the log magnitude spectrum of the output from the mel scale filter bank.

FIG. 8 shows the envelope of the logged output from the mel filter bank 69, i.e. $\log|S^k(f')|$, which shows graphically the additive nature of two components 101 and 103. Component 101 is representative of the vocal tract characteristics, i.e. log |V(f)|, and component 103 is representative of the excitation characteristics, i.e. log |E(f)|. The peaks in component 101 occur at the formant frequencies of the vocal tract and the equally spaced peaks in component 103 occur at the harmonic frequencies of the pitch of the speaker.

The vocal tract characteristics 101 can be extracted from the excitation characteristics 103, by performing a Discrete Cosine Transform (DCT) on the samples output from block 71, and then filtering the result.

Figure 9:
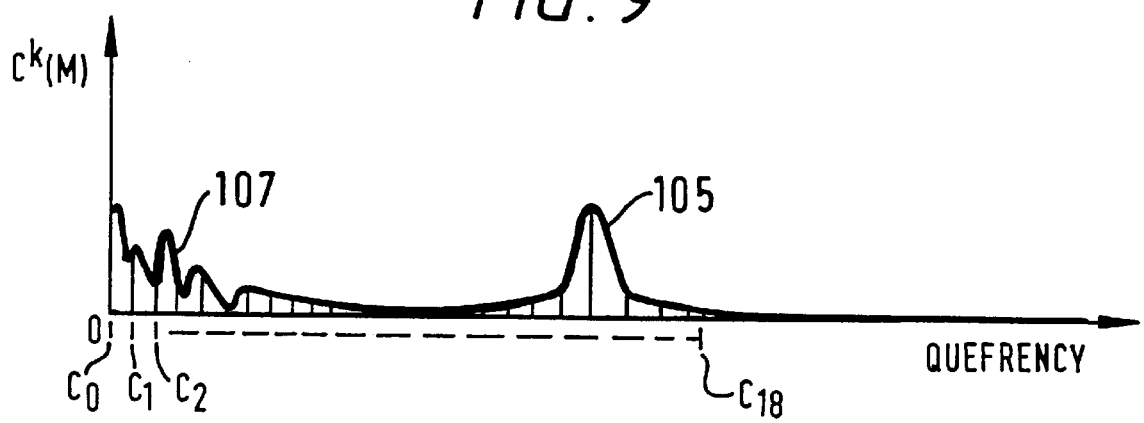
FIG. 9 is a diagrammatical representation of the cepstrum of the logged magnitude spectrum shown in FIG. 8.

FIG. 9 shows the output of the DCT block 73, which is known as the cepstrum $C^k(m)$. The independent variable (x-axis of FIG. 9) of the cepstrum has dimensions of time and is given the name "quefrency". The strongly periodic component 103 shown in FIG. 8 becomes a peak 105 in the cepstrum at a location equivalent to the pitch period T of the speaker. The slowly varying component 101 shown in FIG. 8, is transformed onto a number of small peaks 107 near the origin of the cepstrum, the position and amplitude of which are dependent on the formants.

As the vocal tract characteristics and the excitation characteristics of speech appear in separate parts of the quefrency scale, they can be separated from one another by a filtering process, or, in cepstral terminology by a so called "liftering" process. The cepstrum $C^k(m)$ shown in FIG. 9 is made up of a set of discrete cepstral coefficients ($C_0, C_1, \ldots C_{18}$), and therefore the liftering could be achieved by means of a simple rectangular window. However, in order to de-emphasise parts of the spectrum that are considered to be less reliable, a more gradual windowing function is preferred.

In the present embodiment, the following window function is used in littering block 75:

$$W_{lift}(m) = 1 + \frac{N_c}{2}\sin\frac{\pi m}{N_c} \qquad (4)$$

where $N_c$ is the desired number of cepstral coefficients output per frame from the liftering block 75, which in the present embodiment is twelve.

In addition to the twelve cepstral coefficients mentioned above, the power of the speech signal within each frame, i.e. the "frame power" is also calculated. This is an important feature since it can be used, among other things, to indicate whether or not the input speech signal during the frame corresponds to a voiced speech signal. The frame power is calculated in frame power block 81 shown in FIG. 3 using a conventional method well known in the art of speech analysis. To achieve independence of variable recording conditions, variable loudness etc, the power determined in block 81 is normalised in power normalising block 83 to give a power coefficient $P^k$ which is combined with the cepstral coefficients output from the liftering block 75. The power is normalised in block 83 by determining the maximum power (dB) across the utterance stored in the buffer (not shown), subtracting this from the power of each frame and multiplying the result by a normalisation constant.

Whereas in the present embodiment, the power of the input speech signal during each frame is determined, other values indicative of the input speech signal during each frame could be used. For example, a measure of the average magnitude of the input speech signal during a frame could be determined and normalised.

In summary, the preprocessor 15 outputs, for each time frame, a set of coefficients—twelve cepstral coefficients and one power coefficient. For convenience, the coefficients that represent frame k will be referred to as parameter frame $f_k$, and the coefficients that represent the subsequent frame will be referred to as parameter frame $f_{k+1}$ etc.

Buffer

Figure 2:
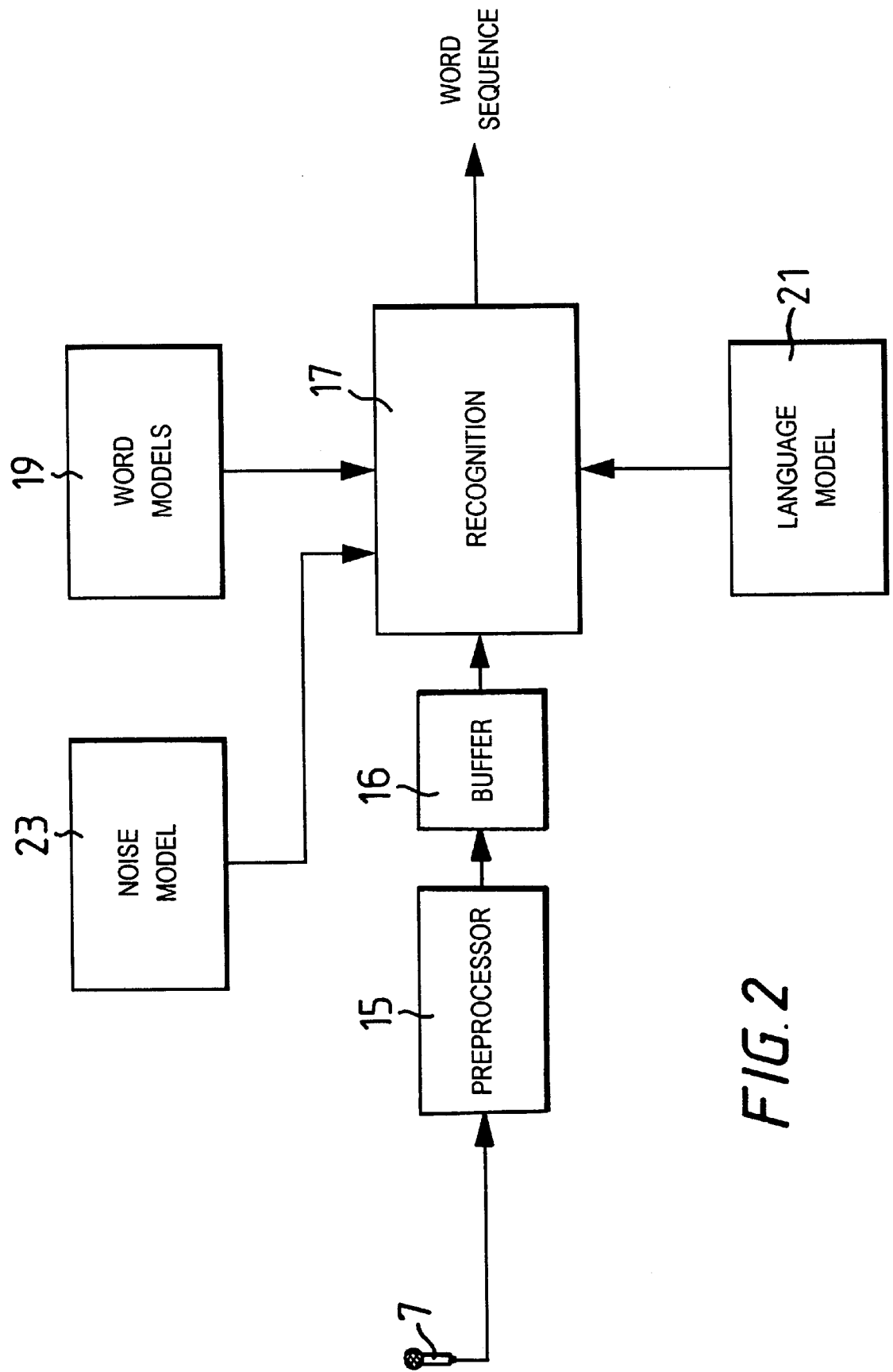
FIG. 2 is a schematic overview of a speech recognition system.

The parameter frames $f_k$ output from preprocessor 15 are applied to the buffer 16 shown in FIG. 2. In the present embodiment, the buffer 16 is large enough to store all the parameter frames generated for the speech stored in the buffer (not shown) which stores the digital samples output from ADC 63 for the input speech. After the entire input utterance has been processed by the preprocessor 15, the parameter frames stored in buffer 16 are fed to the recognition block 17 in the order that they are received, where the input utterance is recognised.

Reference Models

As mentioned above, in order to determine which words are represented by the output signals from the preprocessor 15, these signals are compared with stored reference models which model the words already known to the system and the acoustic environment surrounding the system. Each model associated with a particular word comprises a sequence of parameter frames of the same type of parameter frames output from the preprocessor 15 described above. However, to differentiate between the frames in the word models and the frames in the input utterance to be recognised, the frames in the word models will be referred to as states.

One feature of the speech recognition system according to this embodiment is that it can be supplied to the end user with no word models, environment (or noise) model or language model pre-stored therein. This allows the user the freedom to train the system to recognise the phrases he wants, without the system being overburdened with pre-stored words which may not be useful for the user's purpose. Further, as will be seen from the following description, the particular training method described is particularly adapted to this situation because it allows for new phrases to be learnt by the system without the need for a time consuming training session. In addition, since the reference models correspond to whole words and not phonemes, the system will work for any language or even any mixture of languages. The training process will now be described in more detail with reference to FIGS. 10 to 17.

Training

Figure 10:
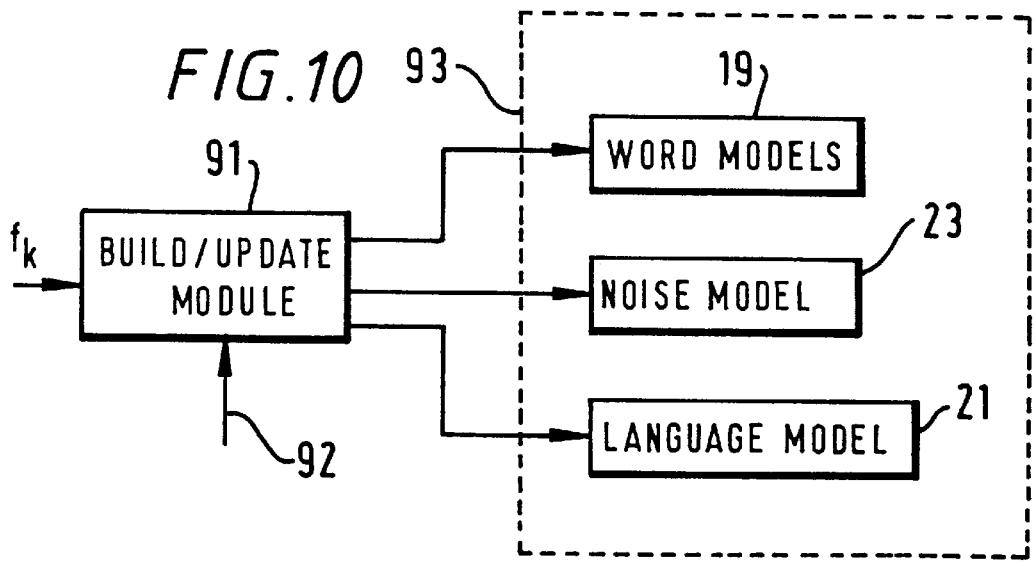
FIG. 10 is a schematic diagram of the reference model builder used during a training process.

FIG. 10 is a schematic diagram which illustrates the build/update module 91 which is used in the training process. In particular, the build/update module 91 receives sequences of parameter frames $f_k$ representative of a word or words to be learnt by the system, and user information, represented by arrow 92, indicative of the text corresponding to the input spoken word or words. If sufficient information has been input into the build/update module 91 then it generates word models corresponding to the input words and updates the language model 21. In this embodiment, both the word models and the language model are stored in a high volume data storage unit, such as a hard disc 93.

The manner in which the noise model 23 is determined in this embodiment will now be described. Firstly, the user indicates that he wishes to build a new or change the existing noise model 23. In response, the system prompts the user to input sound representative of silence. This is achieved by the user holding down the spacebar on the keyboard 3 while remaining silent. At the end of the period of silence, the user must then utter a word so that the system can normalise the power coefficient of the generated parameter frames representative of the silence. If the user does not utter a word at the end of the period of silence then the power coefficient for the noise model 23 will be unrealistically high, and misrecognition errors may result. Finally, in order to determine the noise model 23, the system averages the parameter frames generated for the period of silence to produce a single parameter frame which is used as the noise model 23.

The speech recognition system of this embodiment is designed to recognise continuously spoken words, i.e. words embedded within phrases. In order to achieve good recognition results, the reference models (or continuous word models) should be derived from example phrases which contain the words of interest. Unfortunately, it is not an easy task to identify the beginning and end points of a word within a continuously spoken phrase. An overview of the way in which the present embodiment generates a continuous word model will now be given. Firstly, the system determines a model for the word from an isolated utterance of that word. This model will be referred to as the "isolated word model" although, as those skilled in the art of speech recognition will realise from the following description, these isolated word models may not correspond to conventional isolated word models well known in the art. The system then uses the isolated word models to generate the continuous word models by comparing the isolated word models with example phrases containing the corresponding words.

To generate the isolated word model, the word must be input into the system via the microphone 7 or the telephone line in isolation. As described above, the space bar is used to identify each incoming utterance. Therefore, the sequence of parameter frames representative of the isolated utterance of the word will comprise parameter frames at the beginning and end thereof which correspond to silence. The system then compares the utterance of the isolated word with example phrases which contain that word. This comparison identifies approximate beginning and end points of the word within the isolated utterance. These beginning and end points are then averaged and the isolated word model for the word is determined by extracting the sequence of parameter frames which lies between the averaged beginning and end points. By determining the isolated word model in this way, not only should the silence at the beginning and end of the word be removed, but parts of the word which are not pronounced during continuous speech will also be removed. Therefore, the isolated word model may not correspond to a conventional isolated word model, which is determined by removing the silence from the beginning and ends of the input utterance, and will be more representative of the word when spoken in continuous speech.

Once the isolated word model has been determined, it is aligned with the example phrases which contain that word in order to identify the location of the word within the phrase. Finally, the reference or continuous word model is determined by extracting and combining the speech from the locations identified in the phrases. The way in which the system generates the word models will now be described in more detail.

Figure 11:
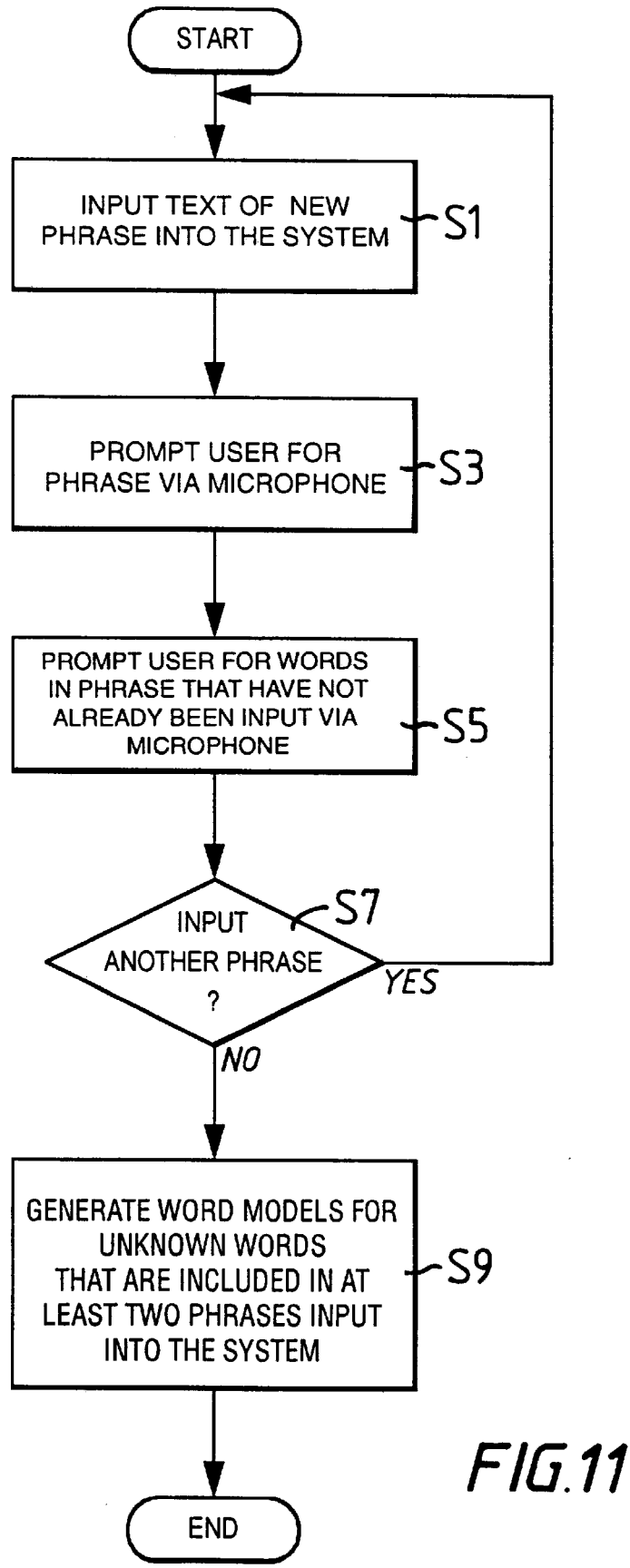
FIG. 11 is a flow chart which illustrates the steps taken during the training process for generating word models for use in the speech recognition system.

When the user wishes to teach the system one or more new phrases, the user initiates the subroutine shown in FIG. 11. In step S1 the user enters the text of the new word or phrase into the system via the keyboard 3. The system then checks whether that word or phrase is already known, and if it is not then in step S3, it prompts the user to enter the same word or phrase via the microphone 7, and associates the utterance with the corresponding text input in step S1. Next in step S5 the PC 1 uses all the text which has been previously entered, to check whether any of the words within the phrase have been input (in isolation) already, and prompts the user to input, in isolation via the microphone 7, those words that have not been entered before.

After step S5, the user decides whether to enter another new word or phrase in step S7, and returns to step S1 if he does. On the other hand, if the user decides not to input any more phrases, then the processing moves to step S9 where reference models are generated for unknown words which are included in at least two phrases input into the system. For example, if no training phrases have been input, and the system has no pre-stored reference models, and the user decides to input the phrases "get an image" and "get the earth", and then decides in step S7 that he does not wish to enter any more phrases, then the system will only be able to generate a word model for the word "get", since it is the only word that is in both of the input phrases. If on the other hand the user inputs the phrase "get an image" twice, then the system will be able to generate a reference model for each word in the phrase. Taking the first example mentioned above further, if the user decides to input the phrase "get the earth" in a second training session after inputting the first two phrases, then the system will not prompt the user for the words "get" or "the" in step S5 since these words will have been input in isolation already. Further, the system will now be able to generate a reference model for the word "the" since it now appears in two phrases which have been input into the system. In this way, the training is incremental and can be trained at the convenience of the user.

Figure 12:
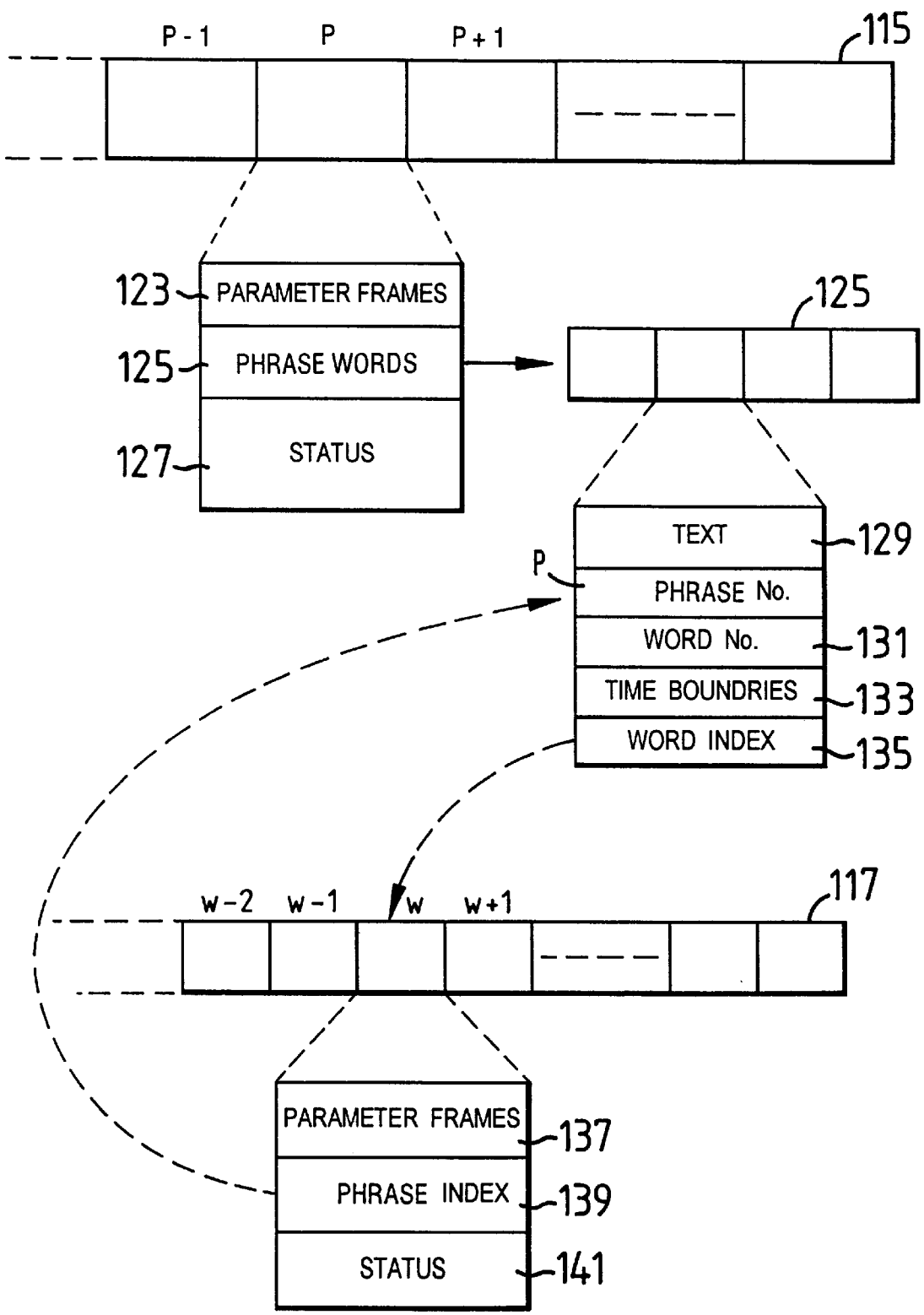
FIG. 12 is a schematic diagram which illustrates the manner in which the training phrases and words are stored during the training process.

Referring to FIG. 12, each phrase input in the above manner is given a phrase number P and is stored in a phrase array 115 on the hard disc 93. Similarly, each isolated word that is input is given a word number W and is stored in a word array 117 on the hard disc 93. As shown in FIG. 12, each phrase P in the phrase array 115 has an associated sequence of parameter frames 123, the sequence of words 125 that form the phrase and a status flag 127. Each word in the sequence of words 125 has an associated text 129 of the word, the phrase number P, the word number 131 (i.e. the position of the word within the phrase), the time boundaries 133 of the word within the phrase and a word index 135 which points to the corresponding isolated word W in the word array 117. Each isolated word W in the word array 117 has an associated sequence of parameter frames 137, a phrase index 139 which points back to those phrases in which that word can be found and a status flag 141.

Initially, when the isolated words and phrases are being entered into the system, the status flags 127 and 141 associated with each word or phrase are labelled FLEXI to indicate that they have not been processed, and the time boundaries 133, associated with each word within the sequence of words in the phrase, are set to UNKNOWN.

The generation of the word models for the unknown words performed in step S9 of FIG. 11 will now be briefly described with reference to FIGS. 12 to 16, using as an example the training phrases "get an image" which has been input twice, and "get the earth" which has been input once. Therefore, there will be three elements P1, P2 and P3 in the phrase array 115, one for each utterance of the phrase "get an image" and one for the utterance of the phrase "get the earth". Additionally, there will be five elements W1, W2, W3, W4 and W5 in the words array 117, one for each of the different words that make up the two phrases. As described above, a sequence of parameter frames corresponding to each phrase and corresponding to each of the different words will be stored in the corresponding elements in the phrase array 115 and word array 117.

Figure 13:
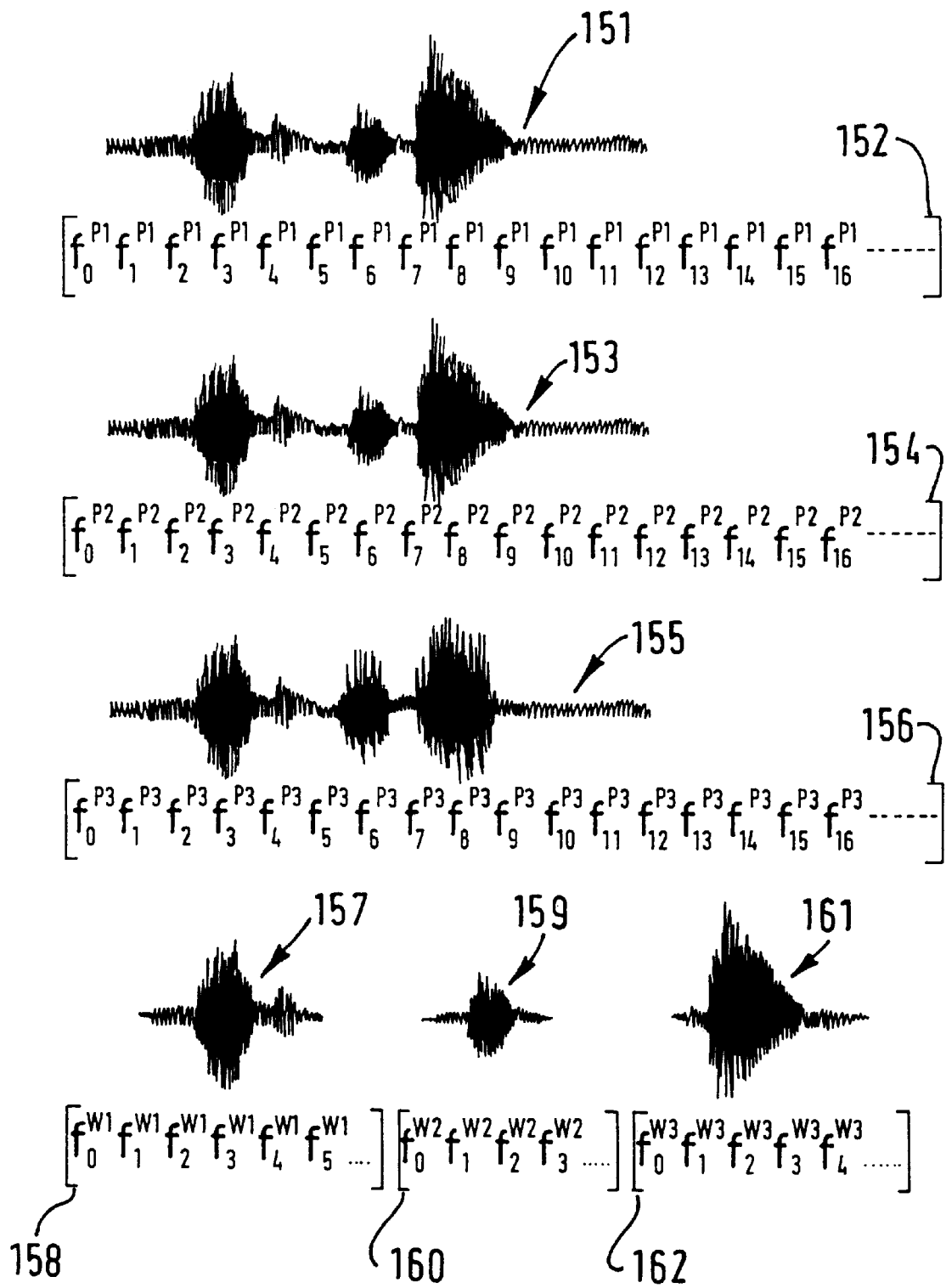
FIG. 13 is a schematic representation of a number of input phrases and words, and their corresponding sequences of parameter frames.

FIG. 13 shows speech signals 151 and 153 which represent the two utterances of the phrase "get an image" and speech signal 155 which represents the utterance of the phrase "get the earth". FIG. 13 also shows the speech signals 157, 159 and 161 which represent the isolated utterances of the words "get", "an" and "image" respectively. FIG. 13 also shows the two sequences of parameter frames 152 and 154 which correspond to the two utterances of the phrase "get an image", the sequence of parameter frames 156 corresponding to the utterance of the phrase "get the earth" and the sequences of parameter frames 158, 160 and 162 corresponding to the utterances of the isolated words "get", "an" and "image" respectively. Representations of the words "the" and "earth" are not shown in FIG. 13, since word models for these words cannot be generated as they do not appear in two or more phrases.

Figure 14:
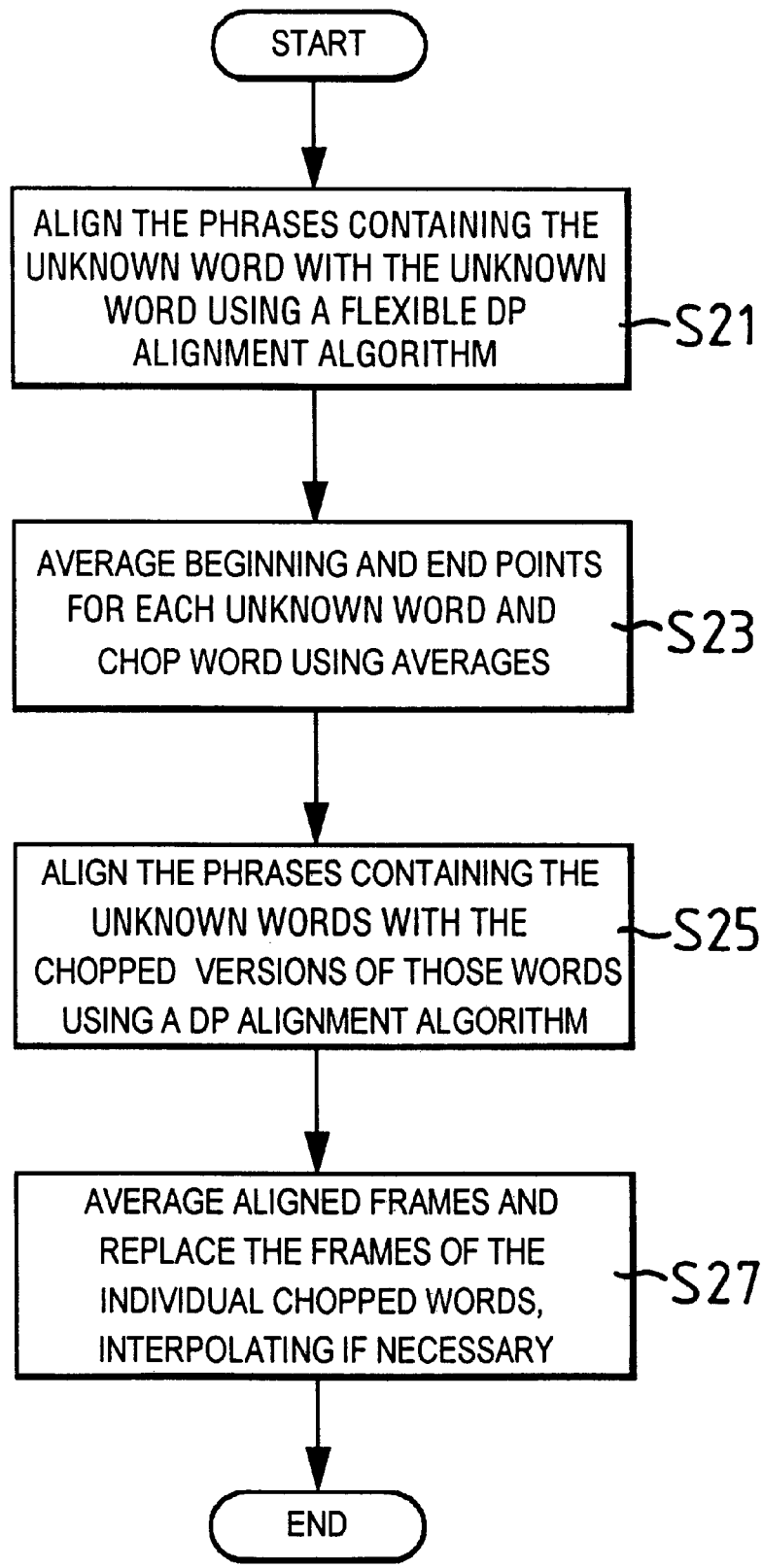
FIG. 14 is a flow chart which illustrates the steps taken in determining the word models from the input utterances, input during the training session.

FIG. 14 shows in more detail the steps required to generate a word model for each of the unknown words. In particular, in step S21 the sequences of parameter frames corresponding to the input phrases that contain the unknown words are aligned with the sequences of parameter frames corresponding to the unknown words when spoken in isolation, using a flexible dynamic programming alignment process which accommodates the initial lack of knowledge of the start and end points of the unknown words. In particular, a dynamic programming alignment process is used that does not constrain where the optimum alignment path of each word must begin or end. This flexible dynamic programming alignment process will be described in more detail later after dynamic programming alignment has been discussed.

The result of the flexible dynamic programming alignment is the identification of an approximate start and end point of each unknown word within the sequence of parameter frames for that unknown word. For example, when the sequence of parameter frames 152 corresponding to the first utterance of the phrase "get an image" is aligned with the sequence of parameter frames 158 corresponding to the utterance of the unknown word "get", a start and end point of that word within the sequence of parameter frames 158 are identified from the alignment results. As mentioned above, the parameter frames before the start point and after the end point correspond to background noise, or parts of the word which are not pronounced in the example phrases, and can therefore be removed.

The alignment performed in step S21 for the example training phrases will identify three sets of start and end points for the word "get" (since the word "get" appears in three phrases) and two sets of start and end points for the words "an" and "image" (since the words "an" and "image" appear in two phrases). In step S23 an average start and end point for each unknown word are determined and the frames before the average start frame and after the average end frame are discarded. For example, if after step S21 for the word "get" the start points identified using the three phrases 151, 153 and 155 are frame $f_8^{W1}$, frame $f_9^{W1}$ and frame $f_{13}^{W1}$, then the average is frame $f_{10}^{W1}$ ([8+9+13]/3) and all frames in the sequence of parameter frames 158 before frame $f_{10}^{W1}$ are discarded. A similar procedure is used for the end points, except that it is the frames beyond the end frame which are discarded. The resulting sequence of parameter frames for each word is the isolated word model mentioned above for that word.

Figure 15:
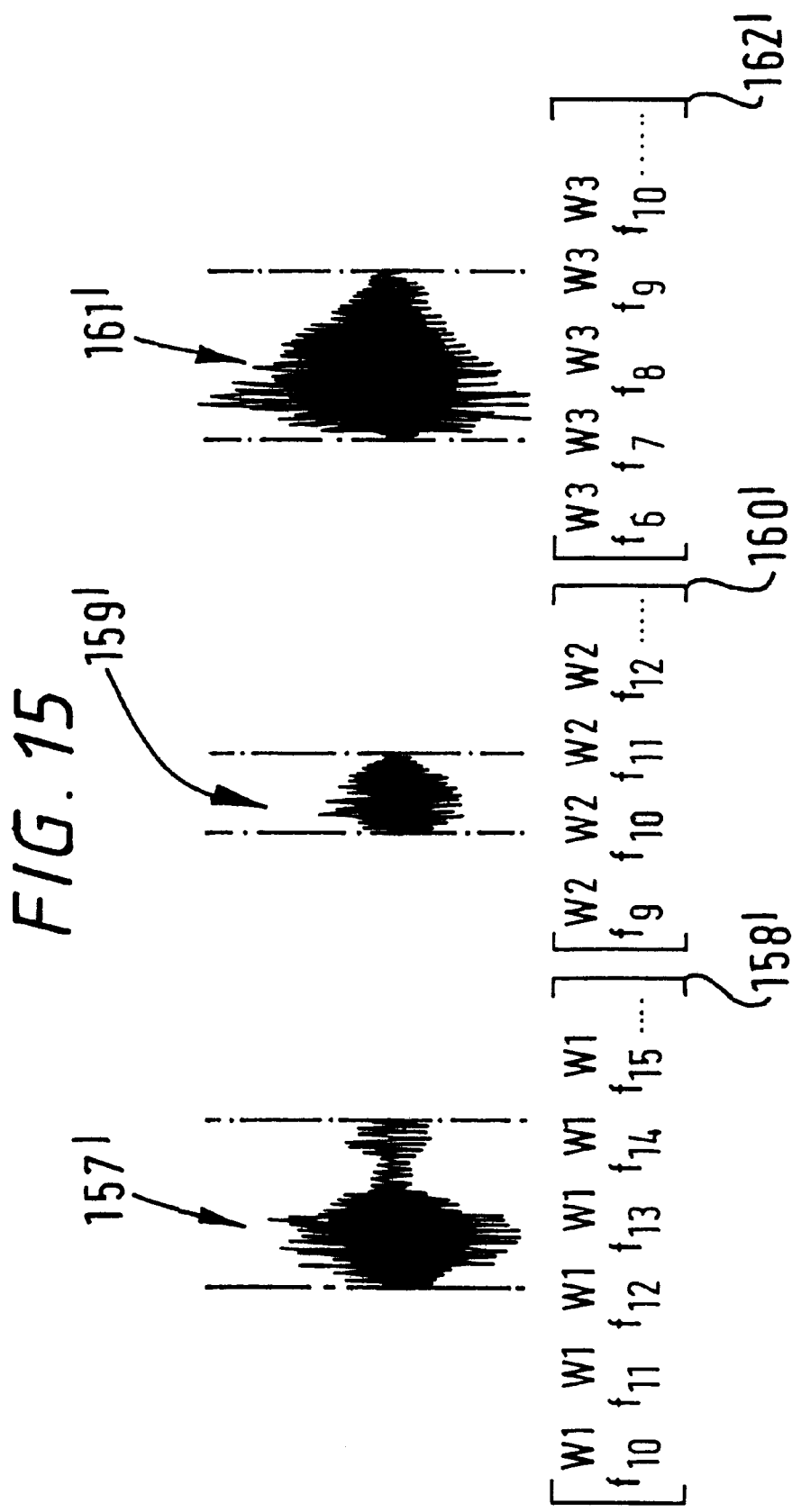
FIG. 15 is a schematic representation of training words and their corresponding sequences of parameter frames which have had their ends discarded.

FIG. 15 shows the speech signals 157', 159 and 161 and the corresponding sequences of parameter frames of the isolated word models 158', 160 and 162 for the words "get", "an" and "image" respectively. At this stage in the processing, the status flag 141, shown in FIG. 12, for each word processed is changed from FLEXI to CHOPPED to signify that the unknown words have had the frames from the beginning and ends removed.

Figure 16:
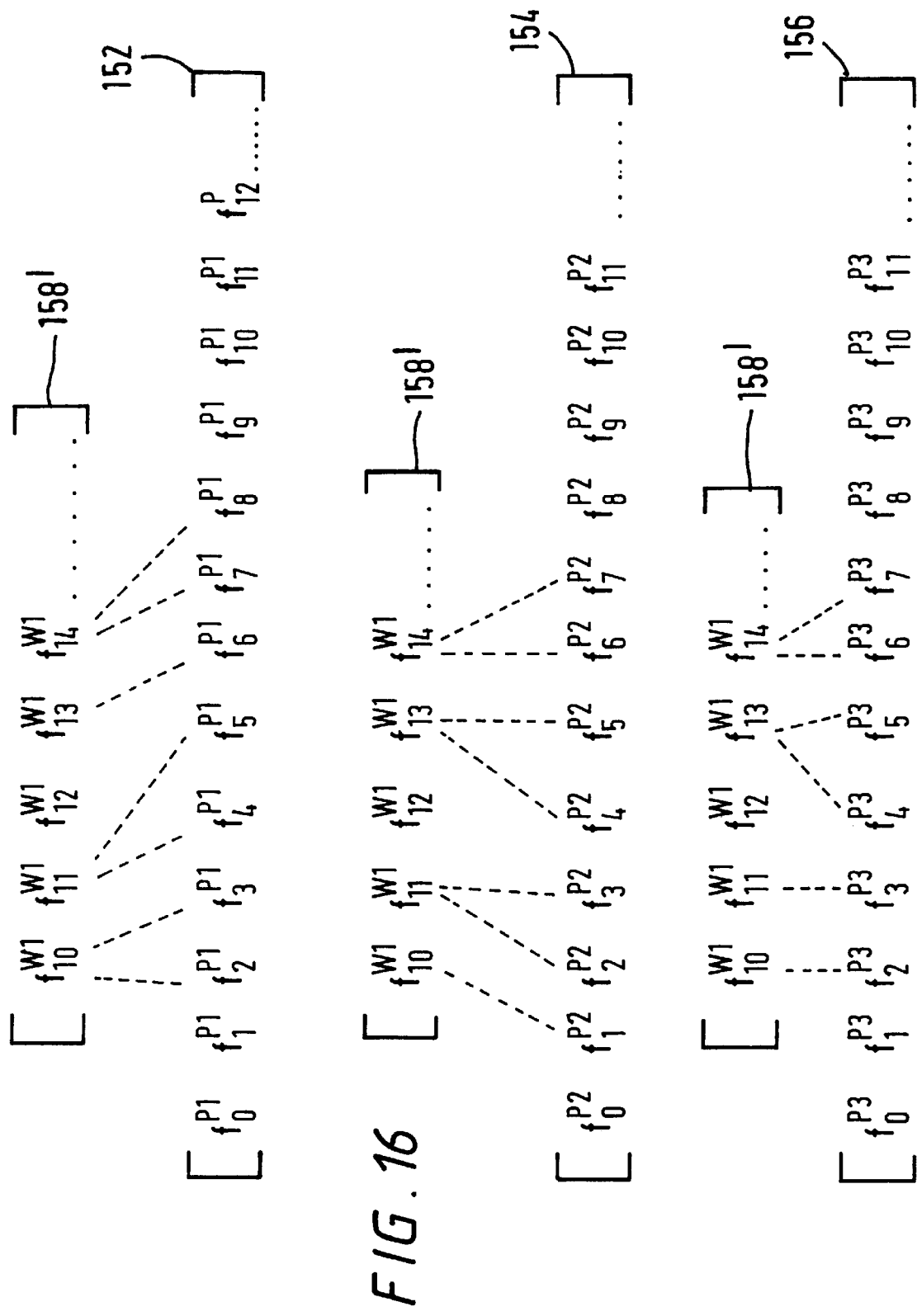
FIG. 16 is a schematic representation of the alignment between parameter frames of the word shown in FIG. 15 and parameter frames corresponding to the input phrases in which that word appears.

Next in step S25 shown in FIG. 14, the sequences of parameter frames corresponding to the input phrases are aligned with the sequences of parameter frames of the isolated word models for the words in those phrases. For example, the sequences of parameter frames 152, 154 and 156 corresponding to the utterances of phrases in which the word "get" appears are aligned with the sequence of parameter frames of the isolated word model 158' for the word "get". FIG. 16 shows the resulting alignment achieved between the sequences 152, 154 and 156 and the sequence 158', where the dashed lines represent the alignment between the frames. As shown, it is established that frames $f_2^{P1}$ and $f_3^{P1}$ are aligned with frame $f_{10}^{W1}$, and frames $f_4^{P1}$ and $f_5^{P1}$ are aligned with frame $f_{11}^{W1}$ etc.

Next in step S27 shown in FIG. 14, a reference model for the unknown word is generated by replacing the individual frames of the isolated word model with the average of the aligned frames from the sequences of parameter frames corresponding to the phrases. For example, for the sequence of parameter frames of the isolated word model 158' shown in FIG. 16, frame $f_{10}^{W1}$ is replaced by the average of frames $f_2^{P1}, f_3^{P1}, f_1^{P2}$ and $f_2^{P3}$, whilst frame $f_{11}^{W1}$ is replaced by the average of frames $f_4^{P1}, f_5^{P1}, f_2^{P2}, f_3^{P2}$ and $f_3^{P3}$ etc. In the event that there are no frames of a phrase aligned with one of the frames of the isolated word model, then that particular frame is replaced by a frame derived by interpolating between or extrapolating from neighbouring replaced frames. Therefore, for the sequence of parameter frames 158' shown in FIG. 16, frame $f_{12}^{W1}$ is not aligned with any of the frames in the sequences of parameter frames 152, 154 or 156, and is replaced by a frame derived by interpolating between the substituted frames for $f_{11}^{W1}$ and $f_{13}^{W1}$. Alternatively, the frames of the isolated word model which are not aligned with any frames of the phrase can be discarded.

The reference word models generated in step S27 are ready for use in the speech recognition part of the system, which will be described further below. Therefore, the status flag 141 of each word that has been processed is changed from CHOPPED to IN-USE.

Figure 17A:
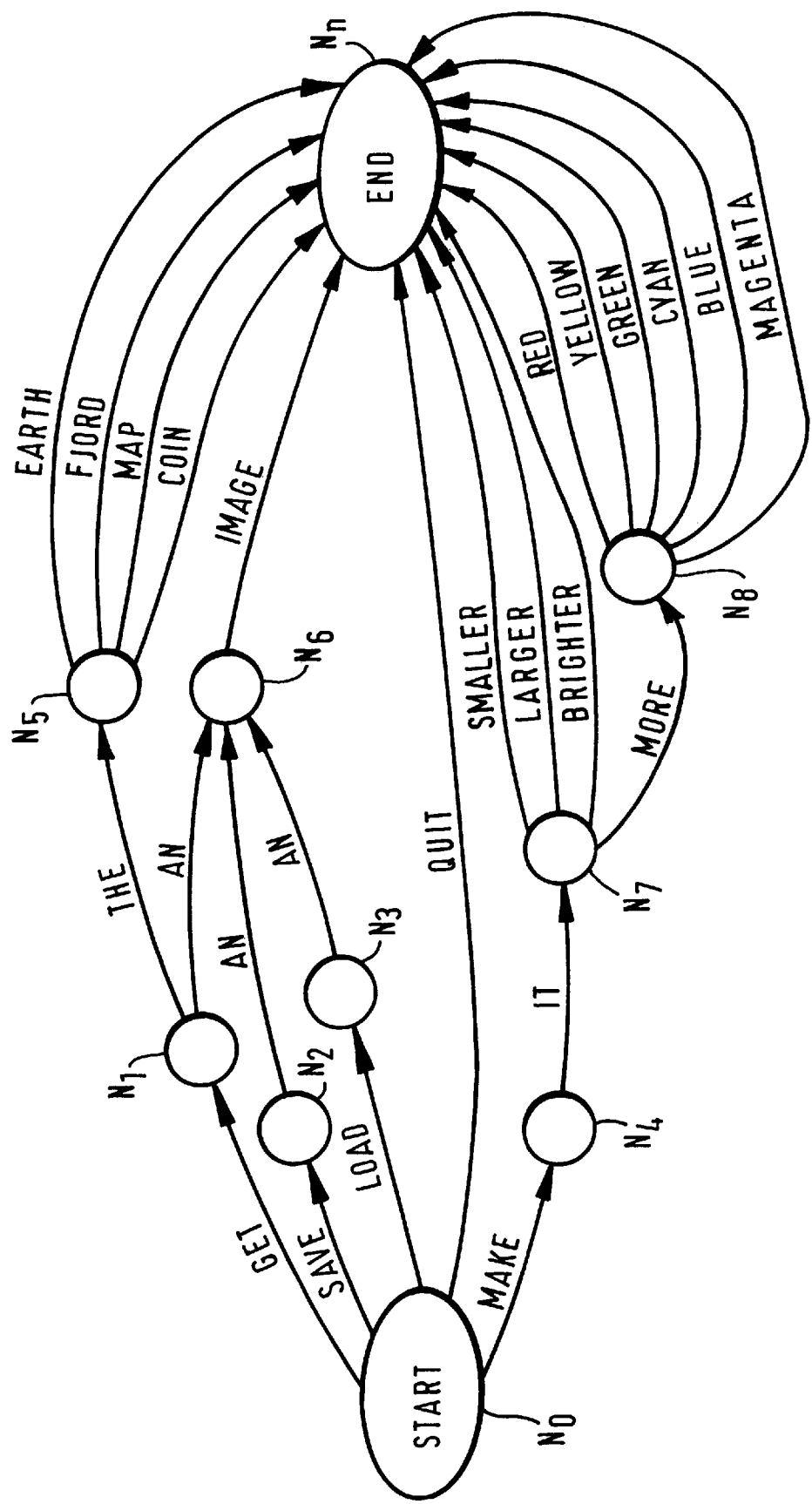
FIG. 17a is a schematic representation of a language model generated during the training process for a number of example input phrases.
Figure 17B:
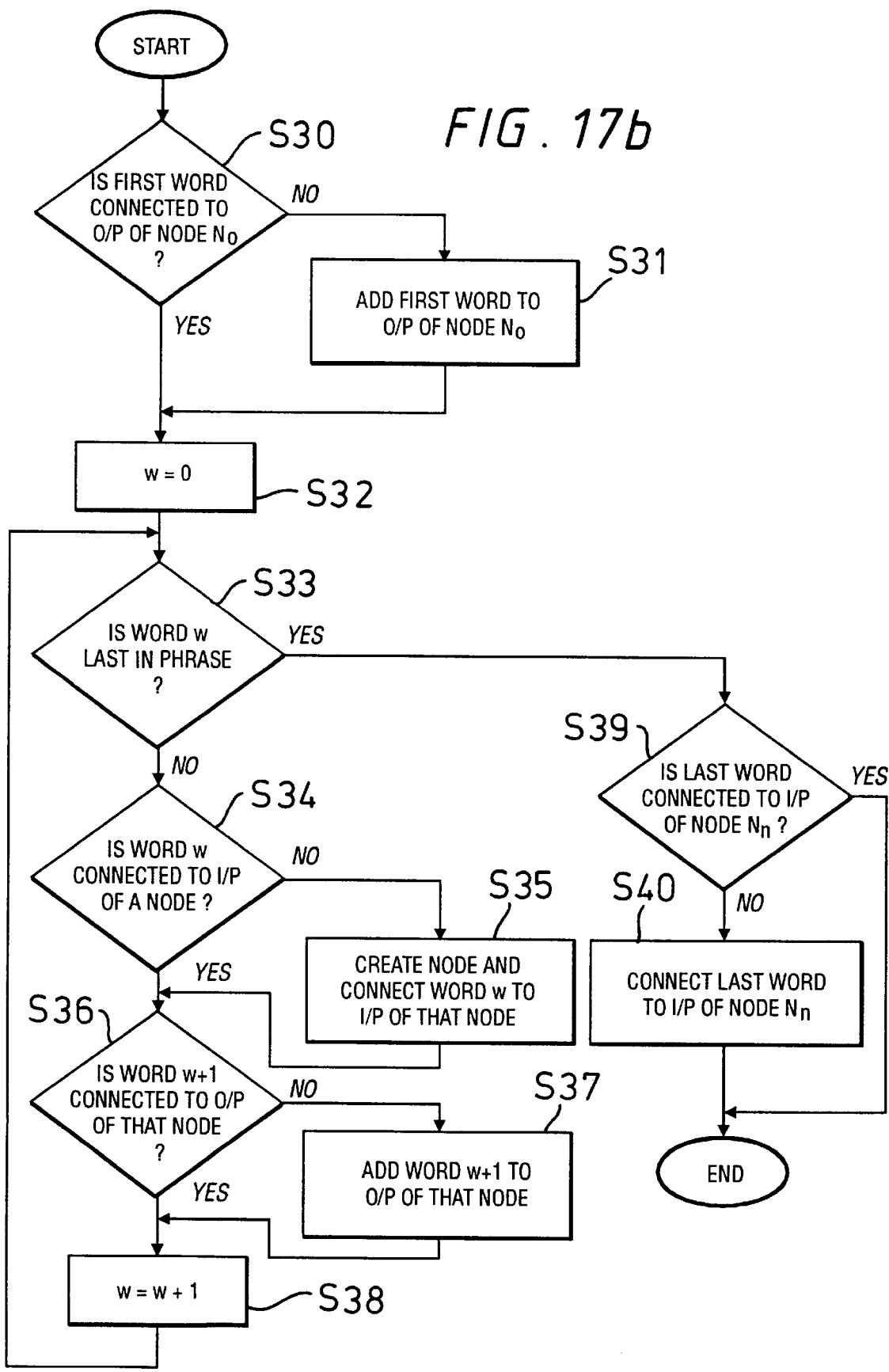
FIG. 17b is a flow chart which illustrates the manner in which the system adds a new phrase to the language model.

Once a reference word model has been created for all the words in a phrase, then that phrase can be added to the language model 21 shown in FIG. 2. In this embodiment, the language model 21 is similar to a Bigram model, and comprises a mesh of interconnected nodes, where the interconnections represent the words known to the system. It does not, however, contain any grammatical rules concerning, for example, correct English language usage. It only constrains which words can follow others based on the phrases known to it. FIG. 17a illustrates the language model 21 derived when the following phrases have been learnt by the system:

| | |
|---|---|
| get an image - | phrase 1 |
| get the earth - | phrase 2 |
| get the fjord - | phrase 3 |
| get the map - | phrase 4 |
| get the coin - | phrase 5 |
| save an image - | phrase 6 |
| load an image - | phrase 7 |
| make it smaller - | phrase 8 |
| make it larger - | phrase 9 |
| make it brighter - | phrase 10 |
| make it more red - | phrase 11 |
| make it more yellow - | phrase 12 |
| make it more green - | phrase 13 |
| make it more cyan - | phrase 14 |
| make it more blue - | phrase 15 |

-continued

| | |
|---|---|
| make it more magenta - | phrase 16 |
| quit - | phrase 17 |

As shown in FIG. 17a there is a start node $N_0$, an end node $N_n$ and eight intermediate nodes $N_1$ to $N_8$. For an input phrase to be recognised the system must find a path from the start node $N_0$ to the end node $N_n$. The system is, however, reasonably flexible in that once trained and the user inputs the phrase "make smaller" instead of "make it smaller" the system will still recognise the input phrase. The system will not, however, recognise a phrase that is input if that phrase is not known to the system even if the individual words in the phrase are known, i.e. for the language model given above, if the user says "save the image" the system will not recognise this input even though it knows the words "save", "the" and "image".

The language model 21 is created by extracting the necessary word sequence constraints from the text input in step S3 in FIG. 11 and is updated after each new phrase has been input provided there is a word model for each of the words in the phrase. The way in which the language model 21 is updated will now be described with reference to FIG. 17b.

When a new input phrase has been input and a word model for each word in the phrase has been determined, the system identifies in step S30, whether the first word in the phrase is already connected to the output of the start node No. If it is, then the processing proceeds to step S32. If on the other hand, the first word is not already connected to the output of the start node $N_0$, then a new output from the start node $N_0$ is added, in step S31, for the first word.

The processing then proceeds to step S32 where the system initialises a word loop counter w, which is used to count through all the words in the phrase. The processing then proceeds to step S33 where the system determines whether or not word w is the last word in the phrase. If it is not, then the processing proceeds to step S34 where the system determines whether or not word w is connected to the input of a node (except the end node $N_n$). If it is, then the processing proceeds to step S36 where the system checks to see if the next word w+1 is connected to the output of the node that has word w as an input. If on the other hand, at step S34, the system determines that word w is not connected to the input of any node, then the processing proceeds to step S35 where a new node is created and word w is connected to the input of that new node. The processing then proceeds to step S36 described above.

If the system determines, in step S36, that the next word w+1 is not connected to the output of the node that has word w as an input, then the processing proceeds to step S37 where the next word w+1 is added as an output of that node. If on the other hand the system determines, in step S36, that the next word w+1 is already connected to the output of the node that has word w as an input, then nothing happens and the processing proceeds to step S38 where the word counter w is incremented. The processing then returns to step S33 and a similar procedure is carried out for the next word in the phrase. If the system determines at step S33 that word w is the last word in the phrase, then the processing proceeds to step S39 where the system determines whether or not the last word is already connected to the input of the end node $N_n$. If it is not connected to the input of the end node $N_n$ then the processing proceeds to step S40 where the system connects the last word in the phrase to the input of the end node $N_n$. If the last word is already connected to the last node $N_n$, or once the last word has been connected to the last node $N_n$ in step S40, then the processing is complete and the phrase now forms part of the language model 21.

One feature of the training process is that the system can be taught the phrases individually or it can be taught a number of phrases at once. Further, if a new phrase is input and the system already has word models for some of the words in that phrase, then it only needs to generate word models for the unknown words before it can update the language model 21.

Dynamic Programming (DP)

In the processing performed in steps S21 and S25 of FIG. 14, an alignment procedure was used to align the parameter frames of the phrases with the parameter frames of the words. In order to align the two sequences of parameter frames in an effective manner, the alignment process must be able to compensate for the different rates at which the word is spoken, for example when the word is spoken in isolation and when the word is embedded within the continuously spoken phrase. The dynamic programming (DP) alignment process mentioned above is one way which can match one word onto another in a way which applies the optimum non-linear time-scale distortion to achieve the best match at all points.

Figure 18:
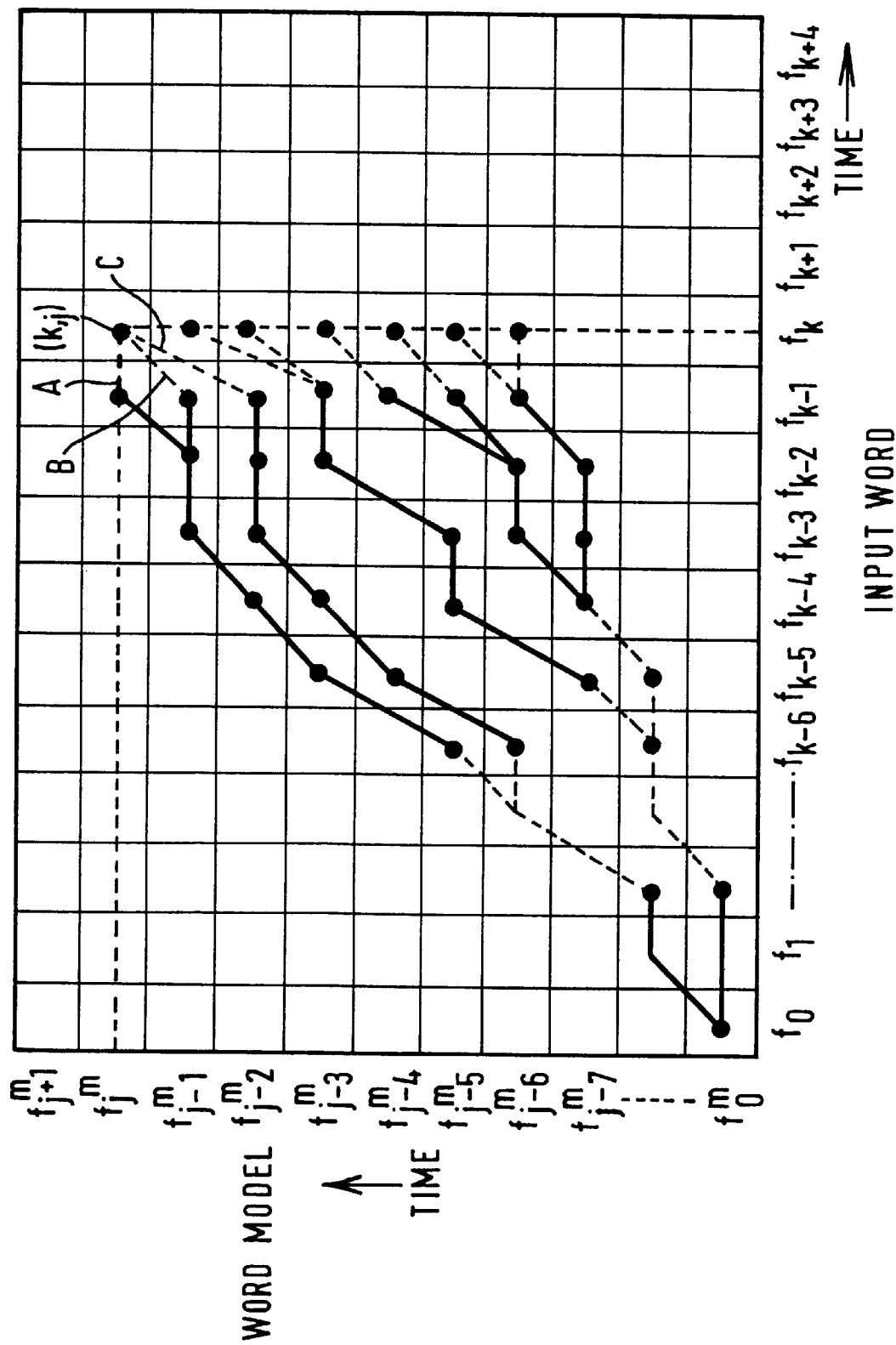
FIG. 18 is a schematic representation of the processing performed when an input word is aligned with a word model using a dynamic processing technique.
Figure 19:
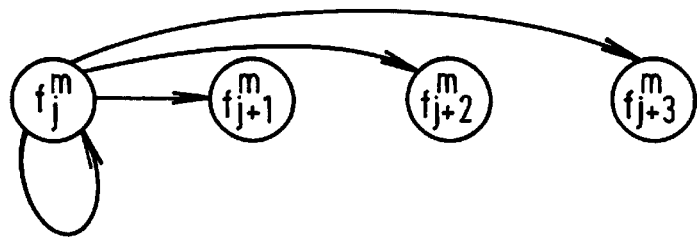
FIG. 19 is a schematic representation of an allowed state transition sequence from one input frame to the next.
Figure 20:
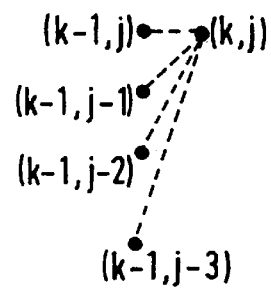
FIG. 20 is an alternate representation of the allowed state transition sequence shown in FIG. 19.

An overview of the DP matching process will now be given with reference to FIGS. 18–20. FIG. 18 shows along the abscissa a sequence of parameter frames representative of an input word, and along the ordinate a sequence of parameter frames representative of a word model. Comparing this example with the processing performed in step S25 in FIG. 14, the sequence of parameter frames representative of the input word may represent part of the sequence of parameter frames corresponding to one of the input phrases, and the sequence of parameter frames representative of the word model may represent the sequence of frames representing one of the chopped words.

To find the total difference between the word model and the input word, it is necessary to find the sum of all distances between the individual pairs of frames along whichever path between the bottom left and top right corners in FIG. 18 that gives the smallest cumulative distance. This definition will ensure that corresponding frames of similar words are correctly aligned. One way of calculating this total distance is to consider all possible paths and add the value of $d(k,j)$ (the distance between frame k and frame j) for each point along each one. The distance measured between the two words is then taken to be the lowest value obtained for the cumulative distance. Although this method gives the correct answer, the number of valid paths becomes so large that the computation is impossible for any practical speech recognition system.

Dynamic programming is a mathematical technique which finds the cumulative distance along the optimum path without having to calculate the distance along all possible paths. The number of paths along which the cumulative distance is determined can be reduced further by placing certain constraints on the DP process. For example, it can be assumed that the optimum path will always go forward with a non-negative slope, otherwise one of the words will be a time reversed version of the other. Another constraint that can be placed on the DP process is to limit the maximum amount of time compression/expansion of the input word relative to the reference word. In this embodiment, this constraint is realised by limiting the number of frames that can be skipped or repeated in the matching process. For example, in FIG. 19 the frame sequence is constrained such that if frame $f_k$ is matched to frame $f_j^m$ then frame $f_{k+1}$ can be matched with frame $f_j^m$, $f_{j+1}^m$, $f_{j+2}^m$ or $f_{j+3}^m$. Therefore, if parameter frame $f_k$ of the input word and parameter frame $f_j^m$ of the word model lie on the optimum path then the above constraint necessitates that the immediately preceding point on the optimum path must be either (k−1,j), (k−1,j−1), (k−1,j−2) or (k−1,j−3), as illustrated in FIG. 20.

FIG. 18 shows the "valid paths" which are propagated up to frame $f_{k-1}$ which represent possible matchings between the input word and the word model. When frame $f_k$ is applied to the recognition unit 17 each valid path has the local distance between current frame $f_k$ and the frame of the word model that is at the end of that valid path added to its cumulative distance. If a number of valid paths meet at the same point then the valid path with the lowest cumulative distance is continued and the others are discarded. For example, in FIG. 18 path SA, B and C meet at point (k,j) and the path (A, B or C) with the lowest cumulative distance is continued whereas the other two are discarded.

Therefore, if D(k,j) is the cumulative distance along a valid path from the beginning of the word to the point (k,j), i.e.:

$$D(k, j) = \sum_{\substack{x,y=1 \\ \text{along a} \\ \text{valid path}}}^{k,j} d(x, y) \qquad (5)$$

Then, with the above constraints it follows that:

$$D(k, j) = d(k, j) + \min[D(k-1, j), D(k-1, j-1), D(k-1, j-2), D(k-1, j-3)] \qquad (6)$$

With the above constraints, the value of D(0,0) must equal d(0,0), d(1,0), d(2,0) or d(3,0), as all possible paths must begin at one of these points. Therefore, starting from one of the starting points, the value of D(k,j) can be determined via a recursive processing routine. When the routine reaches the end of the words to be matched, the minimum cumulative distance calculated by the DP process represents the score for the best way of matching the two words. If the input utterance to be recognised comprises a sequence of words then back-pointers must be used to indicate the direction that has been taken, so that after the DP process identifies the end of the optimum path, it is possible to recognise the input utterance by tracing back through the back-pointers.

Although the DP process described above provides a large computational saving compared with the exhaustive search of all possible paths, the remaining computation can be substantial, particularly if each incoming word has to be compared with a large number of word models for matching. Any possible saving in computation which does not significantly affect the accuracy of the recognition result is therefore desirable. One possible computational saving is to prevent paths that are scoring badly from propagating further. This is sometimes known as pruning because the growing paths are like branches of a tree. By pruning the paths in this way, only a narrow band of possible paths are considered which lie on either side of the best path. It will be appreciated that where such pruning is used it can no longer be guaranteed that the dynamic programming process will find the optimum path. However, with a pruning threshold that reduces the average amount of computation by, for example a factor of 5 to 10, the right path will almost always be obtained where the words are fairly similar.

In this embodiment, the recognition block 17 shown in FIG. 2 uses a dynamic programming matching process similar to the one described above, for matching the sequence of parameter frames for the utterance to be recognised with the word models 19 and noise model 23.

Recognition Search

Another feature of the speech recognition system according to this embodiment is the manner in which the dynamic programming process is implemented. In particular, this embodiment makes use of the fact that the minimum calculation performed in equation (6) above, i.e.

$$\min[D(k-1,j), D(k-1,j-1), D(k-1,j-2), D(k-2,j-3)] \qquad (7)$$

does not depend upon the current frame $f_k$ being processed. Therefore, this part of equation (6) can be calculated when the previous frame $f_{k-1}$ is being processed.

The manner in which the dynamic programming process is implemented will now be explained with reference to FIGS. 21 to 31.

Figure 21:
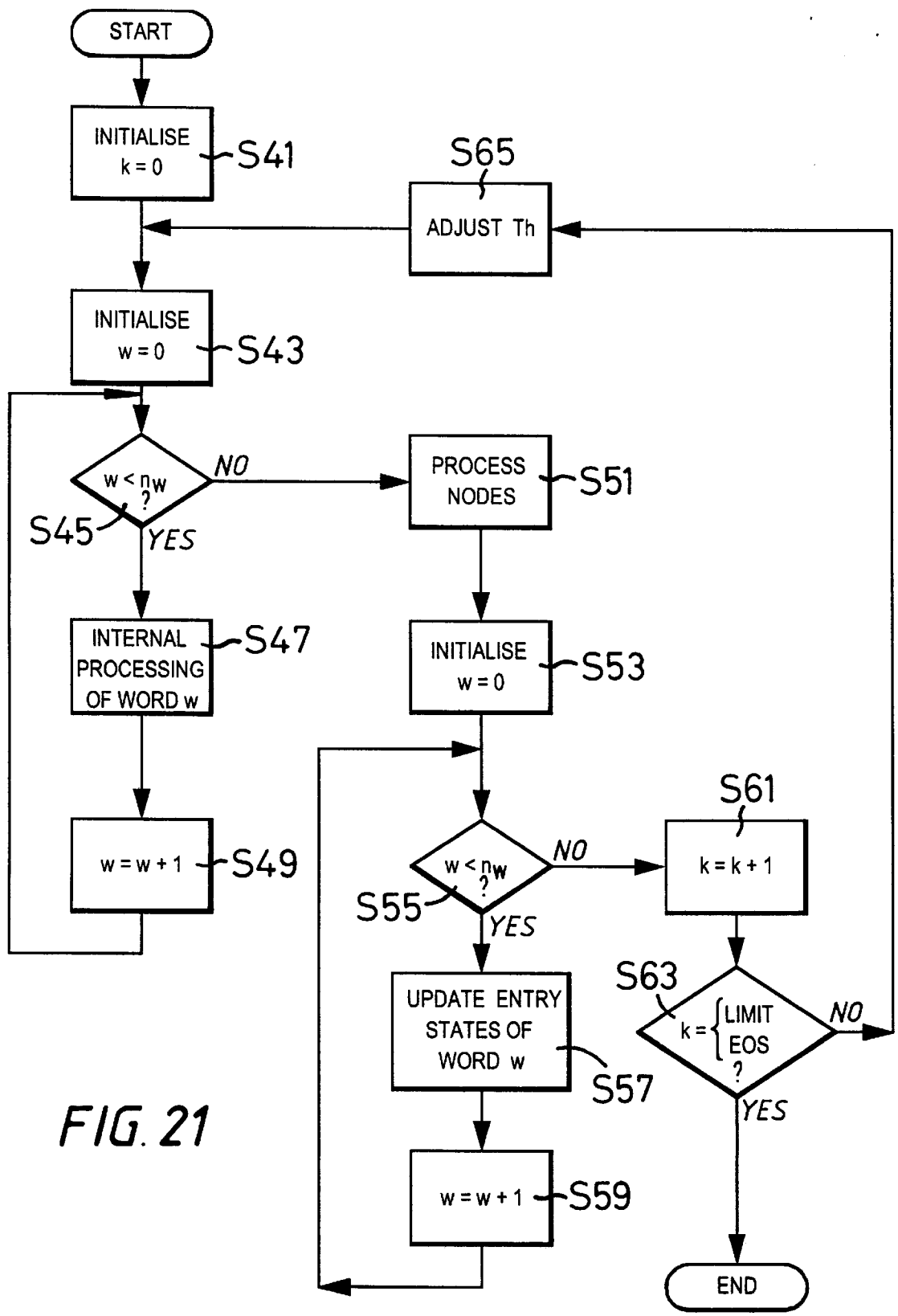
FIG. 21 is a flow chart which illustrates the implementation of the dynamic programming alignment technique used in the first embodiment.

FIG. 21 is a flow chart illustrating the processing performed in the recognition block 17 when an input utterance is to be recognised. The system processes the parameter frames of the input utterance in the sequence that they are generated by the preprocessor 15. For this purpose a frame counter variable k is provided which is initialised to zero in step S41 and is subsequently incremented after each frame is processed in step S61. Each frame being processed is used in step S47 to update the cumulative distances of the remaining valid paths within each word model. For this purpose a word counter w is provided and initialised in step S43 and incremented after step S47 in step S49. In step S45 the system checks to see if all the word models have been processed using the current frame, i.e. it checks to see whether the word counter w is less than the number of words known to the system $n_w$.

Once each word model has been processed using the current frame $f_k$ the processing passes to step S51 where the nodes of the language model 21 shown in FIG. 17a are processed using the current frame. The processing performed in step S51 takes care of the situation where the current parameter frame corresponds to silence at the beginning or end of the input speech or between allowed sequences of words in the input speech. This processing also ensures that the valid paths can only propagate through allowed sequences of words.

After the nodes have been processed in step S51, the cumulative distances for the valid paths which end at one of the beginning or "entry states" of each word model are updated in step S57. This processing is to cope with the situation where the next parameter frame $f_{k+1}$ is matched with the beginning of a word model, when the current parameter frame $f_k$ is matched with the end of another word model. To achieve this, the word counter w is re-initialised to zero in step S53, and the system checks, in step S55, whether all the word models have been processed. The system then updates, in step S57, the cumulative distances for the entry states of the current word model, and the word count w is incremented in step S59. The processing then returns to step S55.

After all the word models have been processed for the current parameter frame $f_k$, the parameter frame counter variable k is incremented in step S61. The system then determines, in step S63, whether there are any more parameter frames of the input utterance to be processed. This is done by comparing k with the system limit (LIMIT) and the end of speech identifier (EOS) in step S63. The system limit is defined by the size of buffer used to store the speech samples output from ADC 63 shown in FIG. 3.

If all the parameter frames of the incoming utterance have been processed, then the DP process is complete and a backtracking algorithm is used to determine the optimum path, and hence the recognition result. If on the other hand, the system determines, at step S63, that there are further parameter frames to be processed, then the system adjusts the pruning threshold in step S65 and the processing returns to step S43. The pruning threshold Th is adjusted in step S67 to limit the number of valid paths that will be processed in steps S47, S51 and S57 when the next input frame is being processed.

Figure 22:
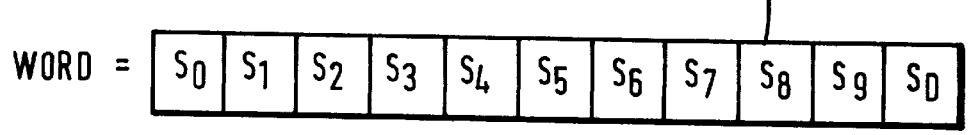
FIG. 22 is a schematic representation of a word model and a current active list and new active list associated therewith.

The processing performed in step S47 of FIG. 21 will now be described in more detail with reference to FIGS. 22 to 26 for a particular example of a word model. In particular, FIG. 22 shows an example word model 201 which comprises a sequence of states $S_0$ to $S_9$ derived during a training session, and an exit state $S_D$ at the end of the word model 201, the purpose of which will be described below.

Each state S of the word model 201 has associated therewith a cumulative distance store D[S] which stores the cumulative distance of a valid path which ends at that state. In this embodiment, the word model 201 also has associated therewith a current active list 203 for the current frame $f_k$ which lists, in descending order, the states in the word model that are at the end of a valid path for the current frame $f_k$. Therefore, each state in the current active list 203 will store the cumulative distance of the valid path that ends at that state. In this particular example, the current active list 203 for the current frame $f_k$ lists states $S_7$, $S_5$, $S_4$, $S_3$, $S_2$, $S_1$ and $S_0$. The states on the current active list 203 will be referred to as active states. In this embodiment, the word model 201 also has associated therewith a new active list 205, which is completed during the processing performed in step S47 and which lists the states in the word model 201 that will be at the end of a valid path for the next frame $f_{k+1}$.

Figure 23:
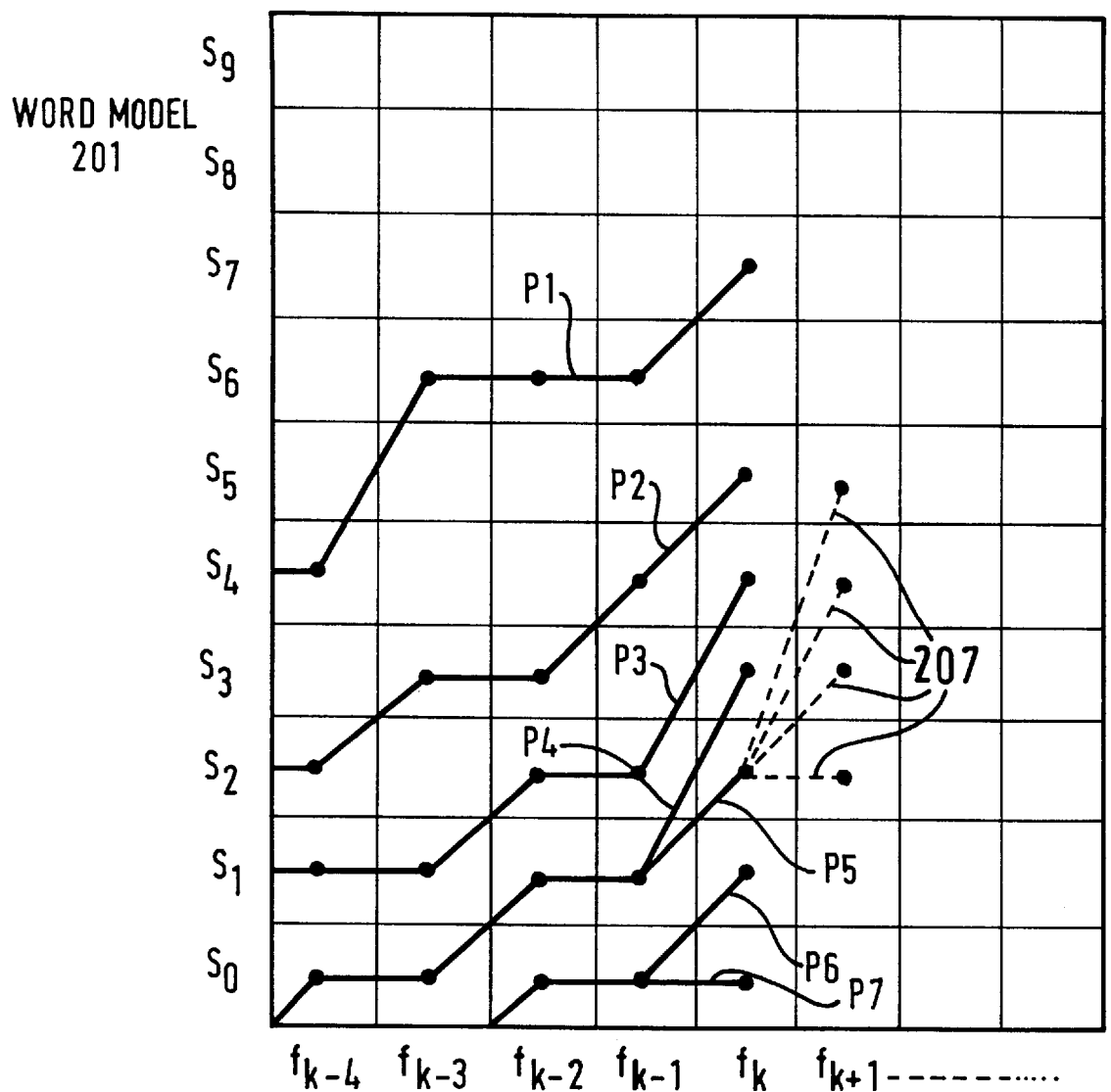
FIG. 23 is a schematic diagram which illustrates a number of example dynamic programming paths propagating within a reference model.

The significance of the current active list 203 and the new active list 205 will now be explained with reference to FIG. 23. In particular, FIG. 23 shows seven valid paths p1 to p7 which represent seven possible matchings between the incoming word and the word model 201 up to the current frame $f_k$. As shown, the seven valid paths p1 to p7 end at word model 201 states $S_7$, $S_5$, $S_4$, $S_3$, $S_2$, $S_1$ and $S_0$ respectively, and it is these end states of the valid paths that are listed, in descending order, in the current active list 203. To determine the states that are to be in the new active list 205, i.e. to determine the paths remaining for the next input frame $f_{k+1}$, consideration has to be given to the state transitions that are allowed from one input parameter frame to the next.

The maximum amount of time compression of the reference models relative to the incoming utterance is determined by the maximum number of states that can be skipped between adjacent frames of the incoming utterance. In this embodiment, this is set to two, i.e. the DP process follows the state transition diagram shown in FIG. 19. The maximum amount of time expansion of the reference models relative to the incoming utterance is determined by the maximum number of consecutive incoming frames which can be matched to the same state. In this embodiment, only three consecutive frames can be matched to the same state. To monitor for this situation, each state S has associated therewith a self-repetition counter, SELF, which is incremented whenever the same valid path ends at that state from one input frame $f_k$ to the next $f_{k+1}$. Therefore, for example, path p5 may propagate along one or all of the dashed paths 207 shown in FIG. 23. The other paths p1 to p4 and p6 to p7 shown in FIG. 23 will propagate in a similar manner. If two or more paths meet at the same point, then the path having the lowest cumulative distance is maintained and the others are discarded. Further, if the cumulative distance of a path is greater than the pruning threshold then this path will also be discarded. In this way, new paths are continuously being created whilst others are discarded. The aim of the pruning threshold is to limit the number of valid paths that are processed for each input parameter frame, thereby placing a limit on the amount of time and memory required for the algorithm.

Figure 24:
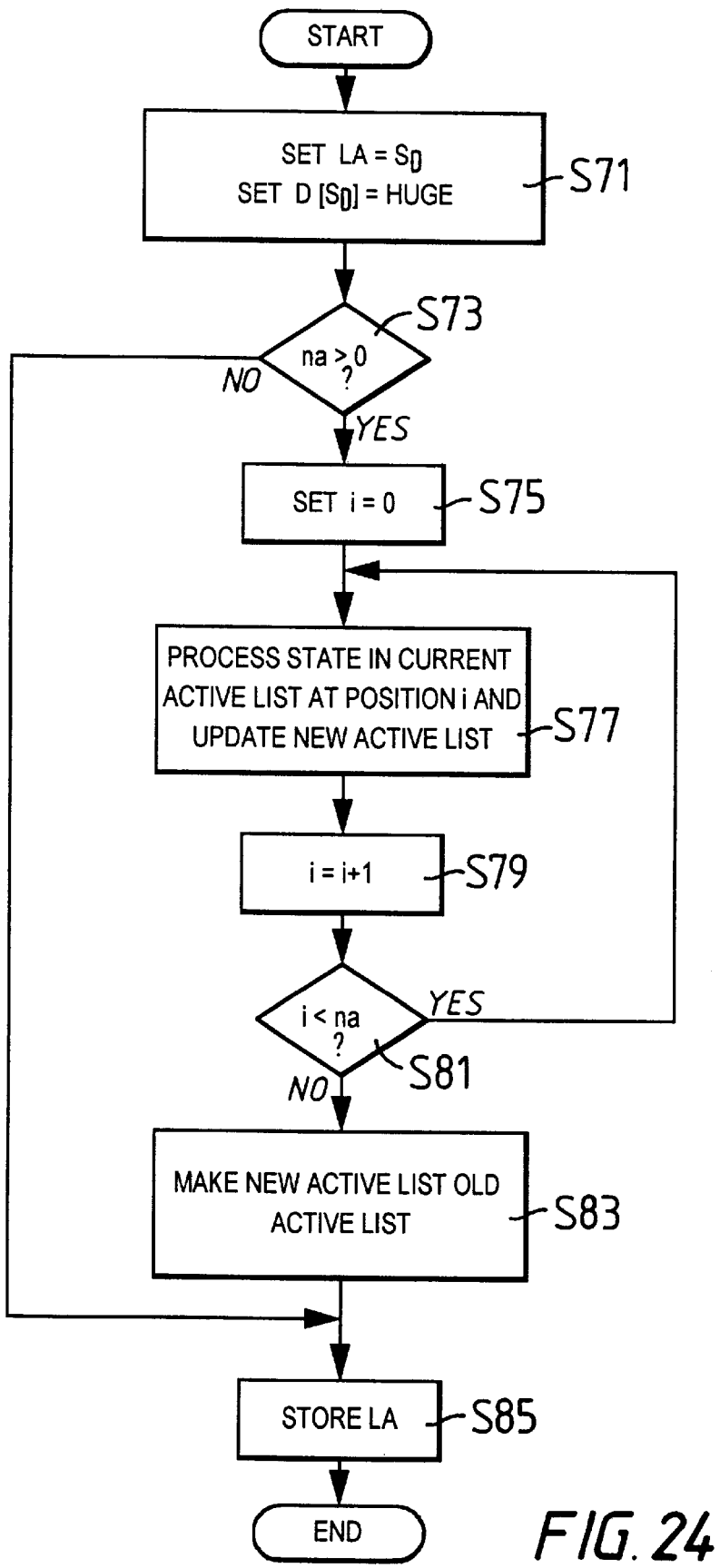
FIG. 24 is a flow chart which illustrates the steps involved in step S47 shown in FIG. 21.

FIG. 24 shows in more detail the processing steps performed in step S47 of FIG. 21. In particular, in step S71 a pointer LA is initialised and the cumulative distance stored in the exit state, i.e. $D[S_D]$, of word model 201 is set to a very large value, HUGE. The pointer LA is used to point to the last active state that has been placed in the new active list 205. Initially, there are no active states in the new active list 205 and so pointer LA is set to point to the exit state $S_D$. In step S73 the system then checks to see if there are any active states in the current active list 203. In other words, a check is made to see if there are any valid paths ending in the current word for the current frame $f_k$. In the present example there are seven active states in the current active list 203 and the system processes each in turn. A count variable i is provided, which is used to count through the active states on the current active list 203, and which is set to zero in step S75 and incremented in step S79 until all the active states in the current active list 203 have been processed. The system determines whether all the active states have been processed by comparing, in step S81, the value of the count variable i with the number $n_a$ of active states in the current active list 203.

Once all the active states on the current active list 203 have been processed, the new active list 205 generated during the processing in step S77 is changed, in step S83, to be the current active list 203 for the next frame $f_{k+1}$ of the input utterance to be processed. In practice this is achieved by swapping the pointers that are used to point to the two active lists. The old current active list then being overwritten during the processing of the next input frame $f_{k+1}$. Finally in step S85 the last state that was activated and put on the new active list 205, indicated by pointer LA, is stored for use in step S57 shown in FIG. 21.

Figure 25:
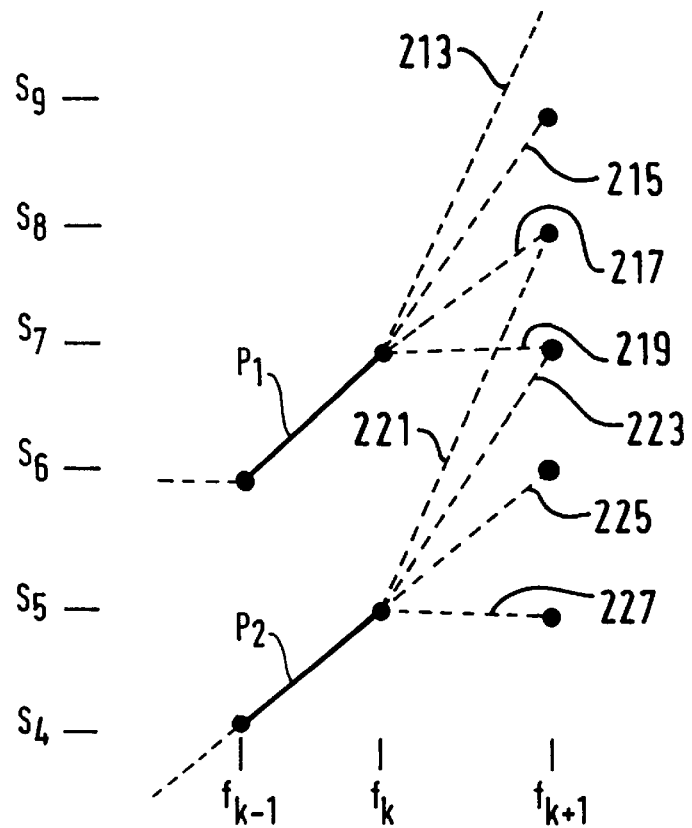
FIG. 25 is a schematic diagram which illustrates the manner in which two of the dynamic programming paths shown in FIG. 23 can propagate from the current input frame to the next.

An overview of the processing performed in step S77 will now be given by taking as examples, active states $S_7$ and $S_5$, which are at the ends of paths p1 and p2 respectively, as shown in FIG. 23. FIG. 25 shows part of the two valid paths p1 and p2 that end at states $S_7$ and $S_5$ respectively at the current frame $f_k$. The dashed lines in FIG. 25 show the ways in which each of the two paths p1 and p2 may propagate at the next frame $f_{k+1}$. As indicated by dashed line 213 it is possible for path p1 to extend into another word at frame $f_{k+1}$. Therefore, the cumulative distance of path p1 (which is stored in active state $S_7$) is copied into the exit state $S_D$. As indicated by dashed lines 215, 217 and 219 path p1 can also propagate to state $S_9$, state $S_8$ and state $S_7$ respectively. Therefore, the cumulative distance of path p1 is also copied into these states. States $S_9$, $S_8$ and $S_7$ are then added, in descending order, to the new active list 205 (but not the exit state which is never actually compared with the incoming frames, and is only used to store the minimum cumulative distance of all the paths that leave the word) and the last active pointer LA is set to point to the last state added (i.e. state $S_7$).

Figure 26A:
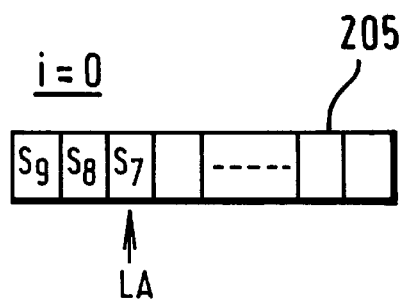
FIG. 26a is a schematic diagram illustrating the contents of the new active list shown in FIG. 22 after the first state in the current active list for the word model shown in FIG. 22 has been processed.

Referring to FIG. 26a, the new active list 205 is shown after the first state $S_7$ on the current active list 203 has been processed. As shown, state $S_9$, state $S_8$ and state $S_7$ are in the first three elements of the new active list 205 respectively, and the last active pointer LA points to state $S_7$.

Referring back to FIG. 25, as indicated by dashed lines 221, 223, 225 and 227 path p2 can propagate to state $S_8$, state $S_7$, state $S_6$ and state $S_5$ respectively. However, the cumulative distance for path p2 is not simply copied into each of these states, since two of the states $S_8$ and $S_7$ already have a cumulative distance stored therein for the next frame $f_{k+1}$. For these two states, a comparison is made between the cumulative distances already stored therein and the cumulative distances associated with path p2, and the smallest is copied into those two states. In other words the cumulative distance stored in $S_8$ and $S_7$ for the paths shown in FIG. 23 and after processing active state $S_5$ is given by min(D[$S_7$], D[$S_5$]). On the other hand, the cumulative distance stored in active state $S_5$ can be copied directly into state $S_6$ since a cumulative distance for the next frame $f_{k+1}$ has not previously been stored therein. The two states $S_6$ and $S_5$ (since state $S_5$ has not repeated twice) are then added to the new active list 205 and the last active pointer LA is set to point to state $S_5$.

Figure 26B:
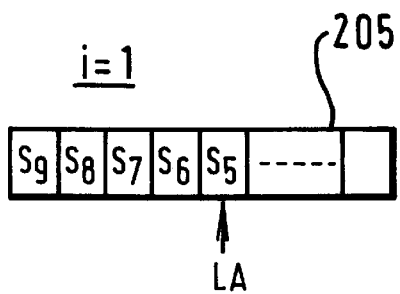
FIG. 26b is a schematic diagram illustrating the contents of the new active list shown in FIG. 22 after the second state in the current active list for the word model shown in FIG. 22 has been processed.

Referring now to FIG. 26b, the new active list 205 is shown after the second active state $S_5$ on the current active list 203 has been processed. As shown, states $S_9$, $S_8$, $S_7$, $S_6$ and $S_5$ are in the first five elements of the new active list 205 respectively, and the last active pointer LA points to state $S_5$. The remaining active states on the current active list 203 are processed in an identical manner and then the processing proceeds to step S49 shown in FIG. 21, where the word count is incremented.

The last active pointer LA is provided so that the system does not have to look at the new active list 205 to identify those states which require a comparison and those that do not. If the state is equal to or beyond the state indicated by the last active pointer LA then a comparison is required, otherwise the cumulative distance can simply be copied into the state.

The processing performed in step S77 shown in FIG. 24 will now be described in more detail with reference to FIGS. 27a and 27b, for the example of the word model 201 shown in FIG. 22. The first active state S to be processed corresponding to i=0 in step S77 is state $S_7$. Therefore, in step S91 of FIG. 27a the system checks to see whether the cumulative distance for the valid path ending at state $S_7$ is less than the pruning threshold Th, i.e. D[$S_7$] is compared with Th. If D[$S_7$] is greater than the pruning threshold Th, then this path is discarded and the processing returns to step S79 shown in FIG. 24. If D[$S_7$] is less than the pruning threshold Th then the processing proceeds to step S92 where the variable ACOUNT, which is used to keep count of the total number of active states processed for the current frame $f_k$, is incremented. Then the system calculates, in step S93, the local distance between the current active state $S_7$ being processed and the current frame $f_k$ being processed and adds this to the cumulative distance D[$S_7$].

In the present embodiment, the following Euclidean distance equation is used to derive a measure of the local distance between the current frame $f_k$ and the current active state S:

$$d(S, f_k) = \|S - f_k\|^2 \tag{8}$$

After the cumulative distance D[$S_7$] has been updated in step S93, the system checks to see, in step S95, if the valid path which ends at the current active state $S_7$ can leave the current word at the next input frame $f_{k+1}$. With the above DP constraints this implies determining whether the state three states beyond the current active state S being processed, will be beyond the last state in the word model 201. As the state three states beyond the current active state $S_7$ is past the last state $S_9$, a pointer j is set to point to the exit state $S_D$ at the end of word model 201 in step S97. In step S101 the state indicated by pointer j is compared with the state indicated by the last active pointer LA. Since this is the first active state in the current active list 203 to be processed, the last active pointer LA will be pointing to the exit state $S_D$ (see step S71 shown in FIG. 24). Therefore the processing proceeds to step S103 where the cumulative distance stored in the state pointed to by pointer j, i.e. the exit state $S_D$, is compared with the cumulative distance for the valid path p1 ending at the current active state $S_7$ being processed.

The cumulative distance stored in the exit state, i.e. D[$S_D$], has just been set to the large value, HUGE, in step S71 shown in FIG. 24, and will therefore be larger than the cumulative distance stored in the current active state $S_7$ being processed. Consequently, the processing proceeds to step S105 where D[$S_7$] is copied into D[$S_D$]. Next in step S107 the self-repetition count for the state indicated by pointer j, i.e. the exit state $S_D$, is set to zero. Then in step S109 the pointer j is decremented and now points to state $S_9$, and the processing returns to step S101.

Figure 27A:
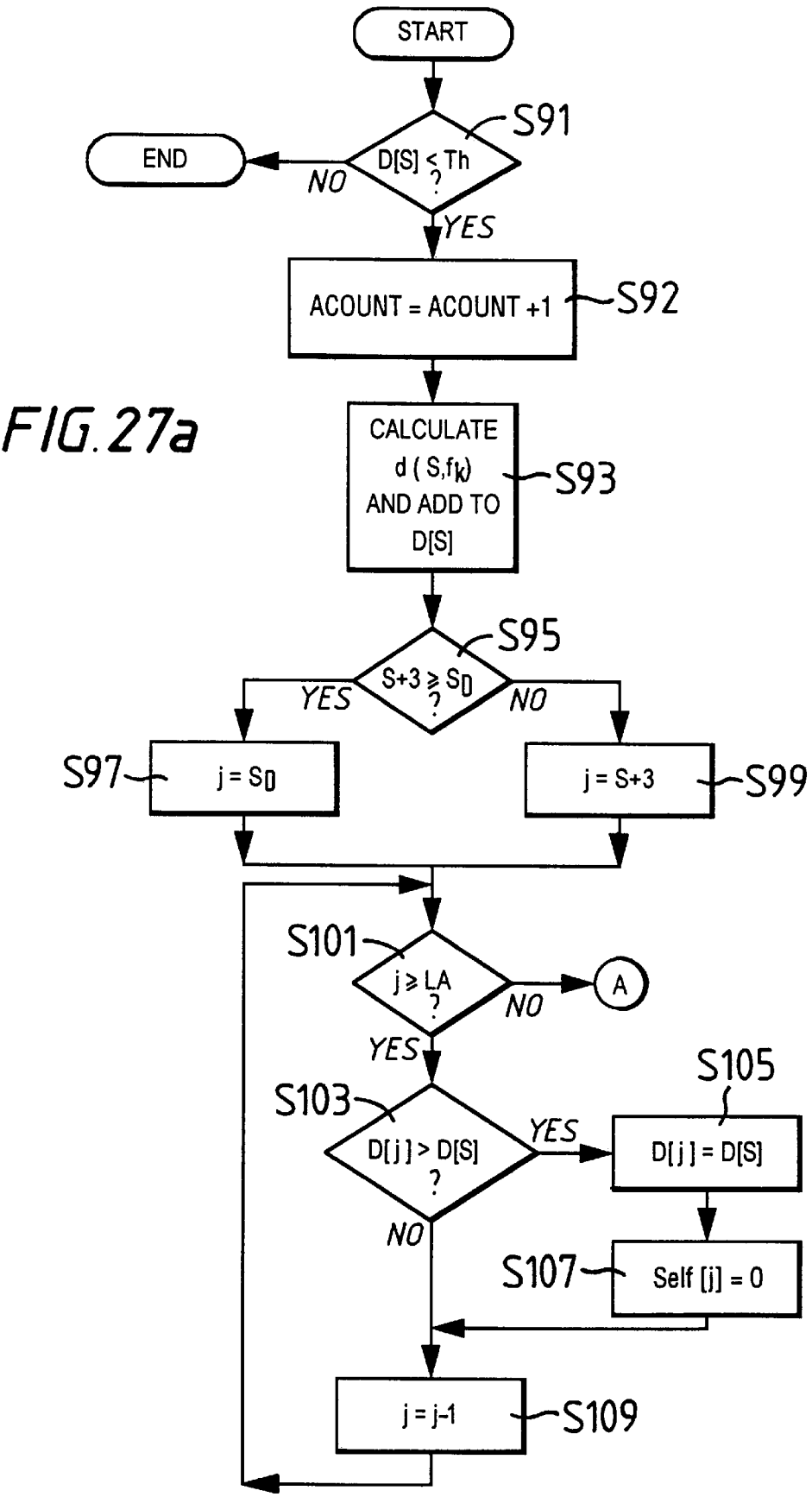
FIG. 27a is a flow chart which illustrates part of the processing performed in step S77 shown in FIG. 24.
Figure 27B:
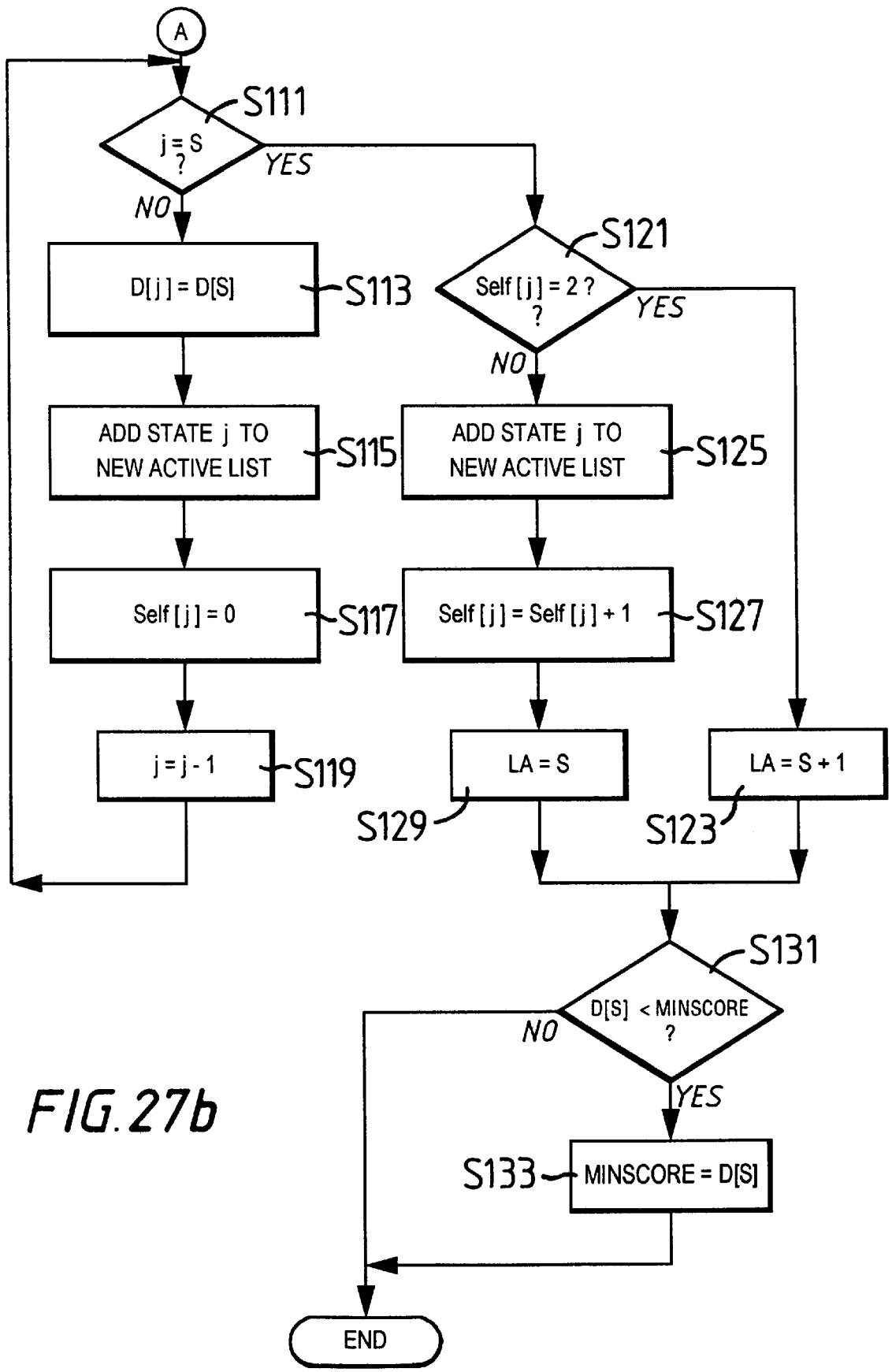
FIG. 27b is a flow chart which illustrates the remaining steps involved in step S77 of FIG. 24.
Figure 28:
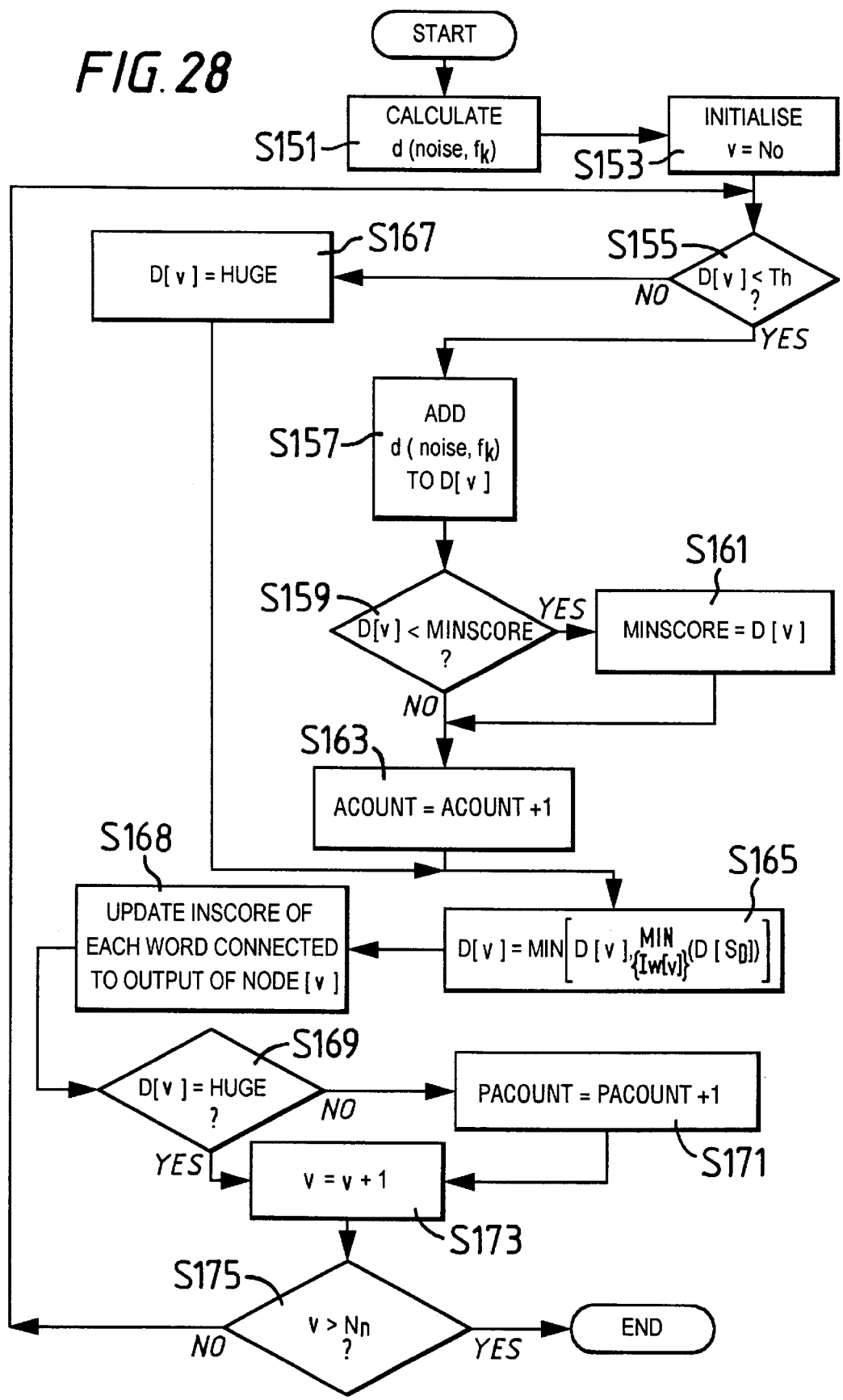
FIG. 28 is a flow chart which illustrates the processing performed in step S51 shown in FIG. 21.

This time the state indicated by pointer j (state $S_9$) is before the state indicated by the last active pointer LA (state $S_D$) and therefore the processing proceeds to step s111 shown in FIG. 27b. In step S111 the system checks to see if the state pointed to by pointer j, i.e. state $S_9$, is equal to the current active state $S_7$ being processed. It is not, therefore, the processing proceeds to step S113 where the cumulative distance stored in state $S_9$ is made equal to the cumulative distance stored in the current active state $S_7$. In other words, the cumulative distance of path p1 is copied into state $S_9$. Then in step S115 state $S_9$ is added to the new active list 205 shown in FIG. 22. In step S117 the self-repetition counter associated with state $S_9$ is reset to zero, and in step S119 the pointer j is decremented and now points to state $S_8$. The processing then returns to step S111 and state $S_8$ is processed in a similar manner.

After state $S_8$ has been processed in steps S113, S115 and S117, j is decremented in step S119 and now points to state $S_7$ which is also the current active state being processed. Therefore at this point, the processing proceeds to step S121 where the self-repetition count associated with state $S_7$ is checked to see if the valid path ending at state $S_7$ has ended there for the past two frames of the input utterance. If the self-repetition count associated with state $S_7$ is equal to two, then state $S_7$ is not added to the new active list 205 and the processing proceeds to step S123 where the last active pointer LA is set to point to the current active state plus one, i.e. to state $S_8$. This routine ensures that if the self-repetition count associated with the current active state is equal to two, then the valid path which ends at the current active state is prevented from propagating to the same state at the next frame $f_{k+1}$. In the example of the paths shown in FIG. 23, path p1 ending at state $S_7$ for the current frame $f_k$ came from state $S_6$ and therefore the self-repetition count will be equal to zero. Consequently, state $S_7$ is added to the new active list 205 in step S125. The self-repetition count for state $S_7$ is then incremented in step S127, and the last active pointer LA is set to point to the current active state, i.e. state $S_7$, in step S129.

After step S129 or step S123 the processing proceeds to step S131 where the cumulative distance stored in the current active state $S_7$ is compared with the minimum cumulative distance MINSCORE for all of the valid paths, in all the words, that have been processed for the current frame $f_k$. If the cumulative distance stored in state $S_7$ is less than MINSCORE then MINSCORE is replaced by the cumulative distance stored in state $S_7$ in step S133, and the processing returns to step S79 shown in FIG. 24. If the cumulative distance stored in MINSCORE is smaller than the cumulative distance associated with the current state $S_7$, then the processing returns to step S79 shown in FIG. 24. Upon returning to step S79 the count variable i is incremented and the next active state in the current active list 203, i.e. state $S_5$, is processed in step S77.

Active state $S_5$ is processed in a similar manner to active state $S_7$ described above. In particular, provided the cumulative distance of the valid path ending at state $S_5$ is less than the pruning threshold Th, then in step S93, the system calculates the local distance between the current active state $S_5$ and the current frame $f_k$ being processed and adds this to the cumulative distance stored in the current active state $S_5$. Then in step S95 the system determines that the path p2 ending at the current active state $S_5$ cannot extend into another word at the next frame $f_{k+1}$ due to the above DP constraints. In other words three states beyond state $S_5$ is not equal to or beyond state $S_D$, and therefore the processing proceeds to step S99 where the pointer j is set to point to state $S_5$ plus three, i.e. state $S_8$. The state indicated by pointer j is then compared with the state pointed to by the last active pointer LA in step S101.

Last active pointer LA points to state $S_7$ and pointer j points to state $S_8$. Therefore, the processing proceeds to step S103 where the cumulative distance already stored in state $S_8$ (as a result of the processing of active state $S_7$) is compared with the cumulative distance stored in active state $S_5$. If the cumulative distance stored in $S_8$ is greater than the cumulative distance stored in active state $S_5$ then it is replaced by the cumulative distance stored in active state $S_5$. Then the self-repetition counter associated with state $S_8$ is reset to zero in step S107 and the pointer j is decremented in step S109 so that it now points to state $S_7$. The processing then returns to step S101 where a similar processing is performed.

This recursive processing routine is performed on all the current active states in all the reference words known to the system.

After processing each word in the above manner for the current frame $f_k$, each node in the language model 21 is processed in turn. As described above the language model 21 determines the sequences of words that are allowable. This information is defined by the nodes and in particular by the words that are connected to the input and output thereof. The processing of the nodes in step S51 of FIG. 21 ensures that valid paths only propagate through allowed sequences of words. The processing performed in step S51 will now be described in more detail with reference to FIG. 28.

Initially, prior to processing any of the nodes the local distance between the frame representative of background noise and the current frame $f_k$ (i.e. d(noise,$f_k$)) is calculated in step S151. Then in step S153 a node pointer v is initialised to point to the start node $N_0$. Then in step S155 the cumulative distance stored in the node pointed to by the node pointer v, i.e. D[v], is compared with the pruning threshold Th. If D[v] is less than the pruning threshold Th then the processing proceeds to step S157 where d(noise,$f_k$) is added to the cumulative distance stored in the current node v being processed. Then in step S159 the system compares D[v] with the value stored in the minimum value store MINSCORE, and copies it into MINSCORE in step S161 if it is smaller. Then the count ACOUNT (which indicates the number of active states and nodes that have been processed for the current frame) is incremented in step S163 and the processing proceeds to step S165. Returning to step S155, if D[v] is greater than the pruning threshold Th then it is set to the large value HUGE in step S167 and the processing proceeds to step S165.

Figure 29:
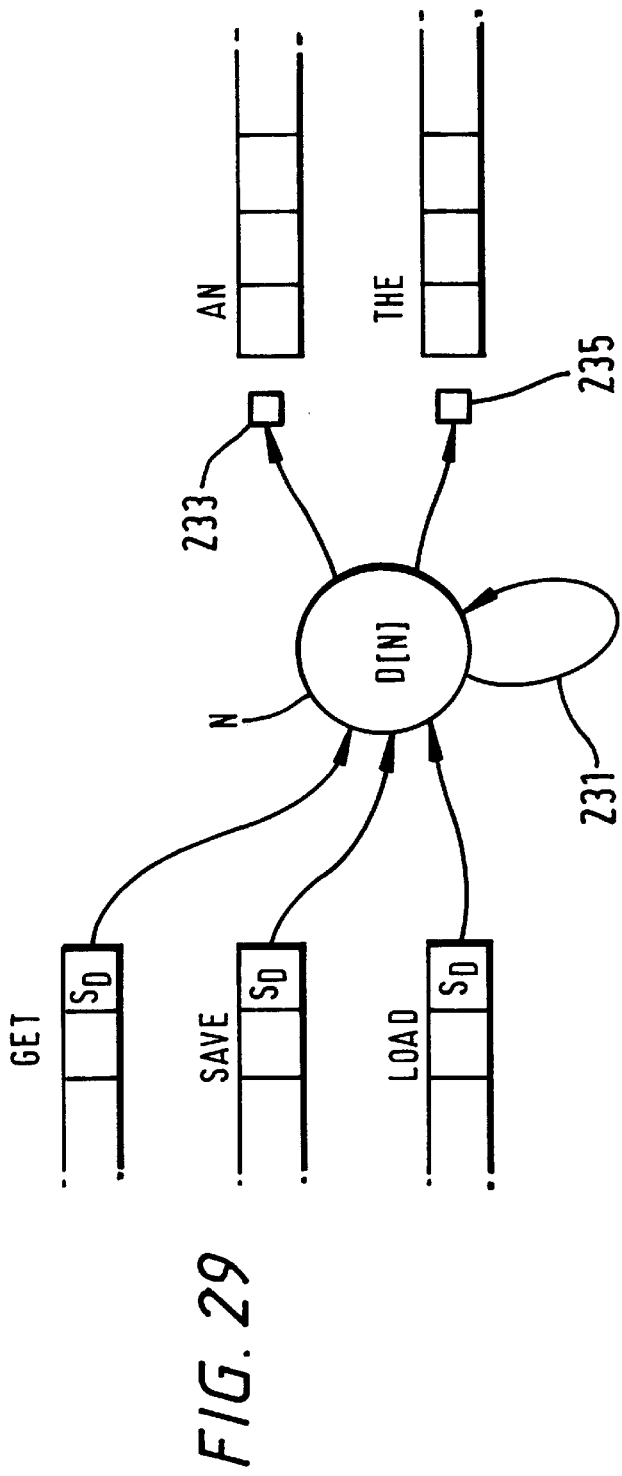
FIG. 29 is a schematic representation of the processing performed to an exemplary node N during the processing illustrated in FIG. 28.

The processing performed in step S165 and step S168 will be explained for the example node N shown in FIG. 29, which has the three words "get", "save" and "load" connected to its input and the words "an" and "the" connected to its output. Although the generation of such a node is not possible using the procedure shown in FIG. 17b, this example is chosen to illustrate that the dynamic programming process will work for more complex language models. In particular, finite state grammars where nodes like the one shown in FIG. 29 are commonplace.

In step S165 the system determines the minimum of all the cumulative distances stored in the exit states for the words connected to the input of node N, i.e. the exit states of words "get", "save" and "load". For the general case, this calculation is represented by:

$$\underset{\{I_w[v]\}}{\text{MIN}} (D[S_D]) \qquad (9)$$

where $I_w[v]$ represents all the words connected to the input of node v. After the system has determined this minimum cumulative distance for node N, it is copied into the cumulative distance D[N] stored in node N if it is smaller than the cumulative distance already stored there. In effect, this is a determination of whether there is a valid path coming from one of the words connected to the input of the node which has a smaller cumulative distance than the cumulative distance of the path which is still propagating in the node.

It is possible for valid paths to propagate within the node because it is possible that there are gaps before, between and at the end of the words in the phrase which match with the background noise frame. This possibility of a valid path remaining within a node from one input frame to the next is represented by the arrow 231 shown in FIG. 29, which leaves and returns to node N. Unlike the states of the word models, a path may remain within a node for any number of consecutive input frames. After the system has performed the processing of step S165 the cumulative distance stored in node N is copied, in step S168, into the temporary store INSCORE represented by boxes 233 and 235 for words "an" and "the" respectively, if it is smaller than the value already stored there. A comparison must be made since it is possible that a word may be connected to the output of more than one node, and it is only the path having the minimum cumulative distance that is propagated into the connecting word. The cumulative distance stored in the temporary store INSCORE of a word is used to update the entry states of that word during the processing in step S57 shown in FIG. 21.

The system then checks, in step S169, whether D[v] equals the large value HUGE. If it does, then this indicates that no valid paths will end or pass through the current node v into a word connected to it at the next frame $f_{k+1}$. If D[v] is less than the large value HUGE, then a valid path will either end at the node v or passes through it into a word connected to it, at the next frame $f_{k+1}$. Therefore, the counter PACOUNT, which represents the number of potentially active states (and nodes) at the next input frame $f_{k+1}$, is incremented in step S171 since the silence state associated with that node may be active at the next input frame $f_{k+1}$. The node pointer v is then incremented in step S173 and will now point to the next node in the language model 21. The system then checks to see if all the nodes in the language model 21 have been processed in step S175, by checking to see if the node pointer v indicates a node which is beyond the end node $N_n$ in the language model 21. If the system has not finished processing all the nodes, then the processing returns to step S155, whereas if all the nodes have been processed then the processing returns to step S53 shown in FIG. 21.

Figure 30:
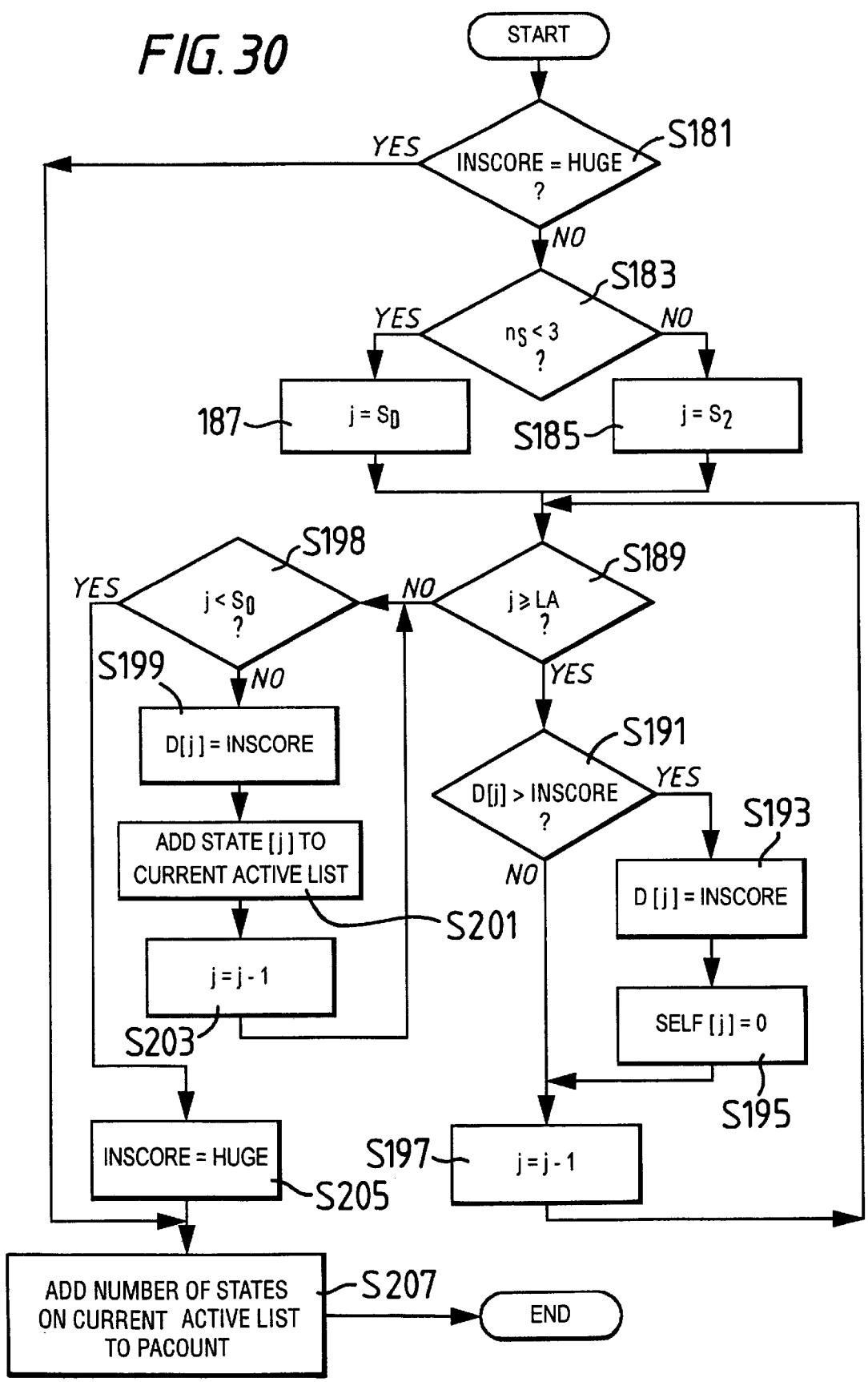
FIG. 30 is a flow chart which illustrates the steps involved in step S57 shown in FIG. 21.

The processing performed in step S57 shown in FIG. 21 will now be described in more detail with reference to FIGS. 30 and 31, for the word model 201 shown in FIG. 22. Referring to FIG. 30, in step S181 the system checks to see if the cumulative distance stored in INSCORE equals the large value HUGE. If it does then this means that no valid paths will be entering this word at the next time point. Therefore, this word does not need to be processed again, so the processing proceeds to step S207 where the number of active states for the next input frame $f_{k+1}$ (which are now stored in the current active list 203 due to step S83 shown in FIG. 24), is added to the count PACOUNT. The processing then returns to step S59 shown in FIG. 21 where the word count is incremented so that the next word model can be processed.

If on the other hand, INSCORE is not equal to the large value HUGE, then this means that a valid path has left a preceding word and may enter the current word being processed. Therefore, the states of the current word model which can be reached by a path extending from another word model (which will be referred to as the entry states) must be updated using the cumulative distance stored in INSCORE. In the present embodiment with the above DP constraints the entry states are states $S_0$, $S_1$ and $S_2$. This updating procedure is achieved in the following manner. Firstly in step S183 the system checks to see if the word model representative of the current word being processed contains more than three states (not including the exit state). If there are more than three states, then the state pointer j is set to point to state $S_2$ in step S185. If on there other hand there are less than three states in the current word, then the state pointer j is set, in step S187, to point to the exit state $S_D$ at the end of the word being processed. After the state pointer j has been set to point to either state $S_D$ or state $S_2$ in steps S187 or S185 respectively, the processing proceeds to step S189 where the state indicated by pointer j is compared with the state indicated by the last active pointer LA.

As with the processing performed in the sequence of steps shown in FIGS. 27a and 27b, if the state indicated by pointer j is beyond the state indicated by the last active pointer LA, then a comparison has to be made between the cumulative distance already stored in that state and the cumulative distance stored in INSCORE.

For the example DP paths shown in FIG. 23, path p7 can propagate to states $S_1$, $S_2$ and $S_3$ at the next frame $f_{k+1}$ but not to state $S_0$, since path p7 has ended at state $S_0$ for the preceding two frames. Therefore, the last active pointer LA will point to state $S_1$.

Figure 31:
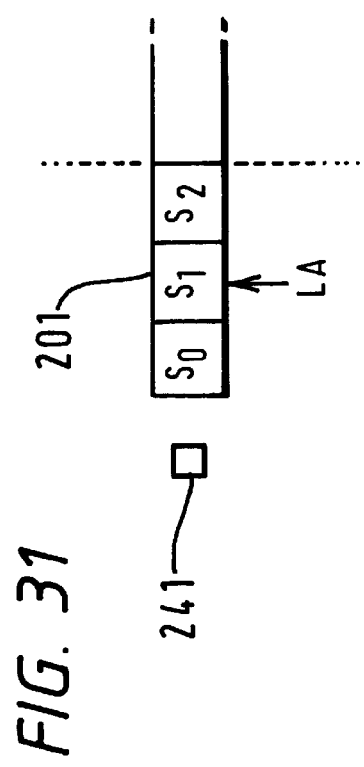
FIG. 31 is a schematic diagram illustrating the entry states of the word model shown in FIG. 22.

FIG. 31 shows the entry states (i.e. the first three states) of the word model 201 shown in FIG. 22. As shown, the last active pointer LA points to state $S_1$. Since there are more than three states in the word model 201 the state pointer j will point to state $S_2$. Therefore, the system will determine, in step S189, that the state indicated by pointer j is beyond the state indicated by the last active pointer LA, i.e. state $S_1$, and therefore, the processing proceeds to step S191. In step S191 the system compares the cumulative distance stored in state $S_2$ with the cumulative distance stored in the temporary store INSCORE associated with word model 201. The store INSCORE, for word model 201, is represented by rectangular box 241 shown in FIG. 31. If the cumulative distance stored in INSCORE is smaller than the cumulative distance stored in state $S_2$, then it is copied into state $S_2$ in step S193. Then in step S195 the self-repetition count for state $S_2$ is reset to zero and the processing proceeds to step S197. If the cumulative distance stored in INSCORE is greater than the cumulative distance stored in state $S_2$, then the cumulative distance stored in state $S_2$ is unchanged and the processing proceeds to step S197 where the pointer j is decremented so that it now points to state $S_1$. The processing then returns to step S189 and the same processing is performed to state $S_1$.

After processing state $S_1$ the pointer j is decremented again in step S197, and will now point to state $S_0$. Therefore, the processing will proceed to step S198 after step S189, where the system checks to see if there are any more states to be processed. Since state $S_0$ is still to be processed, the system proceeds to step S199 where the cumulative distance stored in INSCORE is copied into state $S_0$. No comparison of cumulative distances has to be performed for state $S_0$ as this state is before the last active state pointed to by the last active pointer. The system then adds, in step S201 state $S_0$ to the current active list (which was the new active list 205 prior to step S83 in FIG. 24) and decrements the pointer j so that it now points to state $S_{-1}$. The processing then returns to step S198 where the system determines that there are no more entry states in the current word to be processed. The processing then proceeds to step S205 where the cumulative distance stored in the corresponding temporary store INSCORE is reset to the large value HUGE. The number of states on the current active list is then added, in step S207 to the count PACOUNT and the processing returns to step S59 shown in FIG. 21.

Pruning

Referring to FIG. 21, if in step S63 the system determines that there are more input frames to be processed, then the processing proceeds to step S65 where the pruning threshold Th is adjusted. The aim of using pruning is to limit the number of DP paths that propagate from one time point to the next. In particular, the present embodiment aims to adjust the pruning threshold so that the number of active states that are actually processed remains essentially bounded within predefined limits, which are dictated by the amount of working memory and processing time available. Furthermore, the present embodiment also aims to achieve this without the need for expensive computational overheads. In this embodiment, the pruning threshold is determined by adding a variable differential value (PRUNING) to the overall minimum cumulative score MINSCORE determined for the input frame just processed, i.e. the pruning threshold is given by:

$$Th = \text{MINSCORE} + \text{PRUNING} \quad (10)$$

Figure 32:
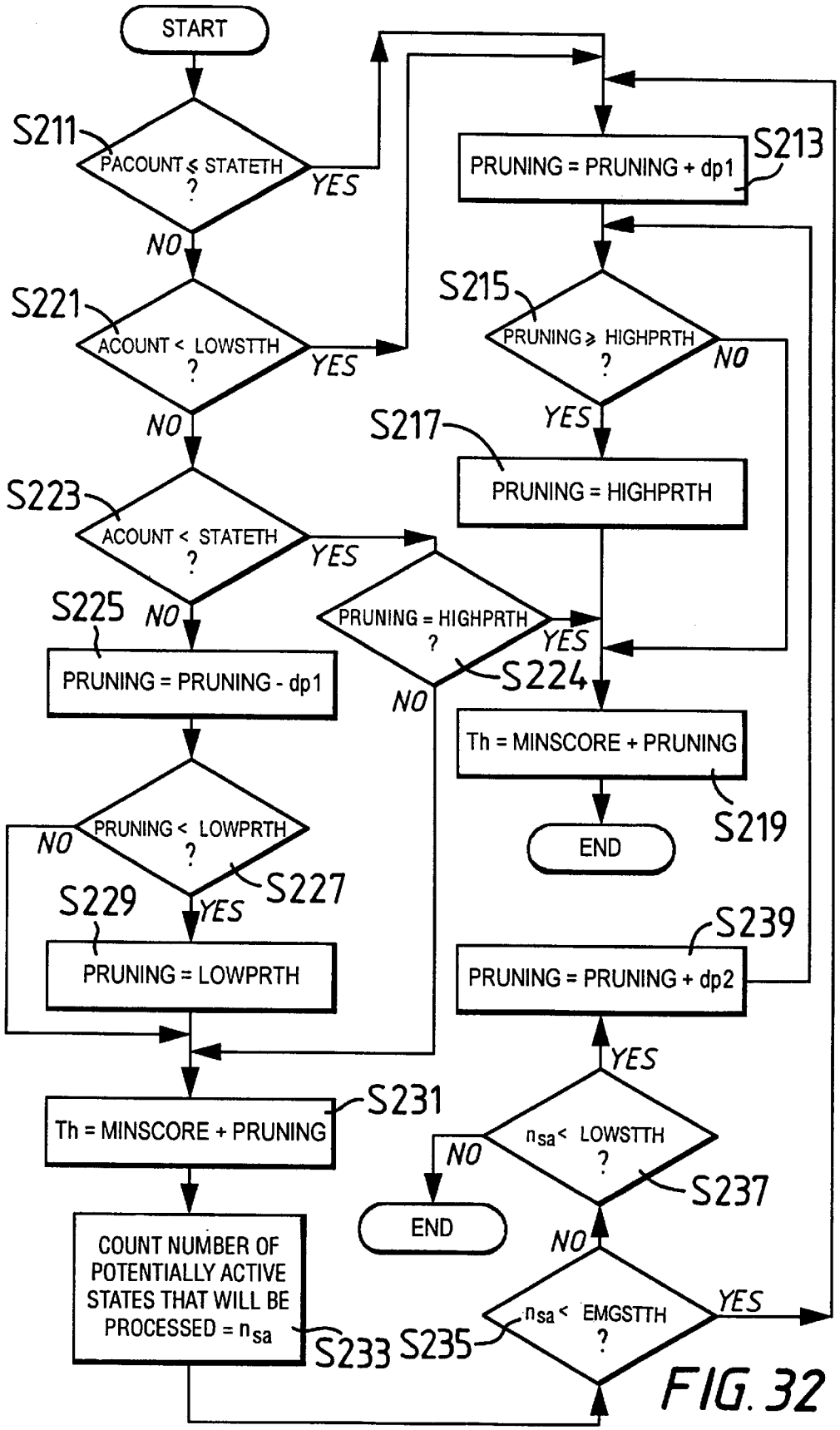
FIG. 32 is a flow chart which illustrates the steps performed in step S65 shown in FIG. 21.

One way of ensuring that only a set number of active states are processed for each input frame is to sort the active states that are on all the active lists for the input frame about to be processed in order of increasing cumulative distances stored therein, and then only processing the desired number beginning with the one with the lowest cumulative distance. However, this technique requires a large amount of computational time to sort out the active states. Rather than performing this computationally expensive sorting, the technique employed in the present embodiment makes use of the information available after processing the last input frame. In particular, in this embodiment a differential value (PRUNING) is varied in dependence upon the number of states that are potentially active (which is stored in PACOUNT) for the next input frame to be processed, in order to maintain the number of states that will actually be processed, to be between two thresholds. The manner in which the pruning threshold Th is adjusted will now be described in more detail with reference to FIG. 32.

In step S211 the system compares the number of states that are potentially active for the next frame to be processed (which is stored in PACOUNT) with a state threshold (STATETH), which is set to be less than but close to an absolute maximum state threshold determined by the amount of working memory available. If the value stored in PACOUNT is less than STATETH then this means that all the potentially active states can be processed, and therefore, the differential value PRUNING used at the last time point can be increased. Therefore, in step S213 an adjustment constant dp1 is added to the existing differential value, PRUNING. The value of dP1 is set to be larger than any reasonable local distance, so that most, if not all, of the potentially active states will be processed.

The value stored in PRUNING is then compared with a high pruning threshold, HIGHPRTH in step S215. An upper limit is placed on the differential value PRUNING as it is assumed that there is a maximum differential value above which there is never any need to go. If the value stored in PRUNING is less than HIGHPRTH then the processing proceeds to step S219. If the value stored in PRUNING is greater than HIGHPRTH then PRUNING is set to equal HIGHPRTH in step S217. After step S215 or step S217 the system sets the pruning threshold Th to equal the minimum cumulative distance of all the remaining valid paths, i.e. MINSCORE, plus the differential value PRUNING. The processing then returns to step S43 shown in FIG. 21.

If at step S211 the system determines that the number of potentially active states, PACOUNT, for the next frame is greater than STATETH, then the system compares, in step S221, the number of states that were active and processed during the processing of the last input frame (which is stored in ACOUNT) with a low state threshold, LOWSTTH. The value of LOWSTTH is set to try and ensure that if ACOUNT is less than LOWSTTH, then it will be possible to process all the potentially active states for the next input frame without taking too much time or memory. Therefore, if ACOUNT is less than LOWSTTH, then the processing passes from step S221 to step S213 where the differential value PRUNING is adjusted and the processing proceeds as described above. If, on the other hand, ACOUNT is greater than LOWSTTH then there is no guarantee that if all the potentially active states are processed then this will not take too much time or memory to process. Therefore, it may be necessary to reduce the differential value PRUNING.

In order to determine whether the differential value PRUNING needs to be reduced, the system compares ACOUNT with STATETH in step S223. If ACOUNT is less than STATETH then the system checks to see if the differential value PRUNING is equal to HIGHPRTH. If it does equal HIGHPRTH then this indicates that the system has been trying to process all the active states, and that therefore, it is unlikely that the number of active states that will be processed for the next input frame will result in the process taking too long or too much memory. Therefore, the differential value PRUNING is not changed and the processing passes to step S219 where the pruning threshold is set to equal MINSCORE plus the differential value PRUNING. If on the other hand, the differential value PRUNING is not equal to HIGHPRTH (in which case it must be less than it), then it is possible that the number of active states that will be processed for the next input frame will take too long or too much memory. Therefore, the actual number of active states that will be processed must be calculated. This is performed in step S233 using the pruning threshold set in step S231 which uses an unchanged differential value PRUNING.

Returning to step S223, if the system determines that ACOUNT is greater than STATETH then the differential value PRUNING is reduced by the adjustment constant dp1 in step S225. After the differential value PRUNING has been decreased in step S225, the system determines in step S227 whether the differential value PRUNING is less than a low pruning threshold, LOWPRTH. A low pruning threshold is used to ensure that the number of active states that will be processed for the next input frame, will be greater than a set emergency state threshold, EMGSTTH. The reason for this is that it has been found that the dynamic programming process fails if it is pruned too heavily. If the differential value PRUNING is less than the low pruning threshold LOWPRTH, then it is made equal to LOWPRTH in step S229, and the pruning threshold Th is set, in step S231, to equal MINSCORE plus the adjusted differential value PRUNING. Subsequently, in step S233 the system counts the number of active states that will be processed for the next input frame. This is achieved by comparing the cumulative distances stored in all the active states and the cumulative distances stored in all the nodes with the newly determined pruning threshold Th.

This total number ($n_{sa}$) represents the total number of active states and nodes that will be processed for the next input frame. If this total number $n_{sa}$ is less than the emergency state threshold, EMGSTTH, then the pruning threshold has been set too low and the processing returns to step S213 where the differential value PRUNING is increased and the pruning threshold Th is reset. If $n_{sa}$ is not less than EMGSTTH then it is compared with LOWSTTH in step S237. If $n_{sa}$ is greater than LOWSTTH then this implies that the pruning threshold Th set in step S231 is acceptable and the processing returns to step S43 shown in FIG. 21. If on the other hand, $n_{sa}$ is less than LOWSTTH, then the pruning threshold can be increased, and so a second adjustment constant dp2 is added to the differential value PRUNING in step S239, prior to the pruning threshold Th being reset in step S219. In this embodiment the second adjustment constant dp2 is set to equal half the adjustment constant dp1.

As those skilled in the art will realise, the above method of varying the pruning threshold is not computationally expensive, yet it allows the pruning threshold to be adjusted in such a manner that the number of active states that are processed at each time point is bounded, so that the allocated processing time and memory are not exceeded.

After all the frames in the input sequence have been processed using the sequence of processing steps illustrated in FIG. 21 a backtracking routine is required to determine the exact path taken by the optimum path determined by the dynamic programming process. In this embodiment the backtracking routine traces through backpointers which indicate the sequence of words through which each path propagates. The details of the way in which the backtracking routine is performed, and the way in which the pointers are generated are well known to those skilled in the art of speech processing, and will not be described further.

Initialisation

Before the system attempts to recognise an input utterance, the system thresholds and variables which are used during the recognition process must be initialised. This is achieved in the following manner. Firstly the cumulative distance stored in the start node $N_0$ is set to zero and the cumulative distance stored in all the other nodes is set to equal the large value, HUGE. Then the counter which counts the number of potentially active states, PACOUNT, associated with each word model is set to zero; the last active pointer associated with each word model is set to point to the end state SD of that model; and the temporary store INSCORE associated with each word model is set to the large value, HUGE. All the nodes are then processed so that the minimum of the cumulative distances of all the nodes connected to the input of a word is, copied into the temporary store INSCORE associated with that word. This ensures that the temporary store INSCORE of each word connected to the start node $N_0$ is set to zero. Finally, the value stored in INSCORE of each word is used to activate and initialise the entry states of each word model. The processing steps to initialise the entry states of each word model are identical to the processing steps used to update the entry states described above with reference to FIG. 30. The pruning threshold and the differential value PRUNING are also initialised prior to the processing of the first input frame. In particular, the pruning threshold Th is set to the large value, HUGE, and the differential value PRUNING is set to equal the high pruning threshold, HIGHPRTH.

Flexible dynamic programming alignment

A brief description is given above with reference to FIGS. 13 to 16, of the way in which the word models are generated in this embodiment. In particular, isolated word models are first generated for the words contained in a phrase by aligning the sequence of parameter frames corresponding to the phrase with the sequences of parameter frames corresponding to the words when spoken in isolation contained within the phrase, using a flexible dynamic programming alignment process. This flexible alignment process will now be described in more detail for the training phrase "get an image", when no word model for the words in the phrase exists yet.

Figure 33:
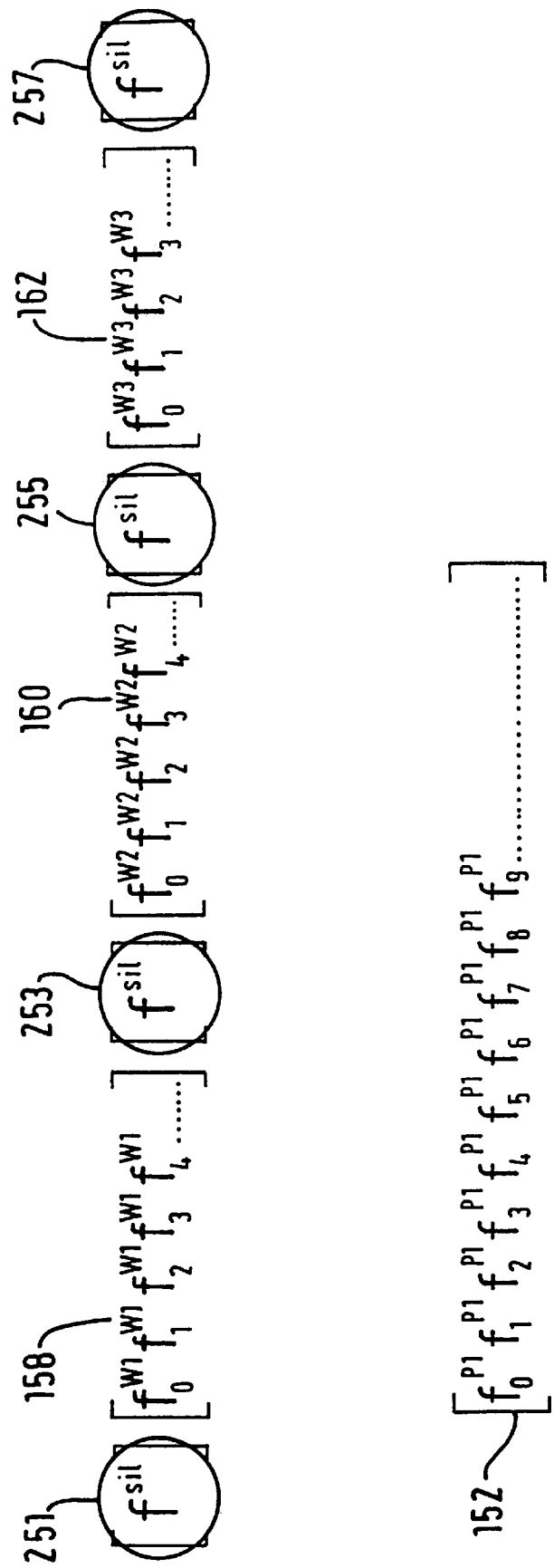
FIG. 33 is a schematic representation of the sequence of parameter frames for an input phrase together with the sequences of parameter frames for the words contained within the input phrase when spoken in isolation.

FIG. 33 shows the sequence of parameter frames 152 which corresponds to the utterance of the phrase "get an image" and the sequences of parameter frames 158,160 and 162 corresponding to the utterances of the isolated words "get", "an" and "image" respectively. Since some of the parameter frames in the sequence of parameter frames 152 will correspond to background noise or silence, nodes 251, 253, 255, 257 are provided between the isolated words and at the beginning of the first word and at the end of the last word contained in the phrase. These nodes act in a similar manner to the nodes in the language model shown in FIG. 17a, and take care of the situation where a current parameter frame of the sequence of parameter frames 152 being processed, corresponds to silence or background noise. This possibility is illustrated in FIG. 33 by the silence frame $f^{sil}$ (which is the noise model 23 shown in FIG. 10) at nodes 251, 253, 255 and 257.

Although some of the frames at the beginning and at the end of the sequences of parameters frames 158,160 and 162 will correspond to silence or background noise, the parameter frames in the sequence of parameter frames 152 which correspond to silence or background noise should match better with the silence frame $f^{sil}$ stored in the nodes 251, 252, 255 and 257 than the frames corresponding to silence in sequences 158, 160 and 162. This is because the silence frame $f^{sil}$ represents an average of all silence frames, and therefore on average, the variation between the frames in sequence 152 corresponding to silence and the silence frame $f^{sil}$ should be less than the variation between the frames corresponding to silence in sequence 152 and those corresponding to silence in sequences 158, 160 and 162.

The way in which the flexible alignment process is carried out is similar to the way in which the input speech is aligned with the stored reference models, as described above with reference to FIGS. 18 to 32. In particular, the general processing steps of the flexible alignment process follow those shown in FIG. 21, using the sequences of parameter frames 158, 160 and 162 as reference models, the nodes 251, 253, 255 and 257 and the frames of sequence 152 as input frames. In order to avoid confusion, the parameter frames of the sequences 158, 160 and 162 representing the words when spoken in isolation will be referred to as states. Like the states of the reference models used during recognition of an unknown input utterance, these states have an associated cumulative distance store for storing the cumulative distance of the dynamic programming path which ends at that state for the current frame of the sequence 152 being processed.

The main difference between the flexible alignment process and the alignment process used during recognition of an unknown input utterance is that with the flexible alignment:

(i) each dynamic programming path can enter a word at any position (and not only in one of the entry states); and (ii) each dynamic programming path can exit a word from any state therein.

The way in which the flexible alignment process operates for the above example will now be explained by considering the first few parameter frames of the sequence of parameter frames 152. Before processing the first frame, however, the cumulative distance scores associated with the nodes and the states in the word models are initialised. This initialisation procedure is similar to the initialisation procedure performed prior to attempting to recognise an unknown input utterance, as described above. In particular, the cumulative distance stored in the start node, ie. node 151, is set to zero and the cumulative distance stored in all the other nodes is set equal the large value, HUGE. The cumulative distance scores of the states in words W1, W2 and W3 are then updated using the cumulative distance scores stored in the nodes connected to the input of the words. This will ensure that a dynamic programming path can be started at each state of the first word W1 and at the first node 151 when the frame $f_0^{P1}$ is processed.

After initialisation, the first frame $f_0^{P1}$ is processed with respect to each word W1, W2 and W3 in turn. However, since the cumulative distance associated with the states in words W2 and W3 will have the value, HUGE, the first frame will only be processed with respect to the states in the first word W1. When processing the first frame with respect to word W1, the distance between frame $f_0^{P1}$ and each state in word W1 is stored in the respective cumulative distance store associated with that state. The flexible alignment process then processes the nodes 251, 253, 255 and 257 in turn, using the processing steps shown in FIG. 28. Finally, the processing of the first frame $f_0^{P1}$ is completed by updating the cumulative distance scores of the states in words W1, W2 and W3 using the results of the node processing. The updating procedure is similar to that shown in FIG. 30 except all the states in the words are updated and not just the entry states (ie. the first three states).

Once the first parameter frame of sequence 152 has been processed, the second parameter frame $f_1^{P1}$ is processed in order to propagate the dynamic programming paths started by the processing of the first parameter frame $f_0^{P1}$. As with the dynamic programming method used during recognition of an input utterance, the states in each word W1, W2 and W3 are processed in reverse sequential order, using in this embodiment similar propagation constraints as those described with reference to FIGS. 19 and 20. The only difference is that each dynamic programming path is also allowed to exit a current word from any of its states, and not just from the last three states as is the case during recognition of an unknown input utterance. Once the words W1, W2 and W3 have been processed using the second parameter frame $f_1^{P1}$, the nodes 251, 253, 255 and 257 are processed in order to update the dynamic programming path which is currently propagating within each node. Once this had been done, each of the words W1, W2 and W3 is processed again in order to update the dynamic programming paths in order to take into account the results of the node processing.

The remaining parameter frames in the sequence of parameter frames 152 are then processed in turn in a similar manner. Once all the parameter frames in the sequence 152 have been processed, the dynamic programming path with the lowest cumulative score is determined. In order to identify the beginning and end frames within the sequences of parameter frames 158, 160 and 162 which bound those parameter frames which represent the corresponding words (and not silence), a record is made of the progress of each dynamic programming path during the flexible alignment process.

In particular, whenever a dynamic programming path enters a word, either from a preceding word or from the node in front of the word, the state into which that dynamic programming path enters is recorded and associated with that path. Similarly, when a dynamic programming path exits a word then the state from which it exits is recorded, provided the score associated with that path is lower than the score associated with all previous dynamic programming paths which have exited from that word. Therefore, once the last parameter frame in the sequence of parameter frames 152 has been processed and the dynamic programming path having the best score is identified, approximate beginning and end points of the words within the sequence of parameter frames 158, 160 and 162 can be identified by looking at the record associated with the identified dynamic programming path.

As those skilled in the art will appreciate, the above description of the flexible alignment process is particular to the situation where no word model exists for each word contained in the input phrase. However, since the training of the reference models is designed to be incremental in nature, ie. such that the user can train the system at his convenience, the situation will sometimes arise that a word model for a word in an input phrase will already exist. In this case, during the alignment between the phrase and the individual words, a hybrid type dynamic programming alignment process is employed which uses a standard type dynamic programming alignment process for words that already have a word model, and a flexible dynamic programming alignment process for the other words which do not yet have a word model.

As mentioned above with reference to steps S25 and S26 in FIG. 14, once the isolated word models for the unknown words in a phrase have been determined, they are aligned with the sequence of parameter frames of the input phrases containing that word, and word models are generated from the result.

Word Model Adaptation

Another feature of the speech recognition system according to this embodiment is that the word models 19, the noise model 23 and the language model 21 shown in FIG. 10 can be updated and even modified by the build/update module 91. Therefore, the stored word models 19 can be modified or adapted by the input speech of a different user.

Figure 34:
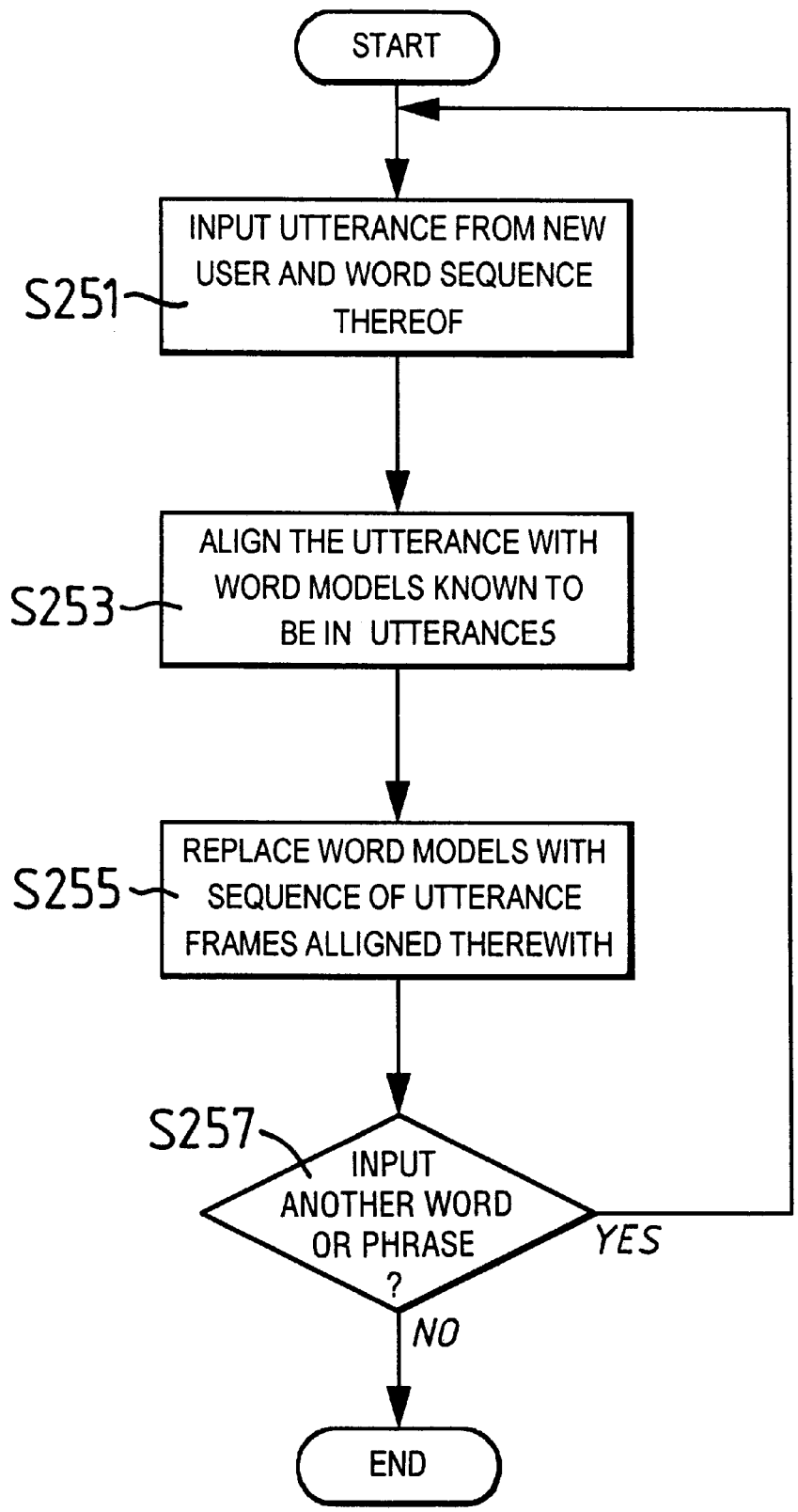
FIG. 34 is a flow chart which illustrates the steps involved in adapting the word models to a different user using a first substitution technique.

FIG. 34 is a flow chart which illustrates one method of how the stored word models 19 can be adapted to a different user. In particular, in step S251 the the new user inputs a known word or phrase into the system via the microphone 7 and the keyboard 3. The build/update module 91 therefore has the sequence of parameter frames corresponding to the utterance from the new user and the corresponding text entered via the keyboard 3. The system then aligns, in step S253, the input utterance with the existing word models of the words which are known to be in the utterance using a dynamic programming routine. The dynamic programming routine aligns the parameter frames of the input utterance with the states of the appropriate word models. The system then directly replaces, in step S255, the states of the word models with the sequence of parameter frames which are aligned therewith. If the new user then decides, in step S257, to input another phrase, then the processing returns to step S251, and the same routine is performed again for the next input utterance. If the new user decides at step S257 that no more phrases are to be adapted then the processing ends.

Figure 35:
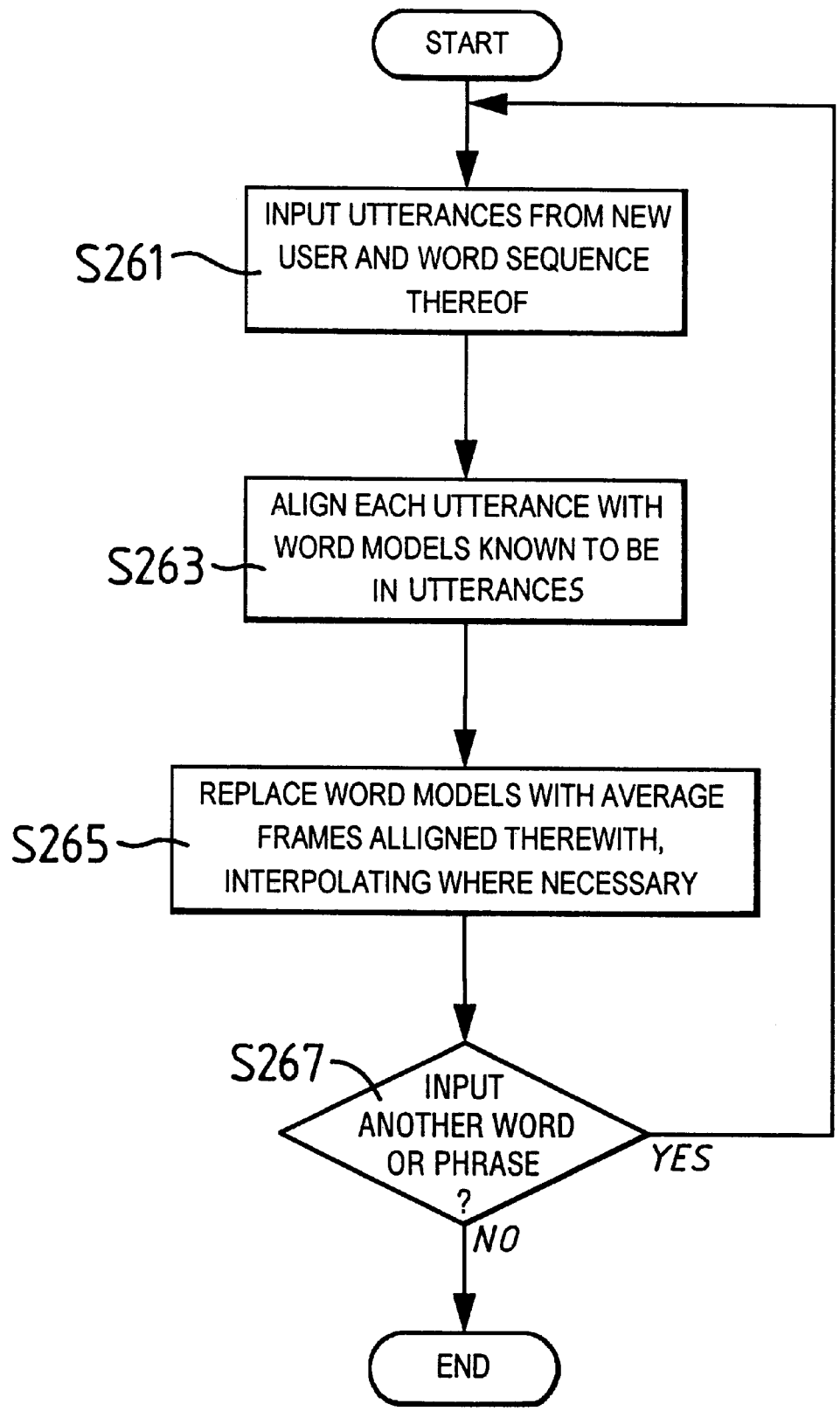
FIG. 35 is a flow chart which illustrates the steps involved in adapting the word models to a different user using a second substitution technique.

FIG. 35 is a flow chart which illustrates a second method of how the stored word models 19 can be adapted for a different user. In particular, in step S261 the new user inputs a known word or phrase into the system, a number of times via the microphone and once via the keyboard. The build/update module 91 therefore has a plurality of sequences of parameter frames, each corresponding to the utterance of the known word or phrase by the new user, and the corresponding text entered via the keyboard 3. The system then aligns, in step S263, each input utterance with the existing word models of the words which are known to be in the utterance, using a dynamic programming routine.

The dynamic programming routine aligns the parameter frames of each input utterance with the states of the appropriate word models. The system then replaces, in step S265, the states of the word models with the average of the parameter frames which are aligned therewith. If a state of a word model has not been aligned with any of the parameter frames of the utterances then, in this embodiment, the system interpolates between or extrapolates from neighbouring replaced states. If the new user decides, in step S267, to adapt another phrase, then the processing returns to step S261, and the same routine is performed again for the next phrase. If the new user decides at step S267 that no more phrases are to be input then the processing ends. Therefore, as will be apparent to those skilled in the art, the new user can adapt the existing word models incrementally at his convenience. Additionally, the new user can also add new words or phrases to the system in the manner described above.

Alternative Embodiments

A number of modifications can be made to the above speech recognition system without departing from the inventive concept of the present invention. A number of these modifications will now be described.

Although in the above embodiment, the whole utterance is received before it is processed, the system can run incrementally whereby as the speech is received it is processed. In such an embodiment, an input buffer would still be required, but it would only need to be able to store incoming speech corresponding to one frame, i.e. 20 milliseconds of speech. As those skilled in the art will realise, in order for this system to work, the entire processing of the frame of input speech (by the preprocessor and the recognition block), must be finished before the next frame of input speech is ready to be processed. With the above frame rate and frame duration, this means that the time taken to process a frame of input speech must be less than ten milliseconds. This can be achieved with current state of the art processors.

In addition, the power parameter in each frame of the input utterance would have to be normalised in a different manner. One way of normalising the power in such an embodiment would be to use an adaptive normalisation factor which would be adapted based upon the power of the input speech over, for example, the previous twenty input frames.

In the first embodiment, the states of the word models which were at the end of a dynamic programming path were listed in an active list associated with that word model. In an alternative embodiment a single global active list could be provided in which all the active states of all the word models would be listed. In such an alternative embodiment, information would have to be stored associated with the global active list, for identifying which word models the particular active states belong to.

In the first embodiment, the states of the word models correspond in time duration to the frames of the input speech to be recognised. In an alternative embodiment, each state of a word model could be equivalent in time duration to, for example, three consecutive frames of the input speech. In such an alternative embodiment, the input frames would be averaged in groups of three and then aligned with the states of the word models.

In yet another alternative embodiment, the word models could be statistical models, for example Hidden Markov models, well known to those skilled in the art of speech recognition. In such an embodiment, rather than determining the minimum cumulative distance between the input utterance and the sequences of word models, the maximum probability that the input sequence was generated by a particular sequence of Hidden Markov models would be determined. In such an embodiment, the Hidden Markov models would be generated in a similar manner to the continuous reference models generated in the first embodiment. In particular, an isolated reference model for a word would be generated by comparing an utterance of the word with one or more utterances of phrases containing the word. The isolated reference model would then be used with a plurality of example phrases, which contain the word, to generate the mean parameter frames and the covariance matrices of the states of the Hidden Markov Model, and to generate the transition probabilities between the states. The way in which this would be achieved, would be apparent to those skilled in the art of speech recognition.

In the first embodiment, the reference models used corresponded to whole words. As those skilled in the art will realise, this is not essential. The reference models could correspond to parts of words, e.g. syllables, to a plurality of words or even to individual phonemes. However, the disadvantage of using reference models which correspond to phonemes is that the system becomes language dependent. Further, reference models which are equivalent to whole words are preferred to those equivalent to whole phrases because there is a potential for time and computational savings. In particular, by modelling the words within phrases and by using a language model, it is possible to teach the system many different phrases using only a handful of words. If on the other hand, the reference models corresponded to the whole phrases, then a reference model would be required for each of the different phrases to be learnt by the system. In addition to this advantage, the use of reference models which correspond to words also increases the system's flexibility to gaps between the words in the phrase. This is possible because of the environment model which can appear at the beginning or end of the phrase and also between the words in the phrase.

In yet another alternative embodiment, the reference models could be compressed if consecutive frames of the model are similar. If this situation arises then the consecutive similar frames would be replaced by a single frame. In such an embodiment, the constraint placed on the dynamic programming process, that consecutive frames of the input utterance cannot be aligned with the same state of a word model more than twice, would have to be removed.

In the language model shown in FIG. 17, if a word can be followed by two different words, then no preference is placed on which of the two words will follow that word. In an alternative embodiment, it would be possible to weigh some sequences of words more favourably than others. For example, for the phrases illustrated in FIG. 17a, it may be known that the phrase "make it more . . . " (followed by a colour) is more common than the phrases "make it smaller", or "make it larger" or "make it brighter". Therefore, the transition from node $N_7$ to node $N_8$ is made stronger compared to the transition from node $N_7$ to the end node $N_n$. This can be achieved by using weighing factors which weigh the cumulative distances being propagated from node $N_7$ to the input of words "more", "smaller", "larger" and "brighter".

As those skilled in the art will realise, the language model used to define the allowed sequences of words does not have to be a Bigram model, but could be any known type of language model, for example a finite state grammar model. If the type of language model used is changed, then some modifications would have to be made to the dynamic programming matching process described above, but such modifications would be apparent to those skilled in the art of speech recognition. However, the essential features of the matching process would remain unchanged, as these are designed to be suitable for use in any pattern matching process.

In the first embodiment, at least two phrases which contain a word had to be input into the system before a reference model for that word could be generated. This is a preferred mode of operation, and word models could be generated for each word from only a single example phrase containing that word. However, in such an embodiment, the reference models will be less representative of that word when used in any given phrase. Additionally, in the training method used in the first embodiment, once a reference word model is determined for a word the word model is not changed regardless of whether subsequent input training phrases contain that word. In an alternative embodiment, it would be possible to update existing word models during the training session, using input phrases which contain examples of the words for which there are already word models.

When the user is training the speech recognition system, and inputs a phrase containing a number of words which have already been input in isolation, the system does not prompt the user to input those words in isolation again. In an alternative embodiment, the system could prompt the user for those words again, and could perform a consistency check to ensure that the two utterances of the word do not significantly differ.

In the first embodiment, when the reference models are being trained or adapted, the user has to input the text and then input the corresponding voice command. As those skilled in the art of speech recognition will realise, this is not essential. Instead of entering text, the user could simply press a corresponding key/combination of keys on the keyboard, facsimile machine, photocopier etc. For example, when training the system for use in a photocopier, when entering the voice command "copy" the desired machine response can be input by the user simply pressing the copy button.

In addition, it will be apparent to those skilled in the art of pattern matching, that the method of implementing the dynamic programming matching process and the reference model generation and adaptation processes described above, could also be used for matching other types of patterns. For example, it is envisaged that the above described pattern matching process could be used in handwriting recognition or other pattern matching techniques.

Although a continuous word speech recognition system is described in the first embodiment described above, it will be apparent to those skilled in the art that many features of the system described could equally apply to other kinds of speech recognition systems. For example, the way of determining the isolated word models, and the isolated word models referred to above, could be used in an isolated word speech recognition system. Similarly, many features of the way in which the dynamic programming process is carried out, and the way in which the pruning threshold is adjusted, could be used in any speech recognition system where the reference models correspond to any part of speech, e.g. phonemes, syllables, etc.

The speech recognition system described in the first embodiment can be used in conjunction with many different software applications, for example, a spreadsheet package, a graphics package, a word processor package etc. If the speech recognition system is to be used with a plurality of such software applications, then it might be advantageous to have separate word and language models for each application, especially if the phrases used in each application are different. The reason for this is that as the number of word models increases and as the language model increases in size, the time taken for the system to recognise an input utterance increases. Therefore, by having separate word and language models for each application, the speed of the speech recognition system can be maintained. Additionally, several word and language models could be used for each application.

Additionally, as those skilled in the art will appreciate, the above speech recognition system can also be used in many different types of hardware. For example, apart from the obvious use in a personal computer or the like, the speech recognition system could be used as a user interface to a facsimile machine, telephone, printer, photocopier or any machine having a human/machine interface.

Example Application

Figure 36:
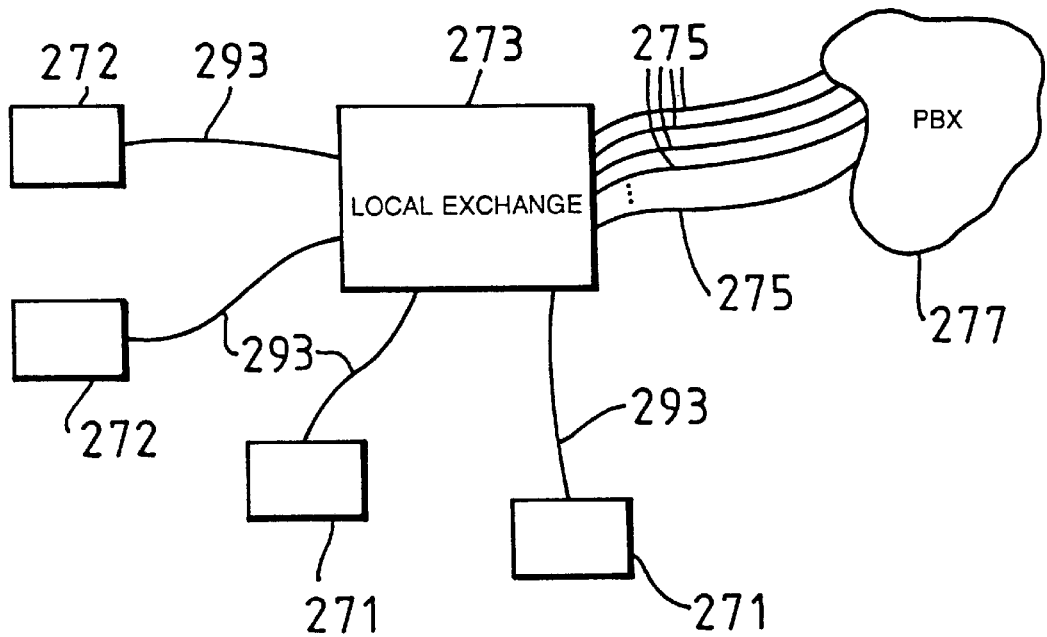
FIG. 36 is a schematic diagram of a telephony system according to an embodiment of the present invention.

One application for the above speech recognition system is in a telephony system. FIG. 36 is a schematic diagram of a typical telephony system employed in an office environment. In particular, the system comprises a number of analogue or digital telephones 271 and modems 272 (which may be connected to computers), which are connected by telephone lines 293 to a local exchange 273 associated with that office. Each telephone 271 is usually associated with a single user or a group of users, and is identified by the local exchange 273 by a caller ID. This allows users within the building to call other users by simply dialling the caller ID of the telephone associated with that other user. The local exchange 273 is also connected, by a number of telephone lines 275, to the public exchange 277 so that remote users can contact users in the office and vice versa. Users who are directly connected to the local exchange 273 and who can access the speech recognition user interface will be referred to hereinafter as local users. Other users will be referred to as remote users. The purpose of the local exchange 273 is to control the connections between internal telephones 271 and between calls to and from the public exchange 277. Additionally, the local exchange 273 provides telephony services to the internal telephones 271 and controls the operation of services provided by the public exchange 277.

Figure 37:
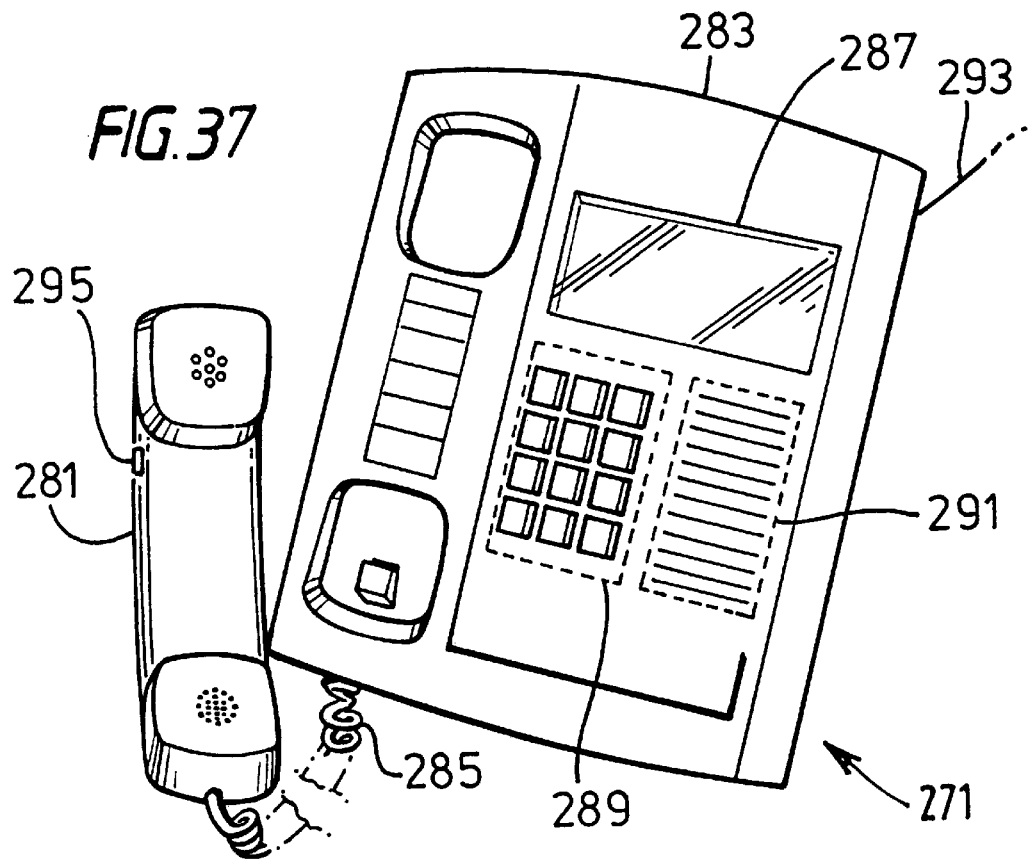
FIG. 37 is a schematic representation of a telephone used in the telephony system shown in FIG. 36.

FIG. 37 is a schematic representation of one of the telephones 271 shown in FIG. 36. In particular, telephone 271 comprises a handset 281 which is connected to a telephone body 283 by line 285. The telephone body 283 has a liquid crystal display 287, a standard twelve-button keypad 289 and a number of function keys 291. The telephone 271 is connected to the local exchange 273 by the telephone line 293. In this embodiment, the local exchange 273 can accept spoken commands for setting up calls between local users, for setting up calls between a local user and a remote user on the public exchange, and for accessing telephony services provided by the local exchange 273 and the public exchange 277. In order for the local exchange 273 to be able to differentiate between voice commands and normal conversation between users, each handset 281 has a control button 295, which is used to delimit speech commands made by a local user from normal conversational speech. For example, if a local user of one of the telephones 271 wishes to call another local user within the office, then this may be achieved by the local user pressing the button 295 and speaking into the microphone in the handset 281 the word "call" together with either the caller ID of the user to be called or an identifier associated with that caller ID, such as the name of the user to be called. A signal from the button 295 together with the speech signal corresponding to the local user's utterance is then supplied to the local exchange 273, via the telephone line 293, where the speech command is recognised and the appropriate connections made. Further details of the speech recognition capability of the local exchange will be described below.

Figure 38:
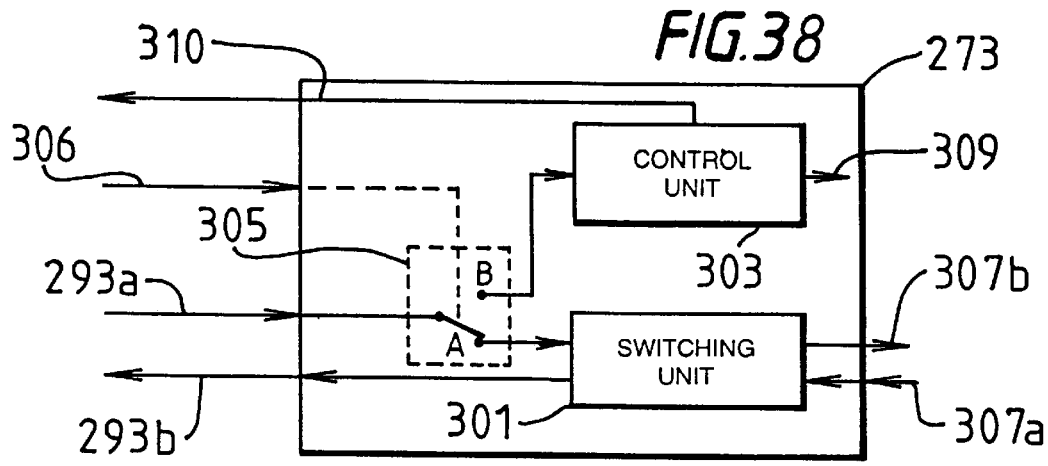
FIG. 38 is a schematic diagram illustrating some of the internal components of a local exchange of the telephony system of FIG. 36.

FIG. 38 is a schematic diagram showing in more detail, part of the structure of the local exchange 273. In particular, the local exchange 273 has a switching network 301 and a control unit 303. A speech signal from a telephone 271 is supplied on line 293a to the local exchange 273, and is either passed on to the switching network 301 or to the control unit 303, depending on the position of switch 305 which is controlled by the signal from button 295 (represented by arrow 306). In particular, if button 295 is not pressed down, then switch 305 will be connected to terminal A and the speech signal from the local user will be supplied to the switching network 301 and out of the local exchange on line 307b to its required destination. If on the other hand button 295 is pressed down, then switch 305 will be connected to terminal B, and the speech signal on line 293a, will be supplied to the control unit 303, which recognises the speech signal and outputs control signals 309 for controlling the operation of the local exchange 273. In this embodiment, the control unit 303 is connected by line 310 to the LCD display 287 of the telephone which was used to input the voice command. In this way, the control unit 303 is able to communicate with the user for the purposes of confirmation and the like. Alternatively, the control unit 303 could communicate with the user by outputting synthesised speech via a loudspeaker on the telephone 271. In order to provide a full duplex communication path, a second communication path is provided through the local exchange 273 to the telephone 271. This second communication path is shown in FIG. 38 by line 293b and line 307a which are connected together via the switching network 301.

Figure 39:
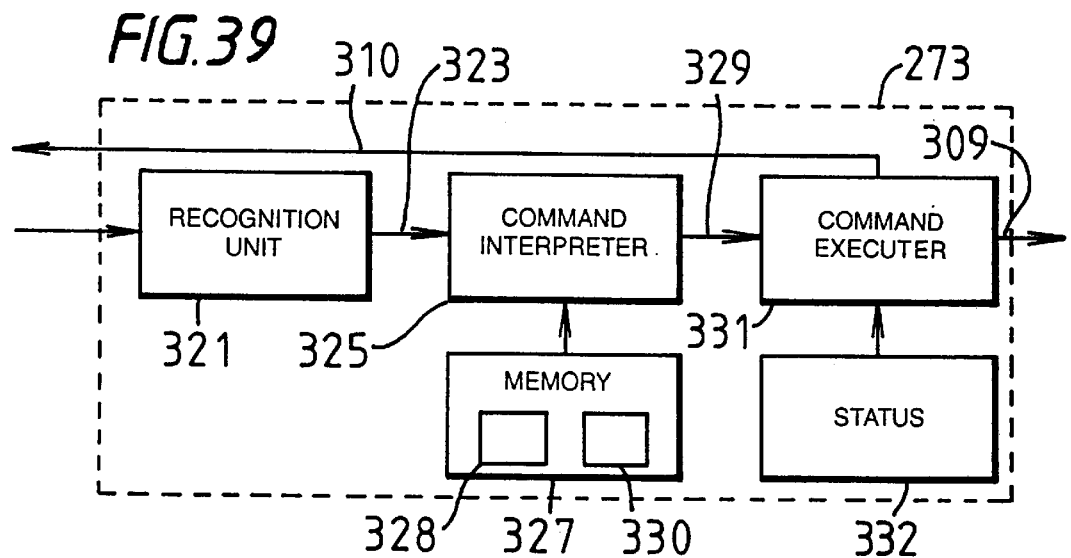
FIG. 39 is a block schematic diagram illustrating the main components of a control unit of the local exchange of FIG. 37.

A description of the control unit 303 will now be given in more detail with reference to FIG. 39, which shows a block schematic diagram illustrating the principle elements of the control unit 303 shown in FIG. 38. In particular, a speech signal from a telephone 271 is supplied to a recognition unit 321 which compares the speech signal with pre-stored models and outputs on line 323 a recognition result which is supplied to a command interpreter 325. The command interpreter 325 identifies any commands and/or identifiers which are in the recognition result by comparing the recognition result with pre-stored dictionaries 328 and 330 stored in memory 327. In response, the command interpreter outputs on line 329 control signals which control the operation of a command executor 331 which controls user confirmation, ensures that the user is not given misleading information and controls the appropriate telephony service (s). Each of these elements will now be described in more detail.

The recognition unit 321 uses a speech recognition system similar to the one described above, and can therefore recognise continuously spoken utterances having a number of words. The recognition unit 321 has a number of predefined recognition results corresponding to the telephony services available. In this embodiment, recognition results are in English, although the system could be adapted for use with any language. To be able to access the telephony services, each local user must train the recognition unit 321 to associate specific input speech signals with corresponding recognition results. This training procedure produces a set of word, noise and language models for each local user. Therefore, since each local user has his own set of models, the actual speech command input by each local user does not have to be the same. For example, to access the automatic dialling telephony service, a first local user might train the speech recognition unit 321 to recognise the spoken command "ring" to access this service, whilst a second local user might train the recognition unit 321 to access the same service for the spoken command "call".

When a new local user is added to the local exchange 273 an initial training routine, which is initiated by the local user pressing one of the function keys 291 on the telephone 271, establishes word models for the speech commands that the new local user will input to access the most basic telephony services, i.e. automatic dialling, call transferring, call holding etc. The new local user is then able to use, to a limited extent, the speech recognition user interface of the local exchange 273. To be able to access the remaining telephony services via the speech recognition interface, the new local user must train the speech recognition unit 321 with the speech commands that he will use to access those services. This further training can be done incrementally and at the user's convenience. In this embodiment, the additional training is initiated by the new local user pressing another one of the function keys 291 on the telephone 271. Upon initiation, the local exchange 273 prompts the new local user, via the LCD display 287, to press the key or combination of keys on the telephone 271 which would normally be pressed to access the telephony service that he wishes to generate word models and update the language model for. In response, the local exchange 273 prompts the new local user, via the LCD display 287, to input, one or more times via the handset 281, a speech command which will be used to generate an appropriate word model which will be associated with that telephony service. After the word model has been generated, the language model is then updated to incorporate the new voice command.

In operation, when a local user speaks into the handset 281 and presses the button 295 at the same time, the recognition unit 321 attempts to recognise the spoken utterance, and in this embodiment outputs a recognition result corresponding to the input utterance. However, at this stage the word or sequence of words output from the recognition unit 321 is meaningless to the telephony system. In order to give the recognition result some meaning, it is interpreted by the command interpreter 325.

To give meaning to the recognition result the command interpreter 325 compares the recognition result with a language specific dictionary 328 and a telephone book 330 associated with the local user who inputs the speech command. Both the dictionary 328 and the telephone book 330 are stored in memory 327. The language specific dictionary 328 is pre-set and depends on the telephony services which can be provided by the local exchange 273 and on the language of the words output by the speech recognition unit 321. The dictionary associates some of the words output by the recognition unit 321, with a corresponding telephony service. The user-defined telephone book 330 stores the telephone numbers and identifiers of other local users connected to the local exchange 273 and of remote users connected to the public exchange 277.

In this embodiment, each local user connected to the local exchange 273 has an associated telephone book 330, and when the local user is identified, either by the telephone 271 that he uses or by some other identification procedure, the corresponding word, noise and language models are loaded into the recognition unit 321 and the corresponding telephone book 330 is loaded into memory 327. The telephone book 330 operates in a similar manner to the pre-stored dictionary 328, except it can be modified by the user, for example to add new entries, or to change telephone numbers associated with existing entries. If a new entry is to be added to a user's telephone book 330, then he must train the speech recognition unit 321 to be able to recognise the spoken utterance he will input to identify the other user.

In this embodiment, a local user can add a new entry into his telephone book 330 in the following manner. Firstly, the local user indicates to the local exchange 273 that he wishes to add a new entry to his telephone book 330 by inputting the spoken command "new entry" via the speech recognition user interface. In response, the local exchange 273 prompts the user, via the display 287, to input in textual form the identifier of that user via the keypad 289. Once the local user has typed in an appropriate identifier, the local exchange 273 then prompts the user, via the LCD display 287, to input the telephone number of the user to be added to the telephone book 330. Once the local user has input the appropriate number using the keypad 289, the local exchange 273 then creates an appropriate entry in the telephone book 330. Finally, the local exchange 273 then prompts the user, via the display 287, to input in spoken form one or more times, the utterance he will input to identify that user, so that the recognition unit 321 can create an appropriate word model and adapt the language model.

The command interpreter 325, therefore receives and interprets the recognition result output by the speech recognition unit 321 to identify which telephony service is required and/or the identifier and telephone number of another user. The command executor 331 receives the output from the command interpreter 325 and initiates a system check, to ensure that the requested telephony service does not contradict what is already happening in the system. If the requested telephony service makes sense, then the command executor 331 requests the local user, via the LCD display 287, to confirm that what the command executor 331 is about to do is what the local user wants. If confirmation is received, then the command executor executes the appropriate telephony service.

For example, if the local user inputs the speech command "call Tom" then, after recognition and interpretation, the command executor 331 outputs on the LCD display 287 "do you want to call Tom?" and waits for a confirmation signal. Once a confirmation signal is received, for example in response to the input of the speech command "yes", the command executor causes the local exchange 273 to take the appropriate actions. Similarly, if the command executor 331 determines that the requested telephony service identified by the command interpreter contradicts what is already happening in the system, then it informs the local user why his input speech command does not make sense. For example, in the above situation, where the input speech command is "call Tom" but the status check tells the command executor 331 that the user is already talking to Tom, then the command executor will output on the display "you are already speaking to Tom".

In this embodiment, the local exchange 273 stores, among other things, the following status information 332 for each local user, i.e. for each telephone 271 connected to the local exchange 273, for use by the command executor 331.

who the user is currently speaking to who the user is dialling who the user has on hold whether or not the user is playing messages who has that user on hold (if known)

who has that user in a conference call (if known)

By storing this information, the command executor 331 can identify whether or not the requested telephony service identified by the command interpreter 325 makes sense.

In addition to the above status information 332, the command executor 331 also stores, in an "action pending" variable, the last output received from the command interpreter 325. The output stored in the action pending variable remains there until either a confirmation signal is input by the local user or until it is replaced by a new output corresponding to a new speech command input by the local user.

Not only does the status information 332 provide a convenient way for the command executor 331 to be able to check whether or not a speech command makes sense, it can also be relied upon by the command executor 331, when the recognition result comprises only an identifier. For example, if the command interpreter 325 identifies from the recognition result that the local user has only input the identifier "Tom", then it outputs a general command together with the identifier Tom and his associated telephone number to the command executor 331. The general command causes the command executor 331 to check the status information 332 to see what command would make sense. In the above example, the general command causes the command executor 331 to check to see whether or not the user Tom is on hold, if not, then it checks to see if the local user is currently speaking to Tom. Again if not, then the command executor 33 outputs "do you want to call Tom" on the LCD display 287 and places the command "call Tom" in the action pending variable.

If on the other hand the identifier is "line 1" (indicating an incoming external call from someone not known to the system), which does not have an associated caller ID, then the command interpreter 325 outputs the identifier "line 1" to the command executor with a limited functionality command which tells the command executor 331 that the command cannot be "call line 1" as this does not make sense.

In addition to outputting confirmation requests, the command executor also outputs to the LCD display 287 status information of calls currently in progress between users, especially when the status changes. For example, if Tom is speaking to the user David, and Tom requests to put David on hold, then, after command confirmation etc., the command executor 331 puts David on hold, outputs on Tom's display "David is on hold" and outputs on David's display, if David is a local user, "Tom has put you on hold".

However, confusion can arise if events occur which cause the status of the local exchange 273 to change quickly. For example, if David rings off during the confirmatory stage for the command "put David on hold", then the command executor would output "David has rung off", and then if Tom confirms his command to put David on hold, the command executor 331 would then output "David is on hold", when in fact he has rung off. In order to avoid the problems of such conflicting messages, while the system enters the confirmation process the status information of the system is held or frozen and any new status information is buffered. Additionally, in order to give the users time to read a message output from the command executor 331, each message is displayed for a set minimum amount of time.

Figure 40:
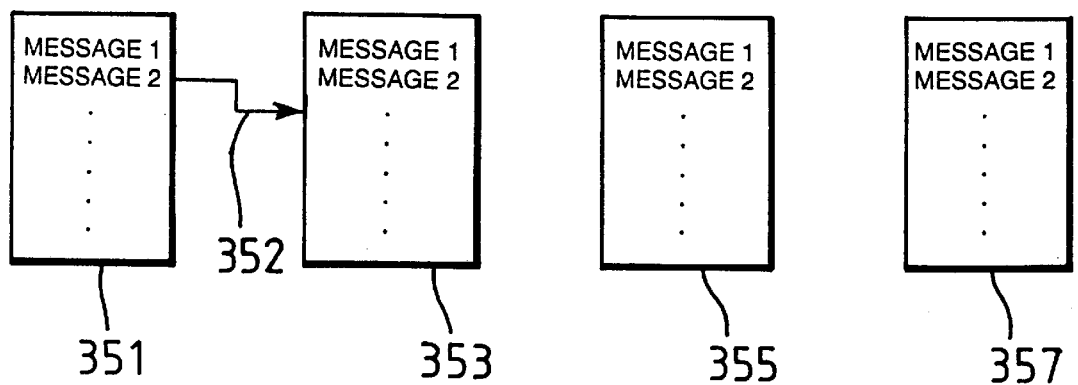
FIG. 40 is a schematic diagram illustrating a new message list, an old message list, a current message list and a waste basket used by a mail box facility of the telephony system in accordance with an embodiment of the present invention.

As mentioned above, modern telephony systems can store messages for each user in an associated mailbox if he is unable to take a call. In this embodiment, the local exchange 273 lists the messages from callers in each mailbox in three notional lists. One for listing new messages, one for listing old messages that have been played back to the user and one for listing a current selection of messages to be played. Additionally, each mailbox has a so called waste basket in which messages are temporarily stored before deletion. In practice, the messages are listed in a single list, and each message has a number of identifiers which tell the local exchange 273 which list(s) each message belongs to. FIG. 40 is a schematic diagram illustrating the new message list 351, the old message list 353, the current message list 355 and the waste basket 357 described above.

In addition to storing the spoken message, the local exchange 273 also stores the time and date that the message was left, and the caller ID of the caller that leaves the message. The caller ID may be an internal telephone number or the telephone number of a telephone connected to the public exchange. Therefore, in this embodiment, if a local user is interested to find out whether or not a particular caller (who is in the telephone book 330 associated with that local user) has left any messages, then he can ask the system to play back messages from that caller. It would also be possible to modify this embodiment, so that local users can use this message retrieval system to replay messages from callers not in the telephone book 330. However, in such an embodiment, the speech recognition unit would have to be able to recognise continuously spoken digits input in any order, which would be difficult to implement using the speech recognition system above, because of the requirements of the language model. Therefore, in such a system, two parallel speech recognition units might be used, one for recognising normal speech commands, and one for recognising digits.

Figure 41:
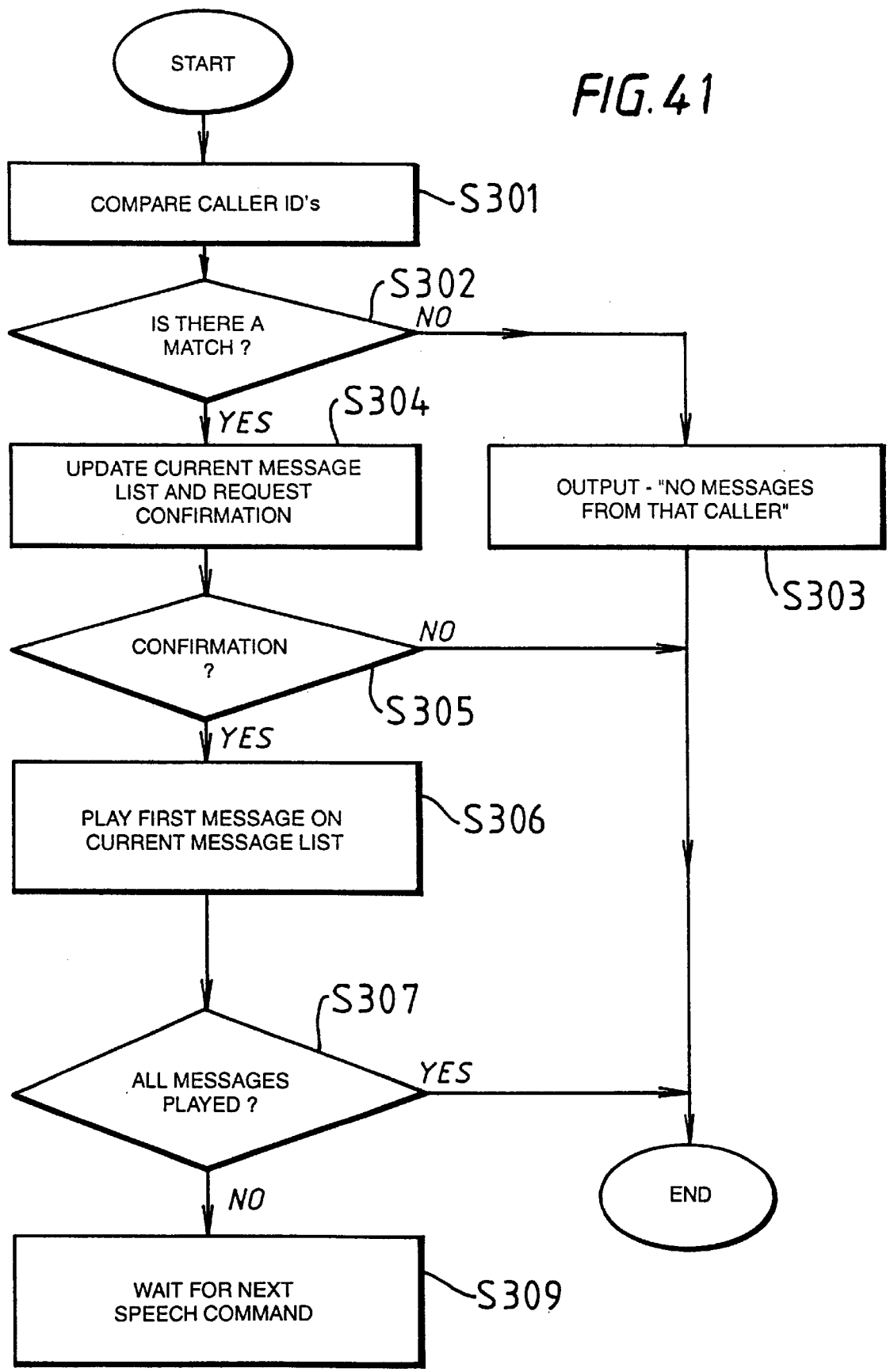
FIG. 41 is a flow chart illustrating the processing steps involved in replaying messages from the mail box facility of FIG. 40.

FIG. 41 is a flow chart which illustrates the processing steps which occur when a local user asks the local exchange 273 to replay new messages from a particular caller. In step s301 the local exchange 273 compares the caller ID of the particular caller with the caller IDs associated with the messages stored in the new message list 351. If the local exchange determines, in step s302, that there is no match, then the local exchange 273 outputs on the local user's display 287, in step s303, that there are no messages from that particular caller and the processing ends. If on the other hand the local exchange 273 determines, in step s302, that there is a match, then in step s304 the local exchange 273 lists the appropriate messages in the current message list 355, and requests the user to confirm the speech command. If confirmation is not received, or if another speech command is input, then the processing ends. If confirmation is received, then the processing proceeds to step s306, where the local exchange 273 plays the first message on the current message list. Additionally, as indicated by arrow 352 shown in FIG. 39, once a message has been played from the current message list, it is moved from the new message list 351 to the old message list 353.

After the first message has been played, the local exchange 273 then determines, in step s307, whether or not all the messages in the current list 355 have been played. If all the messages in the current list 355 have not been played, then the local exchange 273 waits, in step s309, for the local user to input the next speech command. If the next speech command input by the local user is to play the next message, then the local exchange 273 plays the next message on the current message list 355, and the processing returns to step s307. If the local user does not request the next message to be played but instead requests the last message to be replayed, then the local exchange 273 replays the last message played and returns to step s309.

When the local user is playing back messages, he is not restricted to speech commands associated with the mailbox facility. For example, if after the first message has been played, the local user might wish to call another user to relay the message, rather than hear the next message. After doing this, the local user can then ask for the next message to be played. To achieve this, a pointer is used which points to the last message on the current message list 355 which was played.

Once all the messages on the current message list 355 have been played, the local exchange 273 informs the local user of this via the display 287. The current message list 355 is not initialised until the telephone handset 281 is replaced on the telephone body 283 or until it is overwritten by another selection of messages to be played. In a similar manner to the replaying of new messages, old messages can also be selected for replay. Once messages have been played or once they no longer need to be kept, the local user can input an appropriate speech command to delete the messages. For example, once a local user has replayed all new messages from the user David, he may input the speech command "Delete old messages from David". After confirmation, the local exchange places all old messages from David into the waste basket 357.

As described above, the local user can ask the local exchange 273 to repeat an action. In order to be able to do this, the local exchange 273 stores, in a stored variable the last repeatable action. Therefore, when the local user inputs the speech command "repeat", the local exchange 273 executes the action which is stored in that variable. In addition, in order to facilitate repeating commands, the system uses a general pointer which tells the local exchange which facility the user is currently using, eg the mailbox facility or the telephone call facility. This pointer is also used to save time in determining what is required when a vague command is input. For example, if the user inputs the command "stop", i.e. to stop playing a message or to stop dialling someone, then by using this general pointer to identify what facility the user is currently using, the local exchange 273 does not have to identify all actions that are currently in progress in each facility.

As mentioned above, the telephony system of this embodiment can set up and control conference calls between a number of users. In this embodiment, a conference call is initiated in the following manner. Firstly, a local user calls another user, for example, Tom and then puts him on hold. The local user then calls another user who is to be included in the conference, for example David, and then while speaking to David presses the button 295 on the handset 281 and inputs the speech command "include" together with the identifer for Tom. The local exchange 273 then outputs on the local user's display 287 the query "do you want to include Tom?", and after confirmation by the local user, the local exchange 273 makes the appropriate connection via the switching unit 301 so that the local user is connected to both Tom and David.

In this way, the local user can call Tom and inform him that he wishes to arrange a conference together with David and then, whilst Tom is on hold, the local user can then call David and inform him that Tom is on another line and holding, and that he wishes to talk to both Tom and David together. In this way, both Tom and David will know that they are about to be included in a conference call, and they will know who will be in the conference. Other users may also be included in the conference in a similar manner.

In this embodiment, for convenience, only the local user who initiates the first call is in control of the conference, and can disconnect people from the conference, place some of the people in the conference on hold and include further people in the conference. However, it is envisaged that this embodiment could be modified to allow any of the callers in the conference to be able to control to some extent the conference, even callers from the public exchange 277, Callers from the public exchange 277 can only control the conference if they can send an appropriate control signal, for example a tone signal produced by a key on the user's handset, together with the speech commands down the telephone line 275 to the local exchange 273, so that the speech commands are fed into the control unit 303 and not the switching unit 301.

Although in the above described telephony system, a single control unit 303 was used, it would be possible to use several of these control units in parallel, thereby allowing more than one user to be able to input speech commands at the same time. Alternatively, the use of the control unit 303 could be time multiplexed, thereby allowing a number of different users to be able to use the control unit 303 at the same time. In another embodiment, each telephone 271 could have a control unit 303 for processing speech commands. However, this embodiment suffers from the disadvantage that the cost of each telephone increases dramatically, due to the need for specialised software and hardware to be built into each telephone 271.

By using a speech recognition system which stores word models and uses a language model to define allowed sequences of input words, the speech recognition interface can accept, in a single utterance, both a request for a telephony service and an identifier of another user, thereby alleviating the need for repetitive iteration between the user and the interface.

Additionally, although the telephony system of this embodiment uses the speech recognition system described with reference to FIGS. 1 to 35, other speech recognition systems could be used in the telephony system. However, by using the speech recognition system described with reference to FIGS. 1 to 35, it is possible to provide the telephony system to end users, with no pre-stored models. Further, since the system breaks down the input commands into individual words, the storage space required to store the reference models may be significantly reduced if there is a large amount of duplication of the words making up the speech commands.

The present invention is not intended to be limited by the exemplary embodiments described above, and various other modifications and embodiments will be apparent to those skilled in the art.

What we claim is:

1. An apparatus for performing a dynamic programming pattern matching process, the apparatus comprising:

input means for inputting a sequence of input patterns representative of an input signal;

memory means for storing a plurality of sequences of references patterns, each sequence being representative of a reference signal;

means for processing a current input pattern with respect to at least some of the reference signals in turn, comprising:

(1) means for defining as active patterns the reference patterns of a current reference signal which are at the end of a dynamic programming path for the current into pattern being processed, each path representing a possible matching between an ordered sequence of reference patterns and an ordered sequence of input patterns ending at said current input pattern, and for listing the active patterns for the current input pattern in a current active list;

(2) means for storing in a store associated with each active pattern, a cumulative value representative of a score for the dynamic programming path which ends at that active pattern for said current input pattern; and (3) means for processing each active pattern of said current reference signal in reverse sequential order, to update said cumulative values and to propagate said dynamic programming paths based on constraints which are placed on the dynamic programming path propagation, said active pattern processing means comprising:

(A) means for updating the cumulative value stored in the store associated with a current active pattern being processed, using said current input pattern; and (B) means for propagating the dynamic programming path associated with the current active pattern, and for listing, if it is not already listed, each reference pattern of the current reference signal, which may be at the end of that dynamic programming path for the succeeding input pattern, in a new active list; and wherein said propagating means is controlled using a pointer associated with the current reference signal, which identifies the reference pattern which is the earliest in the sequence of patterns of the current reference signal listed in the new active list, after the processing of the preceding active pattern, such that the propagating means can propagate each dynamic programming path without the need to search the new active list to identify which reference patterns, of the current reference signal, have been listed on the new active list as a result of said active pattern processing means processing preceding active patterns of the current reference signal.

2. An apparatus according to claim 1, wherein the propagating means comprises:

(i) means for determining which of the reference patterns of the current reference signal are potentially at an end of the dynamic programming path which ends at said current active pattern for said succeeding input pattern, based upon said constraints which are placed on the dynamic programming path propagation; and (ii) means for copying appropriate cumulative values into stores associated with the reference patterns determined by said determining means.

3. An apparatus according to claim 2, wherein said propagating means further comprises means for processing each of the reference patterns determined by said determining means comprising:

means for discriminating whether a current reference pattern being processed is sequentially beyond any reference pattern identified by said pointer; and means, responsive to said discriminating means, for (i) copying the cumulative value stored in the store associated with said current active pattern into the store associated with the current reference pattern, if it is better than the cumulative value already stored there and if the current reference pattern is the same as or sequentially beyond the identified reference pattern; and (ii) copying the cumulative value stored in the store associated with said current active pattern into the store associated with said current reference pattern, and listing said current reference pattern in the new active list, if the current reference pattern is sequentially before the identified reference pattern or if there are no reference patterns of the current reference signal in the new active list.

4. An apparatus according to claim 3, wherein said reference pattern processing means is operable to process said reference patterns determined by said determining means in reverse sequential order.

5. An apparatus according to claim 2, wherein said propagating means is operable to list the current active pattern in the new active list, if this is not contrary to any constraint placed on the dynamic programming process if one of the reference patterns determined by said determining means is the current active pattern.

6. An apparatus according to claim 1, further comprising means for setting the pointer associated with the current reference signal to identify the reference pattern on the new active list which is the earliest in the sequence of patterns of the current reference signal once the new active list has been updated by the processing of the current active pattern by said active pattern processing means.

7. An apparatus according to claim 1, wherein the input pattern processing means is operable to process the current input pattern before the succeeding input pattern is received.

8. An apparatus according to claim 1, wherein said input means is operable to input the whole input signal before the first input pattern is processed by said input pattern processing means.

9. An apparatus according to claim 1, further comprising a current active list and a new active list for each reference signal.

10. An apparatus according to claim 1, wherein said propagating means is operable to list said reference patterns in said new active list in reverse sequential order.

11. An apparatus according to claim 1, further comprising means for preventing said active pattern processing means from processing the current active pattern, if the cumulative value is associated therewith is worse than a preset threshold value.

12. An apparatus according to claim 11, further comprising means for varying said threshold value in order to try to maintain the number of active patterns processed by said active pattern processing means for each input pattern processed by said input pattern processing means to be below a given maximum number.

13. An apparatus according to claim 12, wherein the threshold value varying means is operable to set the threshold value used during the processing of the succeeding input pattern during the processing of the current input pattern, and is dependent upon the total number of reference patterns in the new active list or lists for the succeeding input pattern.

14. An apparatus according to claim 1, further comprising constraining means for constraining said dynamic programming path propagation so that a limit is placed on the number of consecutive input patterns that a reference pattern can be matched with, on the same dynamic programming path.

15. An apparatus according to claim 1, further comprising constraining means for constraining said dynamic programming path propagation so that it a reference pattern is matched with an input pattern, then a limited number of reference patterns which are sequentially beyond that reference pattern can be matched with the succeeding input pattern, on the same dynamic programming path.

16. An apparatus according to claim 1, further comprising constraining means for constraining said dynamic programming path propagation so that if a reference pattern is matched with an input pattern, then reference patterns which are sequentially before that reference pattern can not be matched with the succeeding input pattern, on the same dynamic programming path.

17. An apparatus according to claim 1, wherein said reference patterns are representative of a template, and wherein said cumulative values are distance measures.

18. An apparatus according to claim 1, wherein said reference patterns are representative of a statistical model, and wherein said cumulative values are probabilistic measures.

19. An apparatus according to claim 1, wherein said apparatus is arranged so that said input signal can be matched with a sequence of said reference signals, by allowing dynamic programming paths propagating in one reference signal to subsequently propagate into other reference signals.

20. An apparatus according to claim 19, wherein said apparatus is arranged so that only the dynamic programming path, which has the best cumulative value of all the dynamic programming paths which leave the reference pattern for the current input pattern, propagates further.

21. An apparatus according to claim 19, further comprising means for using a set of defined rules for constraining the sequence of reference signals against which the input signal can be matched.

22. An apparatus according to claim 19, further comprising reference signal processing means operable, after the current input pattern has been processed with respect to the reference signals by said input pattern processing means, to process those reference signals to update the new active list and to update the cumulative values associated with the reference patterns at the beginning of those reference signals, which are potentially at an end of a dynamic programming path which enters the corresponding reference signal, based upon said constraints, using the best cumulative value of all the dynamic programming paths which can enter that reference signal.

23. An apparatus according to claim 1, wherein said input signal is a speech signal, and wherein each input pattern comprises a number of parameters representative of the acoustic properties of the speech signal during a corresponding time frame.

24. An apparatus according to claim 23, wherein said input speech signal can be matched to a sequence of reference speech signals, and wherein the allowed sequences are defined by a language model.

25. An apparatus according to claim 24, wherein said apparatus is arranged so that the end of a dynamic programming path which leaves a reference signal when processing the current input pattern can be matched with a pattern representative of background noise for succeeding input patterns.

26. A speech recognition apparatus for recognizing an input speech signal by comparing it with a plurality of reference speech signals, the apparatus comprising:
  means for extracting a sequence of input patterns representative of an input speech signal;
  means for storing sequences of reference patterns, each sequence being representative of a corresponding reference speech signal;
  means for matching the sequence of input patterns with the reference speech signal, using an apparatus for performing a dynamic programming pattern matching process, the dynamic-programming-pattern-matching-process apparatus comprising:
    input means for inputting a sequence of input patterns representative of an input signal;
    memory means for storing a plurality of sequences of references patterns, each sequence being representative of a reference signal; and
    means for processing a current input pattern with respect to at least some of the reference signals in turn, comprising:
      (1) means for defining as active patterns the reference patterns of a current reference signal which are at the end of a dynamic programming path for the current input pattern being processed, each path representing a possible matching between an ordered sequence of reference patterns and an ordered sequence of input patterns ending at said current input pattern, and for listing the active patterns for the current input pattern in a current active list;
      (2) means for storing in a store associated with each active pattern, a cumulative value representative of a score for the dynamic programming path which ends at that active pattern for said current input pattern; and
      (3) means for processing each active pattern of said current reference signal in reverse sequential order, to update said cumulative values and to propagate said dynamic programming paths based on constraints which are placed on the dynamic programming path propagation, said active pattern processing means comprising:
        (a) means for updating the cumulative value stored in the store associated with a current active pattern being processed, using said current input pattern; and
        (b) means for propagating the dynamic programming path associated with the current active pattern, and for listing, if it is not already listed, each reference pattern of the current reference signal, which may be at the end of that dynamic programming path for the succeeding input pattern, in a new active list; and
    wherein said propagating means is controlled using a pointer associated with the current reference signal, which identifies the reference pattern which is the earliest in the sequence of patterns of the current reference signal listed in the new active list, after the processing of the preceding active pattern, such that the propagating means can propagate each dynamic programming path without the need to search the new active list to identify which reference patterns, of the current reference signal, have been listed on the new active list as a result of said active pattern processing means processing preceding active patterns of the current reference signal, and wherein said input signal is a speech signal, and wherein each input pattern comprises a number of parameters representative of the acoustic properties of the speech signal during a corresponding time frame; and means for providing a recognition result from cumulative values determined by said matching means.

27. An apparatus according to claim 26, wherein said providing means is operable to provide said recognition result by determining which of the dynamic programming paths which end at the last input pattern in the sequence has the best cumulative value.

28. A computer-readable memory medium storing a computer-readable program embodied therein for instructing a computer to perform a dynamic programming pattern matching process between a sequence of input patterns representative of an input signal, and a number of stored sequences of reference patterns, each sequence being representative of a reference signal, wherein the program instructs the computer to process each input pattern in turn with respect to at least some of the reference signals, said program comprising:

(1) a defining instructing means for instructing the computer to define as active patterns the reference patterns of a current reference signal which are at the end of a dynamic programming path for a current input pattern being processed, each path representing a possible matching between an ordered sequence of reference patterns and an ordered sequence of input patterns ending at said current input pattern, and for instructing the computer to list the active patterns for the current input pattern in a current active list;

(2) a storing instructing means for instructing the computer to, for each active pattern, store in a store associated with that active pattern, a cumulative value representative of a score for the dynamic programming path which ends at that active pattern for said current input pattern; and (3) an updating and propagating instructing means for instructing the computer to update said cumulative values and to propagate said dynamic programming paths based on constraints which are placed on the dynamic programming path propagation, by processing each active pattern of said current reference signal in reverse sequential order, comprising:

(A) an updating instructing means for instructing the computer to update the cumulative value stored in the store associated with a current active pattern being processed, using said current input pattern; and (b) (B) a first propagating instructing means for instructing the computer to propagate the dynamic programming path associated with the current active pattern, and to list, if it is not already listed, each reference pattern of the current reference signal, which may be at the end of that dynamic programming path for the succeeding input pattern, in a new active list; and wherein the propagating operation for each dynamic programming path for a current reference signal is controlled using a pointer associated with the current reference signal, which identifies the reference pattern which is the earliest in the sequence of patterns of the current reference signal listed in the new active list, after the processing of the preceding active pattern, such that the propagation of each dynamic programming path is achieved without the need to search the new active list to identify which reference patterns, of the current reference signal, have been listed on the new active list as a result of processing preceding active patterns.

29. A computer-readable medium according to claim 28, wherein said first propagating comprises:

(i) a determining instructing means for instructing the computer to determine which of the reference patterns of the current reference signal are potentially at an end of the dynamic programming path which ends at said current active pattern for said succeeding input pattern, based upon said constraints which are placed on the dynamic programming path propagation; and (ii) a second propagating instructing means for instructing the computer to propagate the dynamic programming path, an updating instructing means for instructing the computer to update the new active list, and a copying instructing means for instructing the computer to copy appropriate cumulative values into stores associated with the reference patterns caused to be determined by the determining instructing means by processing each reference pattern caused to be determined by said determining instructing means.

30. A computer-readable medium according to claim 29, wherein each reference pattern caused to be determined by said determining instructing means, except the current active pattern if it is one of those reference patterns, is caused to be processed by the following means:

a discriminating instructing means for causing the computer to discriminate whether a current reference pattern being processed is sequentially beyond any reference pattern identified by said pointer; and a copying instructing means for causing the computer to copy (i) the cumulative value stored in the store associated with said current active pattern into the store associated with the current reference pattern, if it is better than the cumulative value already stored there and if the current reference pattern is the same as or sequentially beyond the identified reference pattern; and (ii) the cumulative value stored in the store associated with said current active pattern into the store associated with said current reference pattern, and to list said current reference pattern in the new active list, if the current reference pattern is sequentially before the identified reference pattern or if there are no reference patterns of the current reference signal in the new active list.

31. A computer-readable medium according to claim 29, wherein said first propagating instructing means further comprises a listing instructing means for causing the computer to list the current active pattern in the new active list, if this is not contrary to any constraint placed on the dynamic programming process if one of the reference patterns caused to be determined by said determining instructing means is the current active pattern.

32. A computer-readable medium according to claim 29, wherein said program instructing means comprises a reference pattern processing instructing means for instructing the computer to process said reference patterns in reverse sequential order.

33. A computer-readable medium according to claim 28, said program instructing means further comprising a setting instructing means for causing the computer to set said pointer associated with the current reference signal to identify the reference pattern on the new active list which is the earliest in the sequence of patterns of the current reference signal once the new active list has been updated by the processing of the current active pattern.

34. A computer-readable medium according to claim 28, said program instructing means further comprising a processing instructing means for instructing the computer to process the current input pattern before the succeeding input pattern is received.

35. A computer-readable medium according to claim 28, wherein said program instructing means further comprises a receiving code for causing the computer to receive the whole input signal before the first input pattern is processed.

36. A computer-readable medium according to claim 28, wherein said program instructing means further comprises an associating instructing means for causing the computer to associate a current active list and a new active list with each reference signal.

37. A computer-readable medium according to claim 28, wherein said first propagating instructing means cause the computer to list said reference patterns in said new active list in reverse sequential order.

38. A computer-readable medium according to claim 28, said program instructing means further comprises a preventing instructing means for instructing the computer to prevent said current active pattern from being caused to be processed by said updating and second propagating instructing means if the cumulative value associated therewith is worse than a preset threshold value.

39. A computer-readable medium according to claim 38, said program instructing means further comprising a varying instructing means for causing the computer to vary said threshold value to try to maintain the number of active patterns processed for each input pattern to be below a given maximum number.

40. A computer-readable medium according to claim 39, wherein said varying instructing means also causes the computer to set the threshold value used during the processing of the succeeding input pattern during the processing of the current input pattern, dependent upon the total number of reference patterns in the new active list or lists for the succeeding input pattern.

41. A computer-readable medium according to claim 28, said program instructing means further comprising a constraining instructing means for instructing the computer to constrain said dynamic programming path propagation so that a limit is placed on the number of consecutive input patterns that a reference pattern can be matched with, on the same dynamic programming path.

42. A computer-readable medium according to claim 28, said program instructing means further comprising a constraining instructing means for instructing the computer to constrain said dynamic programming path propagation so that if a reference pattern is matched with an input pattern, then a limited number of reference patterns which are sequentially beyond that reference pattern can be matched with the succeeding input pattern, on the same dynamic programming path.

43. A computer-readable medium according to claim 28, said program instructing means further comprising a constraining instructing means for instructing the computer to constrain said dynamic programming path propagation so that if a reference pattern is matched with an input pattern, then reference patterns which are sequentially before that reference pattern can not be matched with the succeeding input pattern, on the same dynamic programming path.

44. A computer-readable medium according to claim 28, wherein said reference patterns are representative of a template, and wherein said cumulative values are distance measures.

45. A computer-readable medium according to claim 28, wherein said reference patterns are representative of a statistical model, and wherein said cumulative values are probabilistic measures.

46. A computer-readable medium according to claim 28, wherein said program instructing means further comprises a instructing means for causing the computer to match said input signal with a sequence of said reference signals, by allowing dynamic programming paths propagating in one reference signal to subsequently propagate into other reference signals.

47. A computer-readable medium according to claim 46, wherein said program instructing means further comprises instructing means for causing the computer to cause to propagate further only the dynamic programming path which has the best cumulative value of all the dynamic programming paths which leave the reference pattern for the current input pattern.

48. A computer-readable medium according to claim 46, wherein said program instructing means further comprises a constraining instructing means for causing the computer to constrain the sequence of reference signals, against which the input signal can be matched, in accordance with a set of defined rules.

49. A computer-readable medium according to claim 46, wherein said program instructing means further comprises a processing instructing means for causing the computer to process, after the current input pattern has been processed with respect to the reference signals, those reference signals to update the new active list and to update the cumulative values associated with the reference patterns at the beginning of those reference signals, which are potentially at an end of a dynamic programming path which enters the corresponding reference signal, based upon said constraints, using the best cumulative value of all the dynamic programming paths which can enter that reference signal.

50. A computer-readable medium according to claim 28, wherein said input signal is a speech signal, and wherein each input pattern comprises a number of parameters representative of the acoustic properties of the speech signal during a corresponding time frame.

51. A computer-readable medium according to claim 50, wherein said program instructing means further comprises instructing means for causing the computer to match said input speech signal to a sequence of reference speech signals, and to define the allowed sequences by a language model.

52. A computer-readable medium according to claim 51, wherein said program instructing means further comprises instructing means for causing the computer to match the end of a dynamic programming path which leaves a reference signal when processing the current input pattern with a pattern representative of background noise for succeeding input patterns.

53. Computer executable software stored on a computer-readable medium, for instructing a computer to perform speech recognition to recognize an acoustic speech signal produced by a user and input into a microphone which produces an electrical speech signal representative thereof by comparing the electrical speech signal with a plurality of reference speech signals, the software comprising:

a first instruction for instructing the computer to extract a sequence of input patterns from the input electrical speech signal representative of the input acoustic speech signal produced by the user;

a second instruction for instructing the computer to store sequences of reference patterns, each sequence being representative of a corresponding reference speech signal;

a third instruction for instructing the computer to match the sequence of input patterns with the reference speech signal using a dynamic programming pattern matching process, the third instruction comprising a fourth instruction for instructing the computer to process a current input pattern with respect to at least some of the reference signals in turn, said fourth instruction comprising:

a fifth instruction for instructing the computer to define as active patterns the reference patterns of a current reference signal which are at the end of a dynamic programming path for the current into pattern being processed, each path representing a possible matching between an ordered sequence of reference patterns and an ordered sequence of input patterns ending at said current input pattern, and for listing the active patterns for the current input pattern in a current active list;

a sixth instruction for instructing the computer to store in a store associated with each active pattern, a cumulative value representative of a score for the dynamic programming path which ends at that active pattern for said current input pattern; and a seventh instruction for instructing the computer to process each active pattern of said current reference signal in reverse sequential order, to update said cumulative values and to propagate said dynamic programming paths based on constraints which are placed on the dynamic programming path propagation, said seventh instruction comprising:

an eighth instruction for instructing the computer to update the cumulative value stored in the store associated with a current active pattern being processed, using said current input pattern; and a ninth instruction for instructing the computer to propagate the dynamic programming path associated with the current active pattern, and for listing, if it is not already listed, each reference pattern of the current reference signal, which may be at the end of that dynamic programming path for the succeeding input pattern, in a new active list; and wherein said ninth instruction instructs the computer to control the propagating means using a pointer associated with the current reference signal, which identifies the reference pattern which is the earliest in the sequence of patterns of the current reference signal listed in the new active list, after the processing of the preceding active pattern, such that the ninth instruction instructs the computer to propagate each dynamic programming path without the need to search the new active list to identify which reference patterns, of the current reference signal, have been listed on the new active list as a result of said seventh instruction instructing the computer to process preceding active patterns of the current reference signal; and a tenth instruction for instructing the computer to display recognized speech derived from the cumulative values caused to be determined by said third instruction or to use the recognized speech as operator commands to control at least one operation of the computer from the cumulative values caused to be determined by said third instruction.

54. The software according to claim 53, wherein the ninth instruction comprises:

(i) an eleventh instruction for instructing the computer to determine which of the reference patterns of the current reference signal are potentially at an end of the dynamic programming path which ends at said current active pattern for said succeeding input pattern, based upon said constraints which are placed on the dynamic programming path propagation; and (ii) a twelfth instruction for instructing the computer to copy appropriate cumulative values into stores associated with the reference patterns caused to be determined by said eleventh instruction.

55. The software according to claim 54, wherein said ninth instruction further comprises a thirteen instruction for instructing the computer to process each of the reference patterns caused to be determined by said eleventh instruction comprising:

(a) a fourteenth instruction for instructing the computer to discriminate whether a current reference pattern being processed is sequentially beyond any reference pattern identified by said pointer; and (b) a fifteenth instruction, responsive to said discriminating caused to be performed by said fourteenth instruction [code], for instructing the computer to (i) copy the cumulative value stored in the store associated with said current active pattern into the store associated with the current reference pattern, if it is better than the cumulative value already stored there and if the current reference pattern is the same as or sequentially beyond the identified reference pattern; and to (ii) copy the cumulative value stored in the store associated with said current active pattern into the store associated with said current reference pattern, and listing said current reference pattern in the new active list, if the current reference pattern is sequentially before the identified reference pattern or if there are no reference patterns of the current reference signal in the new active list.

56. The software according to claim 55, wherein said thirteenth instruction instructs the computer to process said reference patterns caused to be determined by said eleventh instruction in reverse sequential order.

57. The software according to claim 54, wherein said ninth instruction also instructs the computer to list the current active pattern in the new active list, if this is not contrary to any constraint placed on the dynamic programming process if one of the reference patterns caused to be determined by said eleventh instruction is the current active pattern.

58. The software according to claim 53, further comprising means an eleventh instruction for instructing the computer to set the pointer associated with the current reference signal to identify the reference pattern on the new active list which is the earliest in the sequence of patterns of the current reference signal once the new active list has been updated by the processing of the current active pattern instructed to be performed by said fourth instruction.

59. The software according to claim 53, wherein the fourth instruction instructs the computer to process the current input pattern before the succeeding input pattern is received.

60. The software according to claim 53, wherein the whole electrical speech signal is input before said fourth instruction instructs the computer to process the first input pattern.

61. The software according to claim 53, wherein said fifth and ninth instructions instruct the computer to generate a current active list and a new active list for each reference signal.

62. The software according to claim 53, wherein said ninth instruction instructs the computer to list said reference patterns in said new active list in reverse sequential order.

63. The software according to claim 53, further comprising an eleventh instruction for instructing the computer to prevent said seventh instruction from instructing the computer to process the current active pattern, if the cumulative value is associated therewith is worse than a preset threshold value.

64. The software according to claim 63, further comprising a twelfth instruction for instructing the computer to vary said threshold value in order to try to maintain the number of active patterns caused to be processed by said seventh instruction for each input pattern caused to be processed by said fourth instruction to be below a given maximum number.

65. The software according to claim 64, wherein the twelfth instruction code instructs the computer to set the threshold value used during the processing of the succeeding input pattern during the processing of the current input pattern, and is dependent upon the total number of reference patterns in the new active list or lists for the succeeding input pattern.

66. The software according to claim 53, further comprising an eleventh instruction for instructing the computer to constrain said dynamic programming path propagation so that a limit is placed on the number of consecutive input patterns that a reference pattern can be matched with, on the same dynamic programming path.

67. The software according to claim 53, further comprising an eleventh instruction for instructing the computer to constrain said dynamic programming path propagation so that if a reference pattern is matched with an input pattern, then a limited number of reference patterns which are sequentially beyond that reference pattern can be matched with the succeeding input pattern, on the same dynamic programming path.

68. The software according to claim 53, further comprising an eleventh instruction for instructing the computer to constrain said dynamic programming path propagation so that if a reference pattern is matched with an input pattern, then reference patterns which are sequentially before that reference pattern can not be matched with the succeeding input pattern, on the same dynamic programming path.

69. The software according to claim 53, wherein said reference patterns are representative of a template, and wherein said cumulative values are distance measures.

70. The software according to claim 53, wherein said reference patterns are representative of a statistical model, and wherein said cumulative values are probabilistic measures.

71. The software according to claim 53, further comprising an eleventh instruction for instructing the computer to match said input electrical speech signal with a sequence of said reference signals, by allowing dynamic programming paths propagating in one reference signal to subsequently propagate into other reference signals.

72. The software according to claim 71, further comprising a twelfth instruction for instructing the computer to propagate further only the dynamic programming path, which has the best cumulative value of all the dynamic programming paths which leave the reference pattern for the current input pattern.

73. The software according to claim 71, further comprising a twelfth instruction for instructing the computer to use a set of defined rules for constraining the sequence of reference signals against which the input signal can be matched.

74. The software according to claim 71, further comprising a twelfth instruction for instructing the computer to, after the current input pattern has been processed with respect to the reference signals, process those reference signals to update the new active list and to update the cumulative values associated with the reference patterns at the beginning of those reference signals, which are potentially at an end of a dynamic programming path which enters the corresponding reference signal, based upon said constraints, using the best cumulative value of all the dynamic programming paths which can enter that reference signal.

75. The software according to claim 53, wherein each input pattern comprises a number of parameters representative of the acoustic properties of the speech signal during a corresponding time frame.

76. The software according to claim 75, wherein the allowed sequences are defined by a language model.

77. The software according to claim 76, further comprising a twelfth instruction for instructing the computer match the end of a dynamic programming path which leaves a reference signal when processing the current input pattern with a pattern representative of background noise for succeeding input patterns.

78. A computer-readable memory medium for storing a first computer-readable program embodied therein for instructing a computer to perform a speech recognition process for recognizing an input speech signal by comparing it with a plurality of reference speech signals, the first program comprising:

an extracting instructing means for causing the computer to extract a sequence of input patterns representative of said input speech signal;

a first storing instructing means for causing the computer to store sequences of reference patterns, each sequence being representative of a corresponding reference speech signal;

a matching instructing means for causing the computer to match the sequence of input patterns with the reference speech signals, the matching instructing means comprising:

a second program instructing means embodied for instructing a computer to perform a dynamic programming pattern matching process between a sequence of input patterns representative of an input signal, and a number of stored sequences of reference patterns, each sequence being representative of a reference signal, wherein the second program instructing means instructs the computer to process each input pattern in turn with respect to at least some of the reference signals, said second program instructing means comprising:

(1) a defining instructing means for instructing the computer to define as active patterns the reference patterns of a current reference signal which are at the end of a dynamic programming path for a current input pattern being processed, each path representing a possible matching between an ordered sequence of reference patterns and an ordered sequence of input patterns ending at said current input pattern, and for instructing the computer to list the active patterns for the current input pattern in a current active list;

(2) a second storing instructing means for instructing the computer to, for each active pattern, store in a store associated with that active pattern, a cumulative value representative of a score for the dynamic programming path which ends at that active pattern for said current input pattern; and (3) an updating and propagating instructing means for instructing the computer to update said cumulative values and to propagate said dynamic programming paths based on constraints which are placed on the dynamic programming path propagation, by processing each active pattern of said current reference signal in reverse sequential order, comprising:
- (A) an updating instructing means for instructing the computer to update the cumulative value stored in the store associated with a current active pattern being processed, using said current input pattern; and then
- (B) a first propagating instructing means for instructing the computer to propagate the dynamic programming path associated with the current active pattern, and to list, if it is not already listed, each reference pattern of the current reference signal, which may be at the end of that dynamic programming path for the succeeding input pattern, in a new active list; and wherein the propagating operation for each dynamic programming path for a current reference signal is controlled using a pointer associated with the current reference signal, which identifies the reference pattern which is the earliest in the sequence of patterns of the current reference signal listed in the new active list, after the processing of the preceding active pattern, such that the propagation of each dynamic programming path is achieved without the need to search the new active list to identify which reference patterns, of the current reference signal, have been listed on the new active list as a result of processing preceding active patterns; and a providing instructing means for causing the computer to provide a recognition result from cumulative values determined by said matching step.

79. A computer-readable memory according to claim 78, wherein said providing instructing means comprises instructing means for causing the computer to provide said recognition result by determining which of the dynamic programming paths which end at the last input pattern in the sequence has the best cumulative value.

80. A speech recognition apparatus for recognizing all input speech signal by comparing it with a plurality of reference speech signals, the apparatus comprising:

a first circuit configured to extract a sequence of input patterns representative of an input speech signal from an input speech signal;

a second circuit configured to store sequences of reference patterns, each sequence being representative of a corresponding reference speech signal;

a third circuit configured to match the sequence of input patterns with the reference speech signal, using a fourth circuit configured to perform a dynamic programming pattern matching process, the fourth circuit comprising:
a fifth circuit configured to input the sequence of input patterns representative of an input speech signal; and
a sixth circuit configured to process a current input pattern with respect to at least some of the reference signals in turn, comprising:
- (1) a seventh circuit configured to define as active patterns the reference patterns of a current reference signal which are at the end of a dynamic programming path for the current input pattern being processed, each path representing a possible matching between an ordered sequence of reference patterns and an ordered sequence of input patterns ending at said current input pattern, and for listing the active patterns for the current input pattern in a current active list;
- (2) an eighth circuit configured to store in a store associated with each active pattern, a cumulative value representative of a score for the dynamic programming path which ends at that active pattern for said current input pattern; and
- (3) a ninth circuit configured to process each active pattern of said current reference signal in reverse sequential order, to update said cumulative values and to propagate said dynamic programming paths based on constraints which are placed on the dynamic programming path propagation, ninth circuit comprising:
  - (a) a tenth circuit configured to update the cumulative value stored in the store associated with a current active pattern being processed, using said current input pattern; and
  - (b) an eleventh circuit configured to propagate the dynamic programming path associated with the current active pattern, and for listing, if it is not already listed, each reference pattern of the current reference signal, which may be at the end of that dynamic programming path for the succeeding input pattern, in a new active list; and wherein said eleventh circuit is controlled using a pointer associated with the current reference signal, which identifies the reference pattern which is the earliest in the sequence of patterns of the current reference signal listed in the new active list, after the processing of the preceding active pattern, such that the propagating means can propagate each dynamic programming path without the need to search the new active list to identify which reference patterns, of the current reference signal, have been listed on the new active list as a result of said ninth circuit processing preceding active patterns of the current reference signal, and wherein said input signal is a speech signal, and wherein each input pattern comprises a number of parameters representative of the acoustic properties of the speech signal during a corresponding time frame; and a twelfth circuit configured to provide a recognition result from cumulative values determined by said third circuit.

81. An apparatus according to claim 80, wherein said twelfth circuit is operable to provide said recognition result by determining which of the dynamic programming paths which end at the last input pattern in the sequence has the best cumulative value.

82. An apparatus for performing a dynamic programming pattern matching process, the apparatus comprising:

a first circuit configured to input a sequence of input patterns representative of an input signal;

a second circuit configured to store a plurality of sequences of references patterns, each sequence being representative of a reference signal;

a third circuit configured to process a current input pattern with respect to at least some of the reference signals in turn, comprising:
- (1) a fourth circuit configured to define as active patterns the reference patterns of a current reference signal which are at the end of a dynamic programming path for the current into pattern being processed, each path representing a possible matching between an ordered sequence of reference patterns and all ordered sequence of input patterns ending at said current input pattern, and for listing the active patterns for the current input pattern in a current active list;

(2) a fifth circuit configured to store in a store associated with each active pattern, a cumulative value representative of a score for the dynamic programming path which ends at that active pattern for said current input pattern; and (3) a sixth circuit configured to process each active pattern of said current reference signal in reverse sequential order, to update said cumulative values and to propagate said dynamic programming paths based on constraints which are placed on the dynamic programming path propagation, said sixth circuit comprising:

(a) a seventh circuit configured to update the cumulative value stored in the store associated with a current active pattern being processed, using said current input pattern; and (b) an eighth circuit configured to propagate the dynamic programming path associated with the current active pattern, and for listing, if it is not already listed, each reference pattern of the current reference signal, which may be at the end of that dynamic programming path fur the succeeding input pattern, in a new active list; and wherein said eighth circuit is controlled using a pointer associated with the current reference signal, which identifies the reference pattern which is the earliest iii the sequence of patterns of the current reference signal listed in the new active list, after the processing of the preceding active pattern, such that the eighth circuit can propagate each dynamic programming path without the need to search the new active list to identify which reference patterns, of the current reference signal, have been listed on the new active list as a result of said sixth circuit processing preceding active patterns of the current reference signal.

83. An apparatus according to claim 82, wherein the eighth circuit comprises:

(i) a ninth circuit configured to determine which of the reference patterns of the current reference signal are potentially at an end of the dynamic programming path which ends at said current active pattern for said succeeding input pattern, based upon said constraints which are placed on the dynamic programming path propagation; and (ii) a tenth circuit configured to copy appropriate cumulative values into stores associated with the reference patterns determined by said ninth circuit.

84. An apparatus according to claim 83, wherein said ninth circuit further comprises an eleventh circuit configured to process each of the reference patterns determined by said ninth circuit comprising:

(a) a twelfth circuit configured to discriminate whether a current reference pattern being processed is sequentially beyond any reference pattern identified by said pointer; and (b) a thirteenth circuit, responsive to said eleventh circuit, configured to (i) copy the cumulative value stored in the store associated with said current active pattern into the store associated with the current reference pattern, if it is better than the cumulative value already stored there and if the current reference pattern is the same as or sequentially beyond the identified reference pattern;

and (ii) copy the cumulative value stored in the store associated with said current active pattern into the store associated with said current reference pattern, and listing said current reference pattern in the new active list, if the current reference pattern is sequentially before the identified reference pattern or if there are no reference patterns of the current reference signal in the new active list.

85. An apparatus according to claim 84, wherein said twelfth circuit is configured to process said reference patterns determined by said ninth circuit in reverse sequential order.

86. An apparatus according to claim 83, wherein said eighth circuit is operable to list the current active pattern in the new active list, if this is not contrary to any constraint placed on the dynamic programming process if one of the reference patterns determined by said ninth circuit is the current active pattern.

87. An apparatus according to claim 82, further comprising a ninth circuit configured to set the pointer associated with the current reference signal to identify the reference pattern on the new active list which is the earliest in the sequence of patterns of the current reference signal once the new active list has been updated by the processing of the current active pattern by said sixth circuit.

88. An apparatus according to claim 82, wherein the first circuit is configured to process the current input pattern before the succeeding input pattern is received.

89. An apparatus according to claim 82, wherein said first circuit is configured to input the whole input signal before the first input pattern is processed by said third circuit.

90. An apparatus according to claim 82, further comprising a current active list and a new active list for each reference signal.

91. An apparatus according to claim 82, wherein said eighth circuit is configured to list said reference patterns in said new active list in reverse sequential order.

92. An apparatus according to claim 82, further comprising a ninth circuit configured to prevent said sixth circuit from processing the current active pattern, if the cumulative value is associated therewith is worse than a preset threshold value.

93. An apparatus according to claim 92, further comprising an tenth circuit configured to vary said threshold value in order to try to maintain the number of active patterns processed by said sixth circuit for each input pattern processed by said third circuit to be below a given maximum number.

94. An apparatus according to claim 93, wherein the tenth circuit is configured to set the threshold value used during the processing of the succeeding input pattern during the processing of the current input pattern, and is dependent upon the total number of reference patterns in the new active list or lists for the succeeding input pattern.

95. An apparatus according to claim 82, further comprising a ninth circuit configured to constrain said dynamic programming path propagation so that a limit is placed on the number of consecutive input patterns that a reference pattern can be matched with, on the same dynamic programming path.

96. An apparatus according to claim 82, further comprising a ninth circuit configured to constrain said dynamic programming path propagation so that if a reference pattern is matched with an input pattern, then a limited number of reference patterns which are sequentially beyond that reference pattern can be matched with the succeeding input pattern, on the same dynamic programming path.

97. An apparatus according to claim 82, further comprising a ninth circuit configured to constrain said dynamic programming path propagation so that if a reference pattern is matched with an input pattern, then reference patterns which are sequentially before that reference pattern can not be matched with the succeeding input pattern, on the same dynamic programming path.

98. An apparatus according to claim 82, wherein said reference patterns are representative of a template, and wherein said cumulative values are distance measures.

99. An apparatus according to claim 82, wherein said reference patterns are representative of a statistical model, and wherein said cumulative values are probabilistic measures.

100. An apparatus according to claim 82, wherein said apparatus is arranged so that said input signal can be matched with a sequence of said reference signals, by allowing dynamic programming paths propagating in one reference signal to subsequently propagate into other reference signals.

101. An apparatus according to claim 100, wherein said apparatus is arranged so that only the dynamic programming path, which has the best cumulative value of all the dynamic programming paths which leave the reference pattern for the current input pattern, propagates further.

102. An apparatus according to claim 100, further comprising a ninth circuit configured to use a set of defined rules for constraining the sequence of reference signals against which the input signal can be matched.

103. An apparatus according to claim 100, further comprising a ninth circuit configured to, after the current input pattern has been processed with respect to the reference signals by said third circuit, to process those reference signals to update the new active list and to update the cumulative values associated with the reference patterns at the beginning of those reference signals, which are potentially at an end of a dynamic programming path which enters the corresponding reference signal, based upon said constraints, using the best cumulative value of all the dynamic programming paths which can enter that reference signal.

104. An apparatus according to claim 82, wherein said input signal is a speech signal, and wherein each input pattern comprises a number of parameters representative of the acoustic properties of the speech signal during a corresponding time frame.

105. An apparatus according to claim 104, wherein said input speech signal can be matched to a sequence of reference speech signals, and wherein the allowed sequences are defined by a language model.

106. An apparatus according to claim 105, wherein said apparatus is arranged so that the end of a dynamic programming path which leaves a reference signal when processing the current input pattern can be matched with a pattern representative of background noise for succeeding input patterns.

107. A method of performing a dynamic programming pattern matching process between a sequence of input patterns representative of an input signal, and a number of stored sequences of reference patterns, each sequence being representative of a reference signal, wherein the method processes each input pattern in turn with respect to at least some of the reference signals in turn, by:

(1) defining as active patterns the reference patterns of a current reference signal which are at the end of a dynamic programming path for a current input pattern being processed, each path representing a possible matching between an ordered sequence of reference patterns and an ordered sequence of input patterns ending at said current input pattern, and listing the active patterns for the current input pattern in a current active list;

(2) for each active pattern, storing in a store associated with that active pattern, a cumulative value representative of the score for the dynamic programming path which ends at that active pattern for said current input pattern; and (3) updating said cumulative values and propagating said dynamic programming paths based on constraints which are placed on the dynamic programming path propagation, by processing each active pattern of said current reference signal in reverse sequential order, by:

(A) updating the cumulative value stored in the store associated with a current active pattern being processed, using said current input pattern; and then (B) propagating the dynamic programming path associated with the current active pattern, and listing, if it is not already listed, each reference pattern of the current reference signal, which may be at the end of that dynamic programming path for the succeeding input pattern, in a new active list; and wherein the propagation of each dynamic programming path for a current reference signal is controlled using a pointer associated with the current reference signal, which identifies the reference pattern which is the earliest in the sequence of patterns of the current reference signal listed in the new active list, after the processing of the preceding active pattern, such that the propagation of each dynamic programming path is achieved without the need to search the new active list to identify which reference patterns, of the current reference signal, have been listed on the new active list as a result of processing preceding active patterns.

108. A method according to claim 107, wherein the following steps are performed in step (B):

(i) determining which of the reference patterns of the current reference signal are potentially at an end of the dynamic programming path which ends at said current active pattern for said succeeding input pattern, based upon said constraints which are placed on the dynamic programming path propagation; and then (ii) propagating the dynamic programming path, updating the new active list and copying appropriate cumulative values into stores associated with the reference patterns determined in step (i), by processing each reference pattern determined in step (i).

109. A method according to claim 108, wherein each reference pattern determined in step (i) of claim 2, except the current active pattern if it is one of those reference patterns, is processed by:

(a) determining whether a current reference pattern being processed is sequentially beyond any reference pattern identified by said pointer; then (b) if the current reference pattern is the same as or sequentially beyond the identified reference pattern, then copying the cumulative value stored in the store associated with said current active pattern into the store associated with the current reference pattern, if it is better than the cumulative value already stored there; and (c) if the current reference pattern is sequentially before the identified reference pattern or if there are no reference patterns of the current reference signal in the new active list, then copying the cumulative value stored in the store associated with said current active pattern into the store associated with said current reference pattern, and listing said current reference pattern in the new active list.

110. A method according to claim 108, wherein if one of the reference patterns determined in step (i) of claim 2 is the current active pattern, then the processing of the current active pattern in step (ii) of claim 2 comprises the step of listing the current active pattern in the new active list, if this is not contrary to any constraint placed on the dynamic programming process.

111. A method according to claim 108, wherein the reference patterns processed in step (ii) of claim 2, are processed in reverse sequential order.

112. A method according to claim 107, wherein after the new active list has been updated by the processing of the current active pattern, said pointer associated with the current reference signal is set to identify the reference pattern on the new active list which is the earliest in the sequence of patterns of the current reference signal.

113. A method according to claim 107, wherein the processing of the current input pattern is performed before the succeeding input pattern is received.

114. A method according to claim 107, wherein the whole input signal is received before the first input pattern is processed.

115. A method according to claim 107, wherein each reference signal has associated therewith a current active list and new active list.

116. A method according to claim 107, wherein when a reference pattern is added to said new active list it is placed at the end thereof.

117. A method according to claim 107, wherein the method only performs step (3) of claim 1 for the current active pattern, if the cumulative value associated therewith is better than a threshold value.

118. A method according to claim 117, wherein said threshold value is varied to try to maintain the number of active patterns processed for each input pattern to be below a given maximum number.

119. A method according to claim 118, wherein the threshold value used during the processing of the succeeding input pattern is determined during the processing of the current input pattern, and is dependent upon the total number of reference patterns in the new active list or lists for the succeeding input pattern.

120. A method according to claim 107, wherein one of said dynamic programming constraints is that a limit is placed on the number of consecutive input patterns that a reference pattern can be matched with, on the same dynamic programming path.

121. A method according to claim 107, wherein one of said dynamic programming constraints is that if a reference pattern is matched with an input pattern, then a limited number of reference patterns which are sequentially beyond that reference pattern can be matched with the succeeding input pattern, on the same dynamic programming path.

122. A method according to claim 107, wherein one of said dynamic programming constraints is that if a reference pattern is matched with an input pattern, then reference patterns which are sequentially before that reference pattern can not be matched with the succeeding input pattern, on the same dynamic programming path.

123. A method according to claim 107, wherein said reference patterns are representative of a template, and wherein said cumulative values are distance measures.

124. A method according to claim 107, wherein said reference patterns are representative of a statistical model, and wherein said cumulative values are probabilistic measures.

125. A method according to claim 107, wherein said input signal can be matched with a sequence of said reference signals, by allowing dynamic programming paths propagating in one reference signal to subsequently propagate into other reference signals.

126. A method according to claim 125, wherein only the dynamic programming path which has the best cumulative value of all the dynamic programming paths which leaves the reference pattern for the current input pattern, propagates further.

127. A method according to claim 125, wherein the sequence of reference signals, against which the input signal can be matched, is constrained by a set of defined rules.

128. A method according to claim 125, wherein after the current input pattern has been processed with respect to the reference signals, the method processes those reference signals to update the new active list and to update the cumulative values associated with the reference patterns at the beginning of those reference signals, which are potentially at an end of a dynamic programming path which enters the corresponding reference signal, based upon said constraints, using the best cumulative value of all the dynamic programming paths which can enter that reference signal.

129. A method according to claim 107, wherein said input signal is representative of a speech signal, and wherein each input pattern comprises a number of parameters representative of the acoustic properties of the speech signal during a corresponding time frame.

130. A method according to claim 129, wherein said input speech signal can be matched to a sequence of reference speech signals, and wherein the allowed sequences are defined by a language model.

131. A method according to claim 130, wherein the end of a dynamic programming path which leaves a reference signal when processing the current input pattern can be matched with a pattern representative of background noise for succeeding input patterns.

132. A speech recognition method for recognising an input speech signal by comparing it with a plurality of reference speech signals, the method comprising the steps of:

extracting a sequence of input patterns representative of said input speech signal;

storing sequences of reference patterns, each sequence being representative of a corresponding reference speech signal;

matching the sequence of input patterns with the reference speech signals, using a method according to claim 129; and providing a recognition result from cumulative values determined by said matching step.

133. A method according to claim 132, wherein said recognition result is provided by determining which of the dynamic programming paths which end at the last input pattern in the sequence has the best cumulative value.

* * * * *

UNITED STATES PATENT AND TRADEMARK OFFICE
CERTIFICATE OF CORRECTION

PATENT NO. : 5,960,395
DATED : September 28, 1999
INVENTOR(S) : Eli Tzirkel-Hancok It is certified that error appears in the above-identified patent and that said Letters Patent is hereby corrected as shown below:

Title page,
Item [54],
"COMPUTER READABLE" should read -- COMPUTER-READABLE --.

Other Publications, Section [56],
After "H. Mulla, et al., "Application of Speech", "REcognition" should read
-- Recognition --.
Drawings,
Sheet 7, Figure 12, in box 133, "BOUNDRIES" should read -- BOUNDARIES --.

Column 1,
Line 1, "COMPUTER READABLE" should read -- COMPUTER-READABLE --.

Column 9,
Line 34, "littering" should read -- liftering --.

Column 15,
Line 29, "No." should read -- $N_0$ --.

Column 20,
Line 35, "lists. The" should read -- lists, the --.

Column 26,
Line 44, "Ti= MINSCORE + PRUNING" should read -- Th = MINSCORE + PRUNING --.

Column 28,
Line 65, "SD" should read -- $S_D$ --.

Column 29,
Line 47, "parameters" should read -- prameter --.

Column 30,
Line 26, "ie." should read -- i,e., --.
Line 51, "ie." should read -- I.e., --.

UNITED STATES PATENT AND TRADEMARK OFFICE
CERTIFICATE OF CORRECTION

PATENT NO.   : 5,960,395
DATED        : September 28, 1999
INVENTOR(S)  : Eli Tzirkel-Hancok It is certified that error appears in the above-identified patent and that said Letters Patent is hereby corrected as shown below:

Column 31,
Line 37, "ie." should read -- i.e., --.
Line 62, "the new" should read -- new --.

Column 41,
Line 51, "eg" should read -- e.g., --.

Column 43,
Line 7, "references" should read -- reference --.
Line 15, "into" should read -- input --.

Column 45,
Line 11, "it" should read -- if --.

Column 48,
Line 9, "propagating" should read -- propagating instructing means --.

Column 49,
Line 20, "cause" should read -- causes --.
Line 24, "comprises" should read -- comprising --.

Column 50,
Line 6, "a" should read -- an --.

Column 51,
Line 12, "into" should read -- input --.

Column 52,
Line 10, "thirteen" should read -- thirteenth --.
Line 46, "means" should be deleted.

Column 53,
Line 5, "is" should read -- that is --.

Column 54,
Line 17, "match" should read -- to match --.

Column 55,
Line 43, "all" should read -- an --.

UNITED STATES PATENT AND TRADEMARK OFFICE
CERTIFICATE OF CORRECTION

PATENT NO.    : 5,960,395
DATED         : September 28, 1999
INVENTOR(S)   : Eli Tzirkel-Hancok It is certified that error appears in the above-identified patent and that said Letters Patent is hereby corrected as shown below:

Column 56,
Line 5, "store-" should read -- store --.
Line 58, "references" should read -- reference --.
Line 66, "into" should read -- input --.

Column 58,
Line 41, "is" should read -- that is --.
Line 44, "an" should read -- a --.

Column 60,
Line 38, "(B):" should read -- 3(B): --.
Line 51, "claim 2," should read -- claim 108, --.

Column 61,
Line 7, "claim 2," should read -- claim 108, --.
Line 14, "claim 2," should read -- claim 108, --.
Line 35, "claim 1" should read -- claim 107, --.

Signed and Sealed this

Twenty-seventh Day of November, 2001

*Attest:*

*Attesting Officer*

NICHOLAS P. GODICI
*Acting Director of the United States Patent and Trademark Office*